United States Patent [19]

Wilson et al.

[11] Patent Number: 5,400,246
[45] Date of Patent: Mar. 21, 1995

[54] PERIPHERAL DATA ACQUISITION, MONITOR, AND ADAPTIVE CONTROL SYSTEM VIA PERSONAL COMPUTER

[75] Inventors: Dennis A. Wilson, McHenry; Mark S. Williamsen, Crystal Lake, both of Ill.

[73] Assignee: Ansan Industries, Ltd., Rockford, Ill.

[21] Appl. No.: 927,168

[22] Filed: Aug. 5, 1992

Related U.S. Application Data

[63] Continuation-in-part of Ser. No. 862,624, Apr. 1, 1992, which is a continuation-in-part of Ser. No. 832,716, Feb. 7, 1992, Pat. No. 5,220,522, which is a continuation of Ser. No. 350,115, May 9, 1989, Pat. No. 5,099,444.

[51] Int. Cl.⁶ .................. G05B 11/01; G06F 3/00
[52] U.S. Cl. .................. 364/146; 364/709.09; 340/825.06; 340/825.36; 345/168
[58] Field of Search .............. 364/146, 709.09, 709.11, 364/188; 395/500; 340/706, 825.06, 825.54, 825.55, 825.36

[56] References Cited

U.S. PATENT DOCUMENTS

| | | | |
|---|---|---|---|
| 3,634,824 | 1/1972 | Zinn | 340/825.55 |
| 3,654,449 | 4/1972 | Boyce | 364/709.11 |
| 3,898,643 | 8/1975 | Ettlinger | 340/324 A |
| 3,899,772 | 8/1975 | Mead et al. | 340/825.55 |
| 3,955,073 | 5/1976 | Carew et al. | 364/561 |
| 3,961,168 | 6/1976 | Gaffney | 235/152 |
| 3,971,000 | 7/1976 | Cromwell | 340/172.5 |
| 4,084,249 | 4/1978 | Schlick | 364/709.01 |
| 4,101,883 | 7/1978 | Hempenius et al. | 341/22 |
| 4,151,596 | 4/1979 | Howells | 364/709.11 |
| 4,181,959 | 1/1980 | Tateishi | 364/709.11 |
| 4,181,960 | 1/1980 | Tateishi et al. | 364/709.11 |
| 4,195,348 | 3/1980 | Kakutani | 364/709.11 |
| 4,201,908 | 5/1980 | Johnson et al. | 377/9 |
| 4,213,035 | 7/1980 | Washizuka et al. | 364/709.12 |
| 4,250,554 | 2/1981 | Blum et al. | 364/560 |
| 4,284,849 | 8/1981 | Anderson et al. | 340/825.55 |
| 4,303,973 | 12/1981 | Williamson, Jr. | 364/103 |
| 4,370,727 | 1/1983 | Bellet | 364/709.13 |
| 4,371,871 | 2/1983 | Adams | 340/825.36 |
| 4,371,922 | 2/1983 | Fujita et al. | 364/144 |
| 4,379,336 | 4/1983 | Yamamoto et al. | 364/708 |
| 4,396,977 | 8/1983 | Slater et al. | 364/188 |
| 4,418,333 | 11/1983 | Schwartzbach | 340/310 A |
| 4,477,809 | 10/1984 | Bose | 340/825.36 |
| 4,480,312 | 10/1984 | Wingate | 364/557 |
| 4,524,354 | 6/1985 | Morgan | 340/825.36 |
| 4,621,334 | 11/1986 | Garcia | 364/550 |
| 4,641,262 | 2/1987 | Bryan et al. | 364/900 |
| 4,648,123 | 3/1987 | Schrock | 340/825.54 |

(List continued on next page.)

FOREIGN PATENT DOCUMENTS 2125996  3/1984  United Kingdom ........... 364/709.11

OTHER PUBLICATIONS

Ansan Industries, Ltd., "I/O Port System" Sales Brochure, 1990, 4 pgs. month unknown.
Ansan Industries, Ltd., "I/O Port System Bridge" User's Manual, 1990, 78 pgs. month unknown.
Apple Computer, Inc., *Inside MacIntosh*, vol. III, 1988, pp. 29–32; vol. IV, p. 250; & vol. V, pp. 361–373. month unknown.

(List continued on next page.)

*Primary Examiner*—Paul P. Gordon
*Attorney, Agent, or Firm*—Welsh & Katz, Ltd.

[57] ABSTRACT

A peripheral data acquisition, monitor, and adaptive control system is disclosed in which a personal computer (PC) and one or more input/output (I/O) Bridge devices interface signals from electronically-controlled devices to the PC via the keyboard port, thus permitting data, such as measurement data, to be automatically and directly entered into application programs such that the PC can take action and control outputs based upon the measurement data. A software control program is also disclosed which allows the user to configure the system for orienting the user as to which devices are being controlled, reading digital and analog inputs, making decisions based upon the information using specific user-defined conditions, and setting digital outputs. The system is also adapted to interface with a wireless or AC power-line transmission media.

32 Claims, 36 Drawing Sheets

U.S. PATENT DOCUMENTS

| | | | |
|---|---|---|---|
| 4,663,704 | 5/1987 | Jones et al. | 364/188 |
| 4,669,053 | 5/1987 | Krenz | 364/708 |
| 4,695,833 | 9/1987 | Ogura et al. | 340/722 |
| 4,695,880 | 9/1987 | Johnson et al. | 348/6 |
| 4,704,604 | 11/1987 | Fuhs | 364/708 |
| 4,710,869 | 12/1987 | Enokizono | 364/709.09 |
| 4,755,808 | 7/1988 | Bullock et al. | 340/709 |
| 4,779,079 | 10/1988 | Hauck | 340/706 |
| 4,782,448 | 11/1988 | Milstein | 364/709.11 |
| 4,821,221 | 4/1989 | Kaneko | 364/710.13 |
| 4,823,122 | 4/1989 | Mann et al. | 340/825.29 |
| 4,829,472 | 5/1989 | McCourt et al. | 364/900 |
| 4,831,568 | 5/1989 | Ito | 364/709.01 |
| 4,852,031 | 7/1989 | Brasington | 364/578 |
| 4,852,032 | 7/1989 | Matsuda et al. | 364/708 |
| 4,864,519 | 9/1989 | Appleby et al. | 364/138 |
| 4,882,684 | 11/1989 | Ishigami et al. | 364/708 |
| 4,885,580 | 12/1989 | Noto et al. | 364/709.01 |
| 4,908,612 | 3/1990 | Bromley et al. | 340/706 |
| 4,920,481 | 4/1990 | Binkley et al. | 362/200 |
| 4,928,099 | 5/1990 | Drake | 340/307 |
| 4,935,875 | 6/1990 | Shah et al. | 364/709.01 |
| 4,945,473 | 7/1990 | Hotley et al. | 364/200 |
| 4,947,367 | 8/1990 | Chang et al. | 364/900 |
| 4,962,473 | 10/1990 | Crain | 364/900 |
| 5,065,360 | 11/1991 | Kelly | 395/800 |
| 5,099,444 | 3/1992 | Wilson et al. | 364/709.09 |
| 5,220,522 | 6/1993 | Wilson et al. | 364/709.09 |

OTHER PUBLICATIONS

Apple Computer Inc., "The MacIntosh Family Hardware Reference", *Apple Technical Publications*, APDA Draft, Mar. 2, 1987, pp. 1, 25-29, 93-103, & 171-181.

Birse, C., "Space Aliens Ate My Mouse" (ADB—The Untold Story), *MacIntosh Technical Note #206*, Feb. 1990, pp. 1-8.

Ernst, "Remotely Control a Pocket Calculator with a Simple CMOS Interface Circuit", *Electronic Design*, vol. 23, Nov. 8, 1976, pp. 74-75.

IBM Corp., "Keyboard Port Attachment", *IBM Technical Disclosure Bulletin*, vol. 28, No. 8, Jan. 1986, pp. 3358-3359.

"The Apple Desktop Bus", reprinted from *Mini-Micro Systems*, Nov. 1987, Part IV, 2 pgs.

Radio Shack © *Plug 'n Power TM Wireless Remote Control Center*, Catalog No. 61-2676, Owner's Manual, 1989, pp. 1-24 month unknown.

Silicon Valley Bus TM Co., *BusRider TM BC-91 TM* "Bar Code ID System for Apple Desktop Bus"; *BusRider MP-91 TM* "Software Controlled Multiple Port Switch for MacIntosh"; *BusRider TM BC-90 TM* Lock Box Security System for Apple Desktop Bus; Data Sheets, 1991, 6 pgs. month unknown.

Sophisticated Circuits Inc., *Specifications and Installation Guide for PowerKey TM*, 1990, 6 pgs. month unknown.

Sophisticated Circuits Inc., "Three New Ways to Turn On Your MacIntosh!", *PowerKey TM Remote for the MacIntosh Computer*, 1991, 4 pgs. month unknown.

X-10 (U.S.A.) Inc., *X-10 ® CP290 Home Control Interface*, Programming Guide for Advanced Programmers, 1991, pp. 1-35.

X-10 (U.S.A.) Inc., *X-10 ® POWERHOUSE TM Computer Interface Model No. CP290*, Programming Guide, 1986, pp. 1-35.

X-10 (U.S.A.) Inc., *X-10 ® POWERHOUSE TM Model CP290 Computer Interface*, Owner's Manual, 1986, pp. 1-28.

X-10 (U.S.A.) Inc., *X-10 ® POWERHOUSE TM Software for Apple ® MacIntosh TM*, Owner's Manual, 1986, pp. 1-51.

X-10 (U.S.A.) Inc., *X-10 ® POWERHOUSE TM Technical Note*, "The X-10 POWERHOUSE Power Line Interface Model# PL513 and Two-Way Power Line Interface Model# TW523", Revision 2.4, 1991, 12 pgs.

```
┌─────────────────────────────────────────────────────────────┐
│ ▤  ⇦ ▒▒▒▒▒▒▒▒▒▒▒▒▒▒▒▒▒▒▒▒▒▒▒▒▒▒▒▒▒▒▒▒▒▒▒▒▒▒▒▒ ⇨  ▣ │
│ ═══════════ I/O Port System™ Results ═══════════           │
│ 3/30/92 5:19:54 PM Bridge #1 Analog Input #  1 Tank #4 Level= 33.51  feet
│ 3/30/92 5:19:55 PM Bridge #1 Analog Input #  1 Tank #4 Level= 47.32  feet
│ 3/30/92 5:19:56 PM Bridge #1 Analog Input #  1 Tank #4 Level= 57.31  feet
│ 3/30/92 5:19:56 PM Bridge #2 DIG INPUT #1- East Door--Front Office TURNED TRUE
│ 3/30/92 5:19:57 PM Bridge #2 DIG INPUT #2- East Door--Building #19 TURNED TRUE
│ 3/30/92 5:19:57 PM Bridge #1 Analog Input #  1 Tank #4 Level= 84.44  feet
│ 3/30/92 5:19:58 PM Bridge #1 Analog Input #  1 Tank #4 Level= 100.15 feet
│ 3/30/92 5:19:59 PM Bridge #1 Analog Input #  1 Tank #4 Level= 113.00 feet
│ 3/30/92 5:20:00 PM Bridge #1 Analog Input #  1 Tank #4 Level= 122.05 feet
│ 3/30/92 5:20:01 PM Bridge #1 Analog Input #  1 Tank #4 Level= 122.05 feet
└─────────────────────────────────────────────────────────────┘
```

*FIG. 3L*

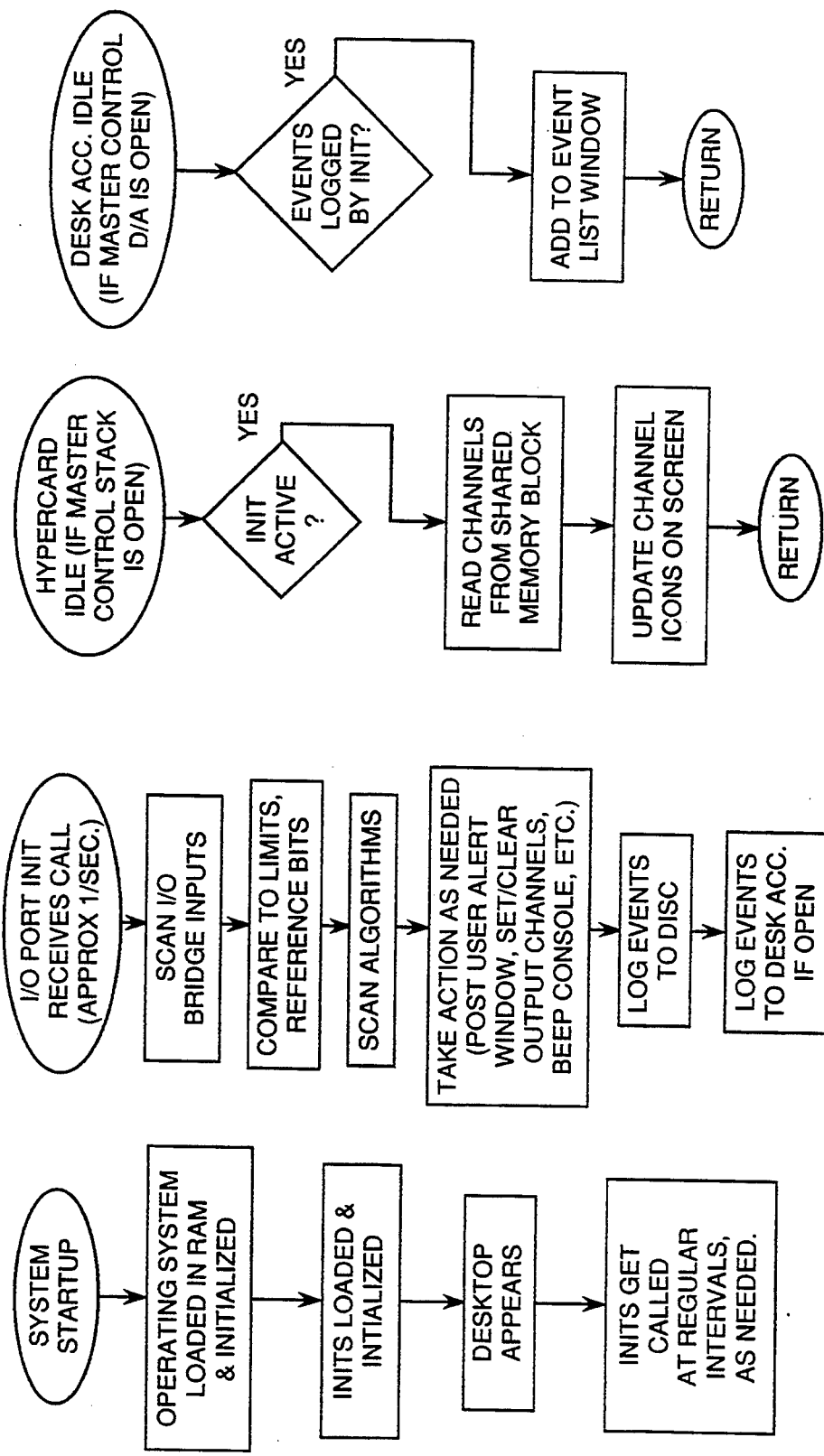

PERIPHERAL DATA ACQUISITION, MONITOR, AND ADAPTIVE CONTROL SYSTEM VIA PERSONAL COMPUTER

CROSS-REFERENCE TO RELATED APPLICATIONS

This application is a continuation-in-part of application Ser. No. 07/862,624, filed Apr. 1, 1992, which is a continuation-in-part of application Ser. No. 07/832,716, filed Feb. 7, 1992, now U.S. Pat. No. 5,220,522, issued on Jun. 15, 1993, which is a continuation of application Ser. No. 07/350,115, filed May 9, 1989, now U.S. Pat. No. 5,099,444, issued on Mar. 22, 1992. All of the above applications are hereby incorporated by reference as if fully set forth herein.

REFERENCE TO COMPUTER PROGRAM APPENDIX

A computer program appendix, comprising a total of 511 pages of computer object code listing with a single page Table of Contents, is attached to parent application Ser. No. 07/862,624 as Appendix A, and is hereby incorporated by reference into this application as if fully set forth herein.

AUTHORIZATION TO COPY COMPUTER PROGRAM APPENDIX

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of computer systems for the monitoring and controlling of peripheral devices for the purpose of data acquisition and for remote control. More specifically, the present invention relates to computer systems including a personal computer (PC) and one or more input/output peripheral data acquisition, monitor, and control devices which interface signals from electronically-controlled devices to the PC, thus permitting data, such as measurement data, to be automatically and directly entered into application programs such that the PC can take action and control outputs based upon the measurement data.

BACKGROUND OF THE INVENTION

Numerous computer software programs have been developed to provide computer control of data acquisition systems designed to automate every step in a particular process. An example of such an automated process would be a production sorting system, where products are tested under computer control to see if the products are within predetermined limits for certain parameters and, if not, to reject them. Such a computerized production sorting system tends to be expensive, bulky, and of limited utility outside of the narrow use for which it was originally designed.

There has also been a trend to develop data acquisition accessories for use with desktop computers. Many of these accessories comprise plug-in circuit cards which are connected to the personal computer's central processor unit (CPU) and are dependent upon the PC as a power source therefor. Specialized software programs must be written to instruct the circuit card to take a particular measurement and to return the data to the CPU such that the reading can either be saved on a disc storage unit or displayed on a video monitor. While these data acquisition accessories reduce the tedium associated with the reading and recording of measured values and decrease the possibility of errors in such reading and recording, they still have at least one major drawback—that of requiring specialized knowledge of the particular data acquisition system and the ability to program the CPU and the data acquisition circuit card in order to perform the desired functions.

If the peripheral data acquisition, monitor, and control system is even moderately sophisticated, a service technician, typically one who has significant experience in both computer programming and electronic control, must install the system and troubleshoot it. A further difficulty is often encountered in that existing software application programs for performing data reduction and analysis, based on the keyboard entry of data, must be modified, or even rewritten, in order to accept input from the data acquisition circuit card. Once such a system is configured and programmed by the service technician, it usually becomes very difficult or impossible for the average unskilled user to change anything in the system configuration, to test the correct operation of particular control devices in the system, or to even obtain a general understanding of the overall system operation.

For example, in the case of a security system having window and door sensors in a number of different buildings located across an office complex, a security guard, having no programming or electronics background, would typically be responsible for operating the system. In order to allow an employee into one of the doors at one of the buildings, the security guard usually has to disable either the entire system, or at least that portion of the system corresponding to that building, instead of being able to disable only that particular sensor at the door being used. Even if the security system was sophisticated enough to provide this capability, the security guard would only have a vague recollection of which door sensor in which building is being disabled, instead of being presented with a precise visual image on a display monitor of the location of that particular door sensor with respect to the physical layout of the building and/or the entire office complex. Moreover, if that particular door sensor was faulty, the security guard typically would not be provided with the capability to change the system configuration to render that door sensor inoperative and test the remaining sensors in the system once the system configuration has been changed.

Similarly, using aforementioned the example of a computerized production sorting system in a factory, it is often desirable to completely automate each step in the manufacturing process and provide data acquisition capabilities to test the manufactured product using a personal computer. In the past, this has typically required a dedicated PC to run the system using customized software specifically developed for that particular manufacturing process. If even a single one of the manufacturing steps is changed to accommodate a new product, the entire system typically must be shut down temporarily to reconfigure the system by reprogramming the software. As will be appreciated by those skilled in the art, this procedure is excessively time consuming and very costly. Furthermore, in order to perform testing by automatic data acquisition for this new product, the necessary modification of the test fixture, the system configuration, and the data acquisition application software is quite often a tremendous undertaking. It may even prove to be more cost effective for certain small jobs to have a human operator take the data acquisition measurements and manually type them in on a keyboard, rather than shutting down the system and waiting for the service technician to reconfigure it.

In addition to monitoring and controlling a security system or a production sorting system, wherein standard electrical sensors and controls would be hardwired, a user may wish to monitor and control other types of electrical devices using their existing communications interface. A primary example of such an existing communications interface would be the well-known power line carrier transmission system used in home automation systems or "smart-home" applications. A great majority of these systems use the "X-10" standard code format manufactured by X-10 (USA) Inc., Northvale, N.J. ("X-10" is a registered trademark of X-10 (USA) Inc.) A variety of lamp modules, appliance modules, various power-line interface modules, and controller modules utilize this code format to couple X-10 compatible signals onto the AC power line through standard AC outlets. In this manner, a complete home automation system can be designed without having to hard-wire the centrally-located master control device to the remotely-located controlled devices. However, the presently-available computer interfaces and/or programmable controllers for AC power-line transmission systems are somewhat limited, particularly when it comes to monitoring the status of a particular controlled device in real time. In other words, most X-10 controllers tell the X-10 modules what to do—and they cannot tell what was done.

A need, therefore, exists for a peripheral data acquisition, monitor, and adaptive control system which addresses these deficiencies in the prior art.

OBJECTS AND SUMMARY OF THE INVENTION

Accordingly, a primary object of the present invention is to provide a peripheral data acquisition, monitor, and adaptive control system which allows the user to easily create, modify, and test complex control system configurations on a personal computer.

Another object of the present invention is to provide a method and means for orienting the user with respect to the physical location and function of the equipment being controlled by the system.

A further object of the present invention is to provide a computer software program that runs in the background while an unrelated application program runs in the foreground, wherein the background program can execute sophisticated conditional statements to control an output, record events in real time, and display a recorded table of events on command.

Yet another object of the present invention is to provide a peripheral data acquisition, monitor, and adaptive control system which interfaces to the personal computer via the keyboard port and which performs data acquisition by emulation of keyboard keystrokes.

Still another object of the present invention is to provide a peripheral data acquisition, monitor, and adaptive control system which interfaces to existing power-line carrier or wireless transmission media.

These and other objects are achieved by the present invention, which, briefly stated, is a peripheral data acquisition, monitor, and adaptive control system including a personal computer (PC) and one or more input/output (I/O) Bridge devices which interface signals from electronically-controlled devices to the PC via the PC's keyboard port. The system permits measurement and control data to be automatically and directly entered into application programs such that the PC can take action and control outputs based upon the measurement data. Hence, "adaptive control" refers to the system's ability to respond to changing conditions in the real world, and control peripheral devices in accordance with those changes.

The system of the present invention includes a computer, including a central processor, a display monitor, and a keyboard port adapted to be coupled to a detachable keyboard, for executing at least one application software program running in the foreground under user control. The computer is adapted to communicate with the keyboard when connected to the keyboard port using a particular keycode format based upon the coding of keyboard keystroke information as individual sequential keyboard characters. The equipment being adaptively controlled provides at least one monitoring signal indicative of a particular event, wherein the monitoring signal has a signal format not directly compatible with the particular keycode format.

The system further includes an interface device for interfacing the computer to the electronically-controlled equipment using the keyboard port. The interface device receives the monitoring signal from the equipment, translates the monitoring signal into a keyboard code signal which emulates individual sequential keyboard character keystroke information and which is adapted to be interpreted by the computer as keyboard keystroke information, and transmits the keyboard code signal to the computer via the keyboard port. The control software program for the system runs in the background substantially independent from user control. The control software program instructs the computer to receive the keyboard code signal at the keyboard port and to record the keyboard code signal in memory. The system also provides the ability to have the program record events in real time and display the recorded table of events.

According to another aspect of the present invention, the software control program orients the user by showing a representation of the overall view of the system being controlled, then directs the user to the location of the individual electronically-controlled devices and/or the functions that they control, and provides the ability to set up and control the devices using various icons. In other words, the program first shows the physical location of groups of devices. Then the program shows the function of each device in the group. Finally, the status of each device is shown having the various icons change colors, shapes, and/or shading.

Furthermore, the control program of the present invention provides real-time monitoring and adaptive control of the electronically-controlled devices using three modes: (1) a set up mode, where the user can determine which inputs control which outputs; (2) an automatic mode, which displays the current status of all the inputs and outputs in real time; and (3) a manual mode, wherein the status is displayed at the same time that the user is given the opportunity to control the inputs or the outputs by overriding the input sensors. This aspect of the invention allows the user to verify the operation of the entire system through real-time emulation via manual control.

The present invention further provides the ability to set up and run "complex conditionals". In addition to emulation via manual control, the control program provides the ability to let the user set up the system using complex boolean logic condition statements with multiple inputs and multiple outputs, and then verify the operation of the conditional via emulation. Then the user can verify the operation of the system by overriding the input sensor to trigger the chain of events for that conditional to occur, and monitor the status of that output. The program further provides the ability to combine two or more independent and different levels of boolean logic condition statements, and add sophisticated time parameters as conditional statements.

As will be explained below, the input/output (I/O) Bridge device of the present invention simulates the signals produced by the keyboard of a tabulating or computing machine (or a terminal of such a machine) in such a manner that, when the I/O Bridge is connected to the keyboard port of the PC, the PC responds exactly as if keys were actually being typed upon. The I/O Bridge device generates signals corresponding to specific items of data so that the data can be entered directly into the computer.

The I/O Bridge can be used to automate data entry procedures where a human operator would normally take hundreds or thousands of measurements, records them, and then type them on a keyboard for further reduction and analysis by the PC. The I/O Bridge will automatically make the same measurements, then generate keyboard signals identical to those which would have occurred if the human operator had typed the values. The process can therefore be completely automated without changing the tabulating or computing equipment, the equipment's internal software, or other computer operations.

The software program for the PC provides for the sensing, monitoring, and controlling of numerous types of electric devices in a wide variety of applications. The program, named "MASTER CONTROL" (trademark of Ansan Industries, Ltd.), allows the average user to build complex adaptive control system configurations using the I/O Bridge devices which connect to the PC via the keyboard port. The MASTER CONTROL program uses a point-and-click environment to allow the user to readily customize the system, thus allowing both the hardware and the software to perform unlimited applications. For example, a user can utilize the MASTER CONTROL program to create a security monitoring system, an irrigation control system, and a temperature monitoring and control system for the home. All three of these systems can be monitored and controlled from a single computer using a single I/O Bridge device.

Furthermore, one or more I/O driver programs, each called an "INIT", run in the background at the same time that the user is busy with an unrelated application program in the foreground. Similarly, the MASTER CONTROL program can be used to create sophisticated background INITs for monitoring and controlling lab experiments, manufacturing lines, waste management facilities, vehicle dynamics, or even a model railroad. The background programs will also keep a running history file informing the user of any and all changes in the system.

The preferred embodiment utilizes a MACINTOSH brand computer, available from Apple Computer, Inc. The use of the MACINTOSH computer as the CPU for the control system has numerous advantages over traditional monitoring and control system processors by providing the user with graphic "soft control panels", i.e. computer-simulated monitor and control screens using representative graphical symbols or "icons" to monitor and control a wide variety of systems. The primary advantage of using soft control panels is the ability to readily customize the control system for a particular application, e.g., from a security system to a production monitor, or to change the system configuration "on the fly", e.g., to accommodate a faulty sensor Since the computer has a built-in timekeeping capability, the user can easily instruct the system to turn on or off certain devices at predetermined times only on particular days. Furthermore, the PC can be used to make decisions based on several conditions such that the user can specify complex requirements for each application. The program will also log all the events which have occurred.

As an example of the system's flexibility, the user could readily construct a security system which would automatically turn itself on after 10:30 p.m. and turn off after 7:00 a.m. The system would incorporate all of the typical convenience features, such as exit delays (to allow time to get out of the house before the alarm system activates) and entrance delays (to allow time to enter the house to disarm the security system). The system would further allow the user to set up specific conditions for an alarm, e.g., if a window sensor is activated (i.e. the window is opened or broken), the system would wait until another sensor is activated (such as an inside motion sensor) before the alarm is triggered. This will avoid a potential false alarm which would occur, for instance, when a bird hits the window, or when thunder shakes the window. Thus, logic conditionals allow the system to require the activation of any number of sensors in any desired sequence in order to ring the alarm.

Moreover, all events which occur within the system will automatically be stored on disk. The system will actually track a burglar through the house, and store his movement through the house on disk. The system would turn on the lights, sound the alarm, call the police, even signal the user's beeper. However, it can also be monitoring the furnace, watering the lawn, and checking the basement for moisture all at the same time. Furthermore, the system can perform these multiple tasks while the user is working with his favorite spreadsheet program, or even while he is sleeping.

In accordance with another aspect of the present invention, the system further provides the ability to interface the PC, via the keyboard port, with a wireless or AC power-line transmission media, such as an infrared (I/R), radio frequency (RF), or AC power line carrier (X-10) transmission link. The interface system of the present invention inputs status information from remotely-located electrically-controlled devices, modulates the status information with a carrier signal for transmission, transmits the modulated carrier signal via the I/R, RF, or power-line transmission link, receives the modulated carrier signal, and then demodulates it to provide the status signal which is coupled to the personal computer using only the keyboard port. Depending upon the particular application, the interface may also translate the status signal into a keyboard code signal which emulates individual sequential keyboard character keystroke information, such that the information can be directly input to an application program. The interface device also executes instructions from the PC to provide control signals, modulates the control signals onto the wireless or AC power-line transmission media, and receives, demodulates, and outputs the signals to the electrically-controlled device. In this manner, the system provides the user with the ability to monitor the changing conditions in real-world devices in real time, and control the devices in accordance with those changes. This is particularly important when the user desires that the remotely-located equipment be controlled remotely from multiple locations, thus providing a monitor and control system having distributed intelligence. All of this is accomplished without having to hard-wire the system or dedicate a serial port of the PC to the system.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description, when taken in conjunction with the accompanying drawings, in which:

FIGS. 3A, 3B, 3C, 3D, 3E, 3F, 3G, 3H, 3I, 3J, 3K and 3L are pictorial representations of screen displays presented on the personal computer display monitor for user interface, typically in a windowing environment having pull-down menus accessible with a mouse;

FIGS. 6A, 6B, 6C, 6D, 6E, and 6F are software program flowcharts illustrating the specific sequence of operations performed by the CPU of the personal computer in generating the screen displays of FIGS. 3A-3K in accordance with the practice of the preferred embodiment of the present invention;

DETAILED DESCRIPTION OF THE INVENTION

Figure 1:
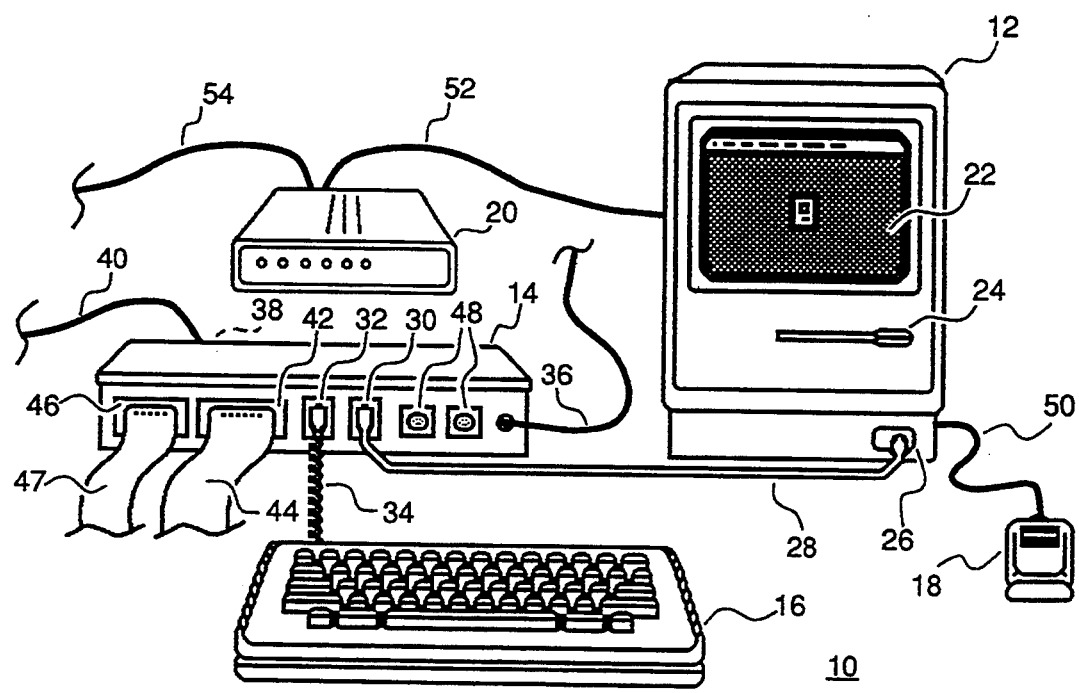
FIG. 1 is a pictorial representation of the main components included within a preferred embodiment of the peripheral data acquisition, monitor, and adaptive control system of the present invention.

Referring now to FIG. 1, there is shown a pictorial representation of the main components of a preferred embodiment of the peripheral data acquisition, monitor, and adaptive control system 10 in accordance with the present invention. The main system components include a personal computer 12, an I/O Bridge device 14, and a keyboard 16. The PC 12 may also include a mouse device 18 and a modem 20 if desired. The rear panel of the I/O Bridge device 14 is shown here for purposes of illustrating the interconnections.

In the preferred embodiment of the system 10, the host PC 12 is one of the family of MACINTOSH brand computers, i.e., the MACINTOSH PLUS, MACINTOSH SE, MACINTOSH II, MACINTOSH Portable, etc., available from Apple Computer, Inc., Cupertino, Calif. The MACINTOSH computer was chosen in the preferred embodiment because it presents an easy-to-use graphical interface to the user. However, other personal computers, even DOS-based machines, can be programmed to provide the features of the present invention. The PC shown in FIG. 1 is a MACINTOSH PLUS computer having a display screen 22 with a cursor indicator controlled by a mouse 18, and a floppy disk drive 24 adapted for 3½ inch floppy disks. The PC 12 also has a keyboard port 26, which is normally adapted to connect directly to the keyboard 16. However, in this embodiment of the present invention, the keyboard 16 is coupled to the PC 12 through the I/O Bridge device 14. This is accomplished using an extension cable 28 connected between the keyboard port 26 and a first port 30 of the I/O Bridge 14, while a second port 32 of the I/O Bridge is connected to the cable 34 from the keyboard 16.

The I/O Bridge device 14 provides the interface between the PC, the keyboard, and any external electronically-controlled devices which are being monitored and controlled. The I/O Bridge 14 is powered via a 9 volt DC, 500 milliamp power supply (not shown) connected to the rear panel of the I/O Bridge via power cable 36. The front panel of the I/O Bridge 14 also includes an analog input port 38, which is connected via a coaxial cable 40 to a peripheral electronically-controlled device which would provide an analog input signal. An analog output port is also available on the front panel of the I/O Bridge 14.

A digital interface connector 42, also located on the rear panel, provides the user with 8 digital input channels and 8 digital output channels via a cable 44, which would be connected to other electronically-controlled devices being monitored and controlled using digital signals. An analog interface connector 46 provides the user with 8 analog input channels via cable 47 if desired. Two bus connector ports 48 are also available on the rear panel to allow the user to interface directly to the APPLE DESKTOP BUS (a trademark of Apple Computer, Inc.) on MACINTOSH SE, MACINTOSH II, MACINTOSH Portables, and newer MACINTOSH models. A compete description of the I/O Bridge device 14 is set forth in U.S. Pat. No. 5,099,444, entitled "Peripheral Data Acquisition, Transmission, and Control Device."

Continuing with FIG. 1, the PC 12 further includes a port for connecting to the mouse 18 via cable 50, as well as a serial port for connection to a modem 20 via cable 52 such that the PC can interface directly to the telephone lines 54. Of course, the modem may not be required in all applications.

Figure 2:
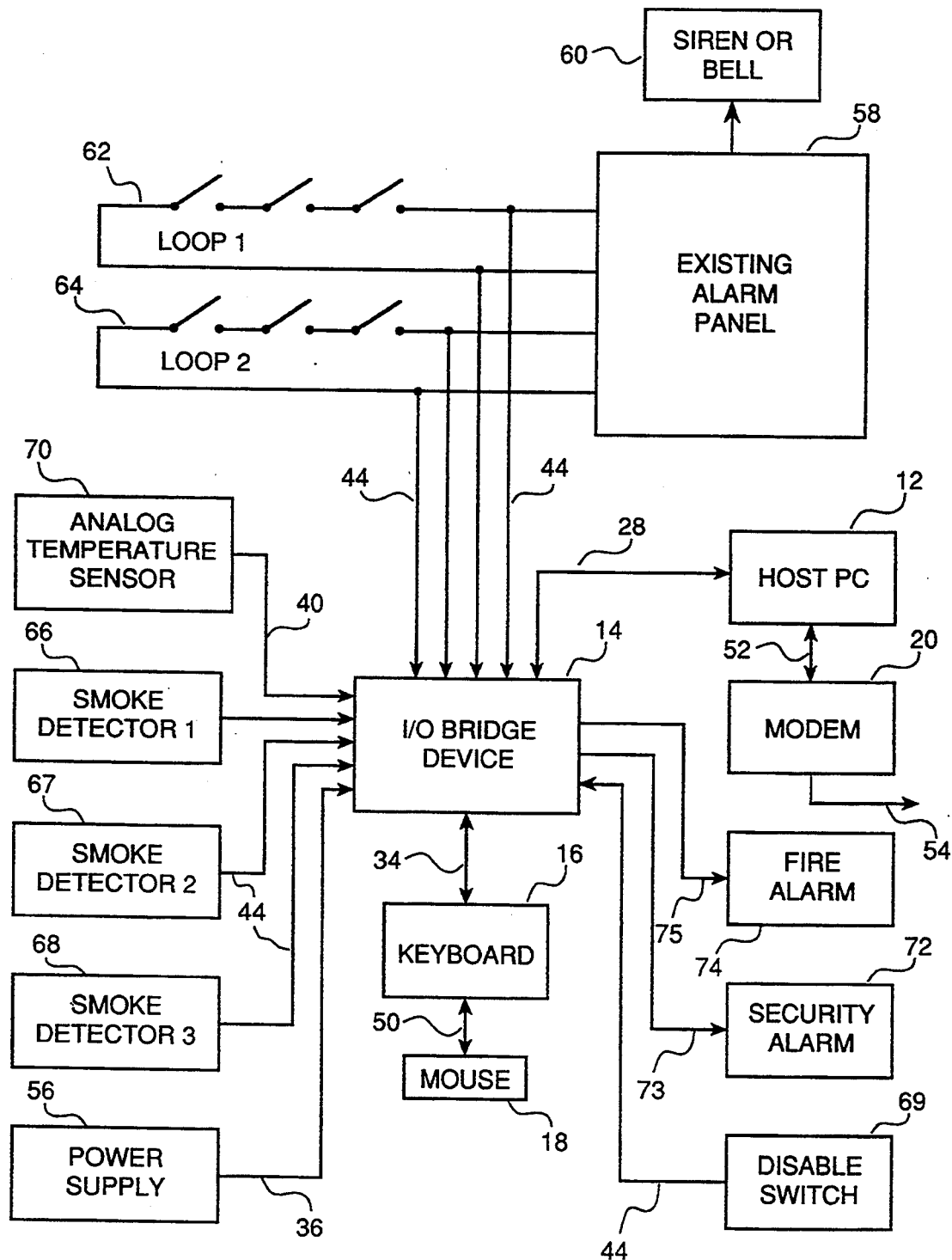
FIG. 2 is a general block diagram of a representative peripheral data acquisition, monitor, and adaptive control system used for a fire and security alarm system in a building.

FIG. 2 is a general block diagram of a representative peripheral data acquisition, monitor, and adaptive control system used for a fire and security alarm system in a building. This figure sets forth a typical example of how the system of the present invention would be configured to an existing alarm panel. The host PC 12 is coupled to the I/O Bridge device 14, the keyboard 16, the mouse 18, and the modem 20, as shown in the previous figure. Note, however, that a separate power supply 56, is used to power the I/O Bridge device 14. Also note that the mouse 18 is shown connected to the keyboard 16 instead of the PC 12, which would be the case for the MACINTOSH II computer.

In the example of FIG. 2, the existing alarm panel 58 is configured to activate a siren or bell 60 whenever either one of the 2-wire loops 62 or 64 is broken. This would occur when any one of the sensor switches in either one of the loops is opened, due to a fire or a burglary, for example. The digital inputs to the I/O Bridge device 14 are connected via wires 44 to the loops as shown. Furthermore, the outputs of different smoke detectors 66, 67, and 68, each located at different positions within the building, are also connected to the same digital interface connector of the I/O Bridge via wires 44. A local disable switch 69 may also be connected to the I/O Bridge such that, for example, a security guard or fireman could turn off the alarm. If desired, an analog temperature sensor 70 could be connected to the analog input port of the I/O Bridge 14 via cable 40. The I/O Bridge outputs would then be used to control a security alarm 72 and/or a fire alarm 74, connected via wires 73 and 75, respectively, to the digital output ports. Using this configuration, the host PC 12 can monitor the inputs to the alarm panel 58, detect for smoke at different locations, measure the room temperature, and dial out over the telephone lines using the modem 20 to send information to a remote location. As will be seen below, the PC will also log all events to disk using a time-stamp format. The software program configuration for the system of FIG. 2 will be described below in conjunction with the screen display illustrated in FIG. 3A.

FIGS. 3A-3L are pictorial representations of screen displays presented on the PC display monitor for user interface. When using the MACINTOSH brand computers, the screen displays are presented in a windowing environment having pull-down menus accessible with a mouse. As known in the art, the cursor which appears on the screen is displayed as a pointer, and its movement is controlled by moving the mouse. The user can perform input selections by simply moving the pointer to the desired display box or icon and clicking the mouse in much the same manner as pushing a button. If a control or scroll bar is clicked and dragged, its position on the display screen will move in accordance with the relative position of the mouse.

Figure 3A:
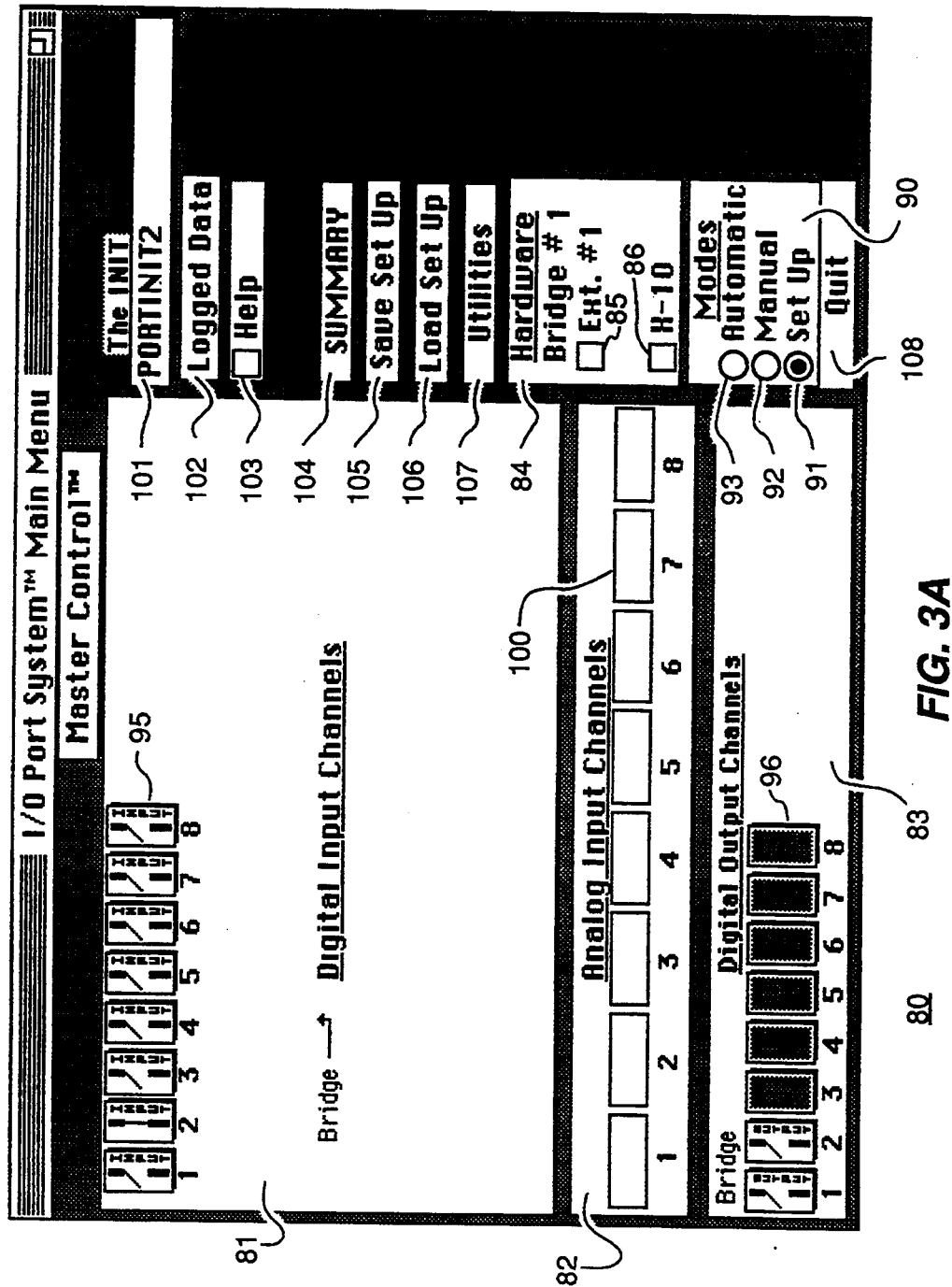

FIG. 3A is the main menu or MASTER CONTROL panel 80, which appears when the user first loads the program and opens the main menu stack. The MASTER CONTROL panel 80 illustrates the hardware configuration of the particular application. Three different types of input/output channels are used, and their individual icons are grouped by their types of channels. Digital inputs, located in display box 81, are used in applications where an electronic device digital sensor produces a monitoring signal which is either on or off, true or false, open or closed, etc. Analog inputs, located in display box 82, are used in applications where the analog sensors provide inputs having a specific reading within a range of values, typically measured in millivolts. Digital outputs, located in display box 83, are used to turn on or off any electrically-operated device.

The system of the preferred embodiment is capable of monitoring 8 digital inputs using one I/O Bridge device 14. Digital interface multiplexers, called "Extenders", can optionally be used to multiplex the 8 digital input channels of a single I/O Bridge device into 32 input channels. The digital Extender is described in U.S. Pat. No. 5,099,444, which is incorporated herein by reference. If one digital Extender has been added, the system can monitor up to 32 digital inputs. If 2 Extenders are connected to the I/O Bridge, 64 digital inputs can be monitored. Each I/O Bridge will also allow the system to monitor up to 8 analog input channels. Finally, a single I/O Bridge allows the user to control up to 8 digital output channels. If a digital Extender is connected, up to 8 digital output channels can still be controlled, but the channels will be controlled using relay outputs. If 2 Digital Extenders are connected to the Bridge, the user can control up to 16 digital outputs.

The system hardware configuration is initially set up using the display box 84 labeled "Hardware". One INIT should be loaded for each I/O Bridge connected to the system. A particular INIT can be selected by the MASTER CONTROL program in the Set Up Mode. If one digital Extender is added to I/O Bridge #1, then the user must configure the system as such by selecting Ext. #1 by clicking on the button 85 with the mouse. When this is done, the 8 digital inputs in display box 81 will disappear and 32 digital inputs will appear in their place. If two digital Extenders are selected, then a total of 64 digital inputs and 16 relay outputs will appear. If X-10 outputs (described below) are desired, the user would click on button 86.

As seen in the lower right portion of FIG. 3A, the MASTER CONTROL panel 80 includes a Mode select box 90 which offers the user a choice of 3 modes: Set Up Mode, Manual Mode, and Automatic Mode.

The Set Up Mode button 91 allows the user to configure the system to a particular application. In this mode, the user can enable or disable any input or output channel by using the mouse to point-and-click on the various channel icons. Each of the input and output channels is accessible by either clicking on the corresponding channel icon or by using the pull-down menus.

The Manual Mode button 92 is used to view and control the system as it is running. This gives a complete picture of the current status of all inputs and outputs for the selected I/O Bridge. As decisions are being made by the program, the computer will beep, and the user will see the icons for the relay or digital outputs change on the screen in real time.

The Manual Mode further allows the user to force a digital input or output channel to its opposite state, and allows the user to enter a specific analog input reading. The forced channels are processed by the background program INIT just as if they had been received by the I/O Bridge. This allows the user to test the chain of events which should occur when a particular input is sensed. Even this manual override simulation of the input sensor changing causes the series of beeps to occur, the appropriate window to pop up, and an output to be activated to the electronically-controlled device. Therefore, this feature of the Manual Mode is frequently used to test the setup and ensure that the newly-configured system meets particular specifications. Once the system has been tested, the user may exit the MASTER CONTROL program and the I/O Bridge will function in the background. After the system has been placed in operation, the Manual Mode is also very helpful in troubleshooting.

The Automatic Mode, which is selected using button 93, is used to view the user setup as it is running. The Automatic Mode does not permit manual control of inputs or outputs. Instead, the MASTER CONTROL panel provides the user with a complete picture of all the signals which are being received at the I/O Bridge, the decisions being made, and the output relay or digital output icons changing.

More specifically, in the Set Up Mode, the digital input channels are first configured when the user selects a specific input channel by clicking on the selected digital input channel icon 95. The program will then take the user to the information window for that input, which will allow the user to specify the name of the sensor connected to the input channel, determine if it is normally open or closed, and set specific properties for a particular input. This information window will be described below as FIGS. 3C and 3D. Note that the user can also get information on the desired digital input channel by using the pull-down menu.

The analog input channels are set up in similar manner, where one of the analog input channel icons 100 is selected and an information window (FIG. 3E) appears for that input. This window allows the user to specify the name of the sensor which will be connected to the input channel, determine the calibration slope and offset, etc.

Clicking on the desired digital output channel icon 96 in the Set Up Mode will take the user to the information window (FIG. 3H) for that output. This will allow the user to specify the name of the device which will be connected to the output channel, to determine if it is normally open or closed, and to set the specific properties of that digital output channel. Note that the input and output icons are completely shaded and the text is removed when disabled, as illustrated for digital output icons #3–#8.

In the Manual Mode, the program will allow the user to manually force a digital input open or closed by clicking on the desired input channel icon 95. This feature is very useful for system testing, since it allows the computer to respond to the forced input channel as if it had actually come from the I/O Bridge. Therefore, to test the entire system configuration, one does not have to physically open and close every input channel at the I/O Bridge devices.

The analog input channel icons 100 operate in a similar manner, but allow the user to manually force an analog input to a specific reading by selecting the desired input channel and entering an analog value in response to the prompt. This feature is also very useful for system testing, because it allows the computer to respond to the manually-entered value without having to connect a proper voltage source to the analog input channel at the I/O Bridge.

The output channels also permit the user to manually force a digital output open or closed by clicking on the desired output channel icon 96. Therefore, to test each individual output from the I/O Bridge, the user can bypass the entire input and condition statement scheme previously set up and directly test each output channel individually.

In the Automatic Mode, the program will automatically update the digital input channel icons 95 by communicating with the INIT driver program which runs in the background and constantly interacts with the I/O Bridge. Constant updating of the screen 80 will show the functional status of each electronically-controlled device connected to the I/O Bridge. When any digital channel has changed to its opposite state, i.e., a normally closed channel is opened and vice-versa, that channel icon will be highlighted or colored to show the user that the input is in the opposite state. The analog channel icons 100 will display the analog reading, as corrected by the slope and offset. Furthermore, when the analog channel is in its true state, i.e., within or outside of a specified range, the icon 100 will be highlighted or colored on the display. However, in the automatic mode, selecting and clicking on any channel icon will have no effect.

Again referring to the screen display of FIG. 3A, the INIT field 101 shows the name of the INIT driver program which the MASTER CONTROL program is referring to. Typically, one INIT is used to control one I/O Bridge device. However, multiple INITs can run simultaneously in the background to control more than one I/O Bridge. Clicking on field 101 will allow the user to choose which INIT the display screen is referring to. The INITs may be duplicated, renamed, have different I/O Bridge addresses, and different set up files linked to each INIT. The user must reboot before the computer will recognize the INITs. The INITs which the user would like the system to recognize must be in the user's system folder.

The Logged Data button 102 automatically opens the MASTER CONTROL Desk Accessory to display the last 200 events which were logged from the INIT, as will be seen in FIG. 3L. The Help button 103 provides help commands for most functions of the MASTER CONTROL program. The Summary button 104 is used to get an overall picture (FIG. 3J) of the I/O channels for the particular system setup. The Summary window will display the names of the input channels which are being used, and will give the user a detailed description of the I/O channels. The user can also save the system configuration information to a disk text file or load a previous set up text file with the Save Set Up button 105, and the Load Set Up button 106. The Utilities button 107 allows the user to do several disk oriented functions, such as compact the stacks, analyze a data file, change the address of the I/O Bridges, add additional I/O Bridges, etc. Finally, the Quit button 108 is used to exit the MASTER CONTROL program.

Figure 3B:
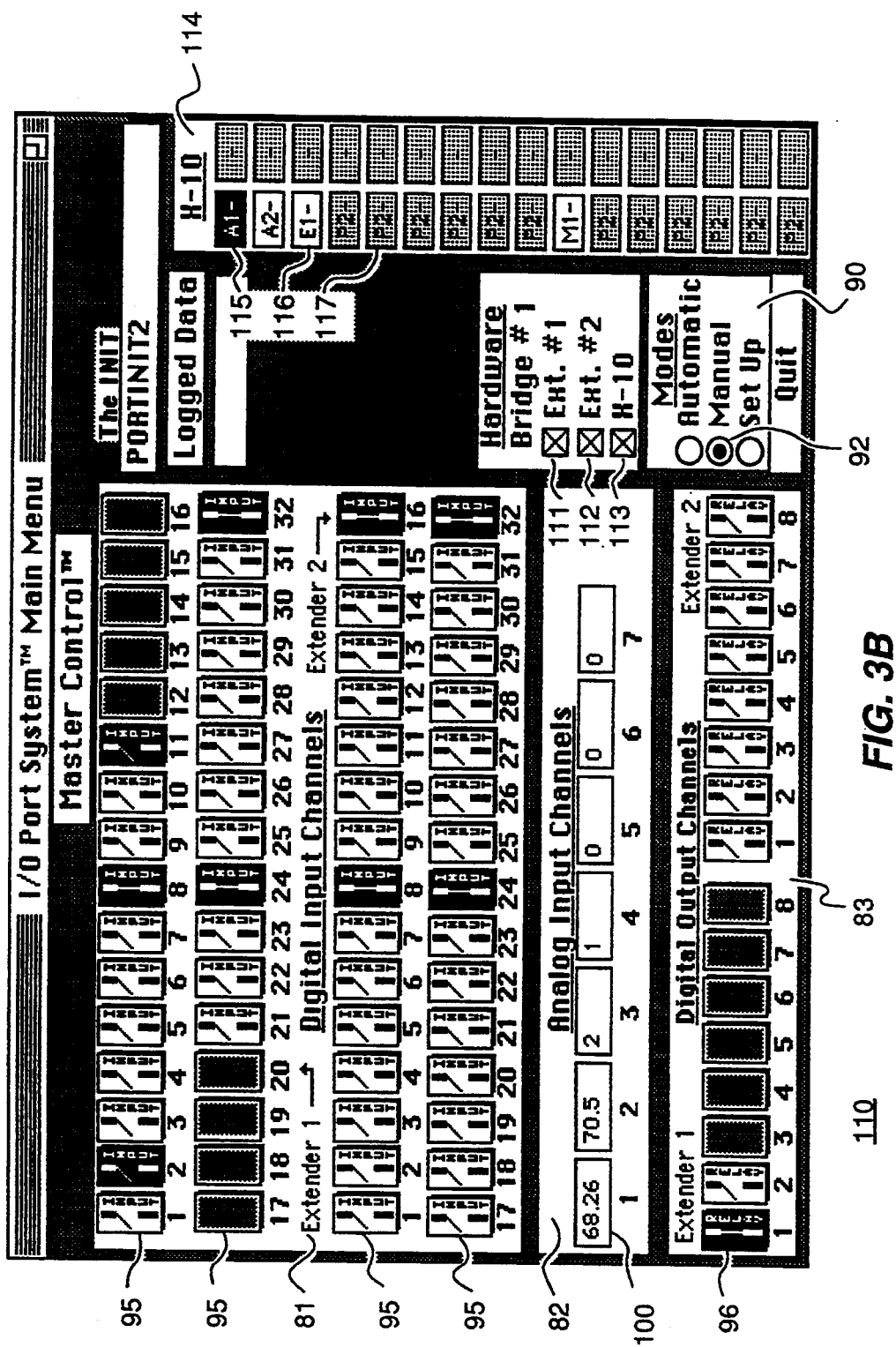

FIG. 3B illustrates a display screen 110 configured for an alternate embodiment of the present invention having a much more complex system configuration. Note that the Hardware display box 84 indicates that a first Extender 111 and a second Extender 112 is configured to multiplex the input channels, and that a third indicator button 113 shows that X-10 outputs have been configured into the system. As is known in the art, "X-10" is the standard code format for power line carrier transmission, such as used in lamp and appliance control modules manufactured by X-10 (U.S.A.) Inc., and sold by Sears, Roebuck and Company, Radio Shack, and others. Once the X-10 indicator button 113 has been activated, then the X-10 display box 114 becomes active to present an icon for each X-10 output. Each X-10 module is represented by an icon having its configuration code displayed thereon. Note that the X-10 icon 115 has been colored or reverse-video shaded to indicate that it has changed from its normal state, X-10 icon 116 is shown in its normal state, and X-10 icon 117 is shaded to indicate that it is disabled, i.e., inactive and not connected to the system.

Instead of having 8 digital input channels shown in display box 81, the alternative system configuration of FIG. 3B utilizes two Extenders to multiplex the eight digital input channels of a single I/O Bridge device into 64 input channels 95. Since this display screen is shown in the Manual Mode, the real-time functional status of each channel is indicated to the user. Accordingly, the display screen icon for digital input channel #2 of Extender #1 appears in reverse video to indicate that it has changed from its normal state. As shown in the previous figure, any disabled icons, such as digital input channel #12 of Extender #1, are shaded to indicate that they are inactive.

Eight analog input channels 100 have been shown in display box 82, and their calibrated analog values appear in each of the 8 input channel boxes. For example, analog input channel #2 would correspond to 70.5 degrees Fahrenheit if the temperature sensor for that analog input channel has been calibrated to read in degrees Fahrenheit, as will be explained below.

Sixteen digital output channels 96 are provided by two digital Extenders, as shown in display box 83. Again, note that the icon for digital output channel #1 of Extender #1 is colored to indicate that the relay is presently not in its normal state.

Figure 3C:
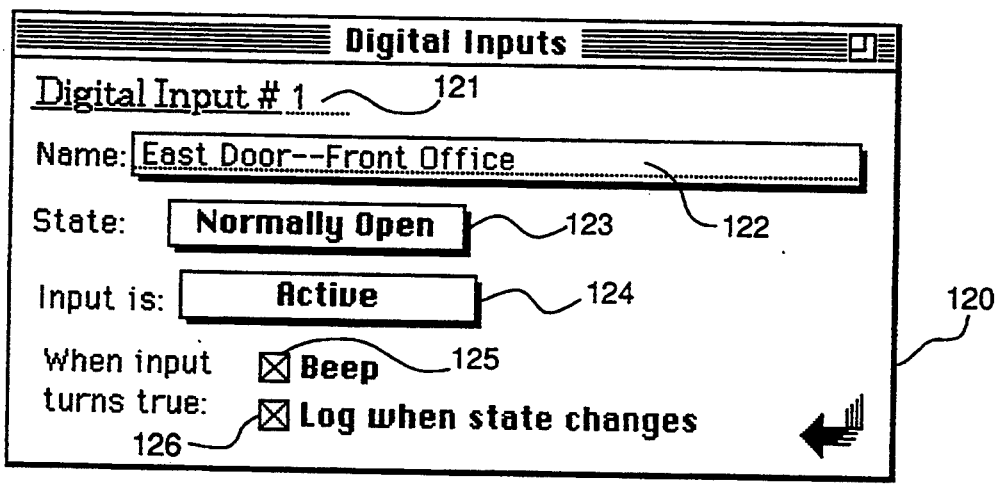
Figure 3D:
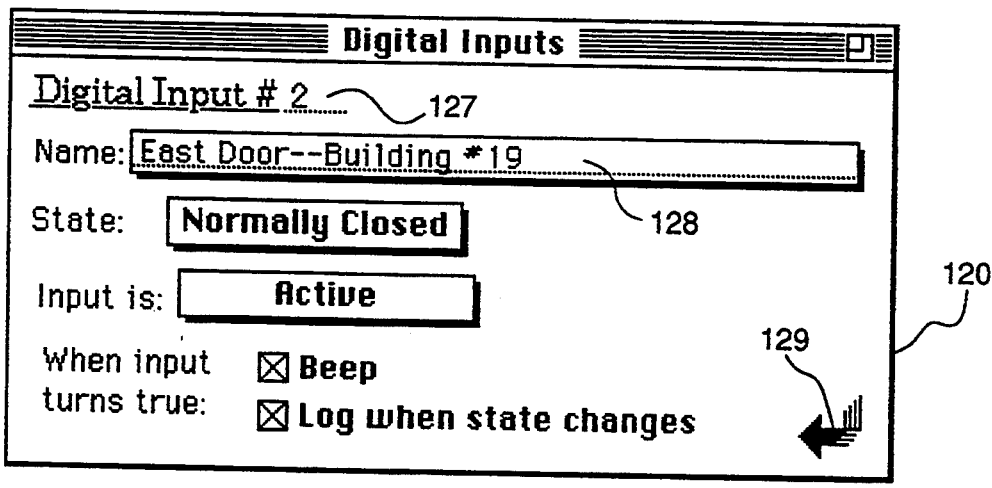

FIGS. 3C and 3D illustrate screen display windows 120 that pop up whenever a digital input icon 95 is selected by the user. The Digital Input window 120 provides the user with the ability to individually name and keep track of the names, functions, and active/inactive status of each of the digital input sensors being used. The first field 121 is the program's (reference) name for that digital input channel. The next field 122 allows the user to enter a user's name for Digital Input #1, e.g., "East Door—Front Office" for a door sensor of a security system. The State button 123 is used to indicate whether a normally open or normally closed switch state is desired. If the particular input channel is not going to be used, the user may click the button 124 and disable the input, wherein the word "Inactive" will appear in the button 124. This will tell the I/O Bridge to ignore the input. If the user would like the computer to beep when the input changes, button 125 is selected. If the user would like to keep a running log of events each time this digital input turns true, then button 126 is selected such that the INIT will update a record of events file upon each occurrence of a change in state.

FIG. 3D illustrates another Digital Input window 120 for digital input #2. In this case, however, digital input channel #2 is connected to the East Door of Building #19, and the name field 128 has appropriately been changed. In this way, the record of events will present the user with information as to the input channel's location and/or functional status. The arrow 129 at the lower right of the window allows the user to return to the main menu.

Figure 3E:
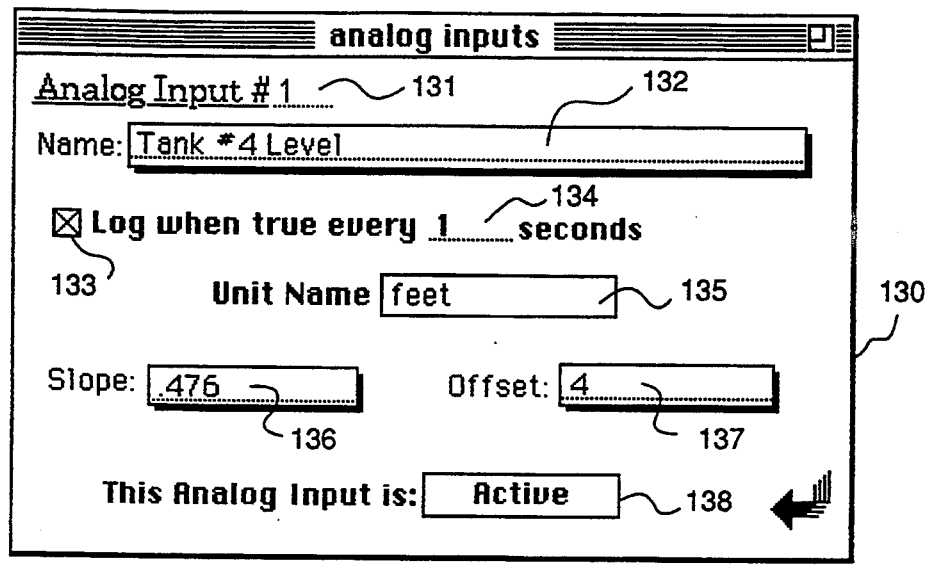

Turning now to FIG. 3E, an analog input window 130 is shown. This window appears whenever the user selects a particular analog input channel 100 to get specific information about that channel. Once again the user can give the input a name using field 132 to help the user configure the system. Another button 133, labeled "Log When True", allows the user to set the time interval at 134 between logged values, and is activated whenever the user would like to monitor specific values over a period of time. If button 133 is activated, the analog input window instructs the program to beep and store the event when it turns true. Field 135, labeled "Unit Name", allows the user to choose the measurement units which will be logged after each value. Thus, if the user is logging temperature, field 135 may be used to instruct the measurement reading to be logged as 10.0° C. (degrees Celsius) instead of 10.0.

The user may also give each analog input a slope 136 and offset 137. By specifying a slope and offset, the analog reading will be scaled and will appear as a calibrated value. Slope and offset are derived from the formula:

$$Y = mX + b$$

where m is the slope and b is the offset. This formula is used to convert readings from a working scale of 0–250, which corresponds to an actual analog input range of 0–5 Volts DC, into readings which take into account the type of sensors used. In other words, scaling the analog input values allows the system to display and log the analog values in terms that are meaningful to the user, i.e., degrees Fahrenheit, pH, molarity, percent volume, DC millivolts, etc.

To calculate the slope and offset for a particular analog input sensor, the user will need two calibration data points. For the example of a wide-range temperature sensor, a first measurement reading should be obtained when the sensor is submerged in boiling water (approximately 212° F. or 100° C.), and a second reading obtained when the sensor is in an ice bath (approximately 32° F. or 0° C.). When obtaining these readings, the slope field 136 for the analog input channel is initially set to 1, and the offset field 137 is set to 0. Now the user can convert the calibration readings so that the MASTER CONTROL program will present them in degrees Fahrenheit or Celsius. The following formula is used to derive the slope:

$$m = \frac{(Y_2 - Y_1)}{(X_2 - X_1)}$$

For example, say that a user places the temperature probe into a boiling pot of water and obtains a raw analog input value reading of 190. Next the sensor is placed in an ice bath and a reading of 60 is obtained. Using 100° C. and 0° C. as $Y_2$ and $Y_1$, respectively, entering these values into the formula provides:

$$m = \frac{(100° C. - 0° C.)}{(190 - 60)} = \frac{100}{130} = 0.769$$

Therefore the slope m is 0.769. Now the offset b can be calculated by applying one of the raw analog readings and the calculated slope to the formula:

$$b = Y - mX$$

or in this example:

$$b = 100 - (0.769 \times 190) = 100 - 146.11 = -46.11$$

Therefore the offset b is −46.11. If the user enters these values into the slope and offset fields 136 and 137 of the analog input window 130, the readings from the temperature sensor will be returned as degrees Celsius.

If the user would like to incorporate analog input channels into the list of conditional statements which must be satisfied before an output will be activated, the user must specify the analog conditions. This is accomplished by choosing the Analog Conditional pull-down menu from the Main Menu.

Figure 3F:
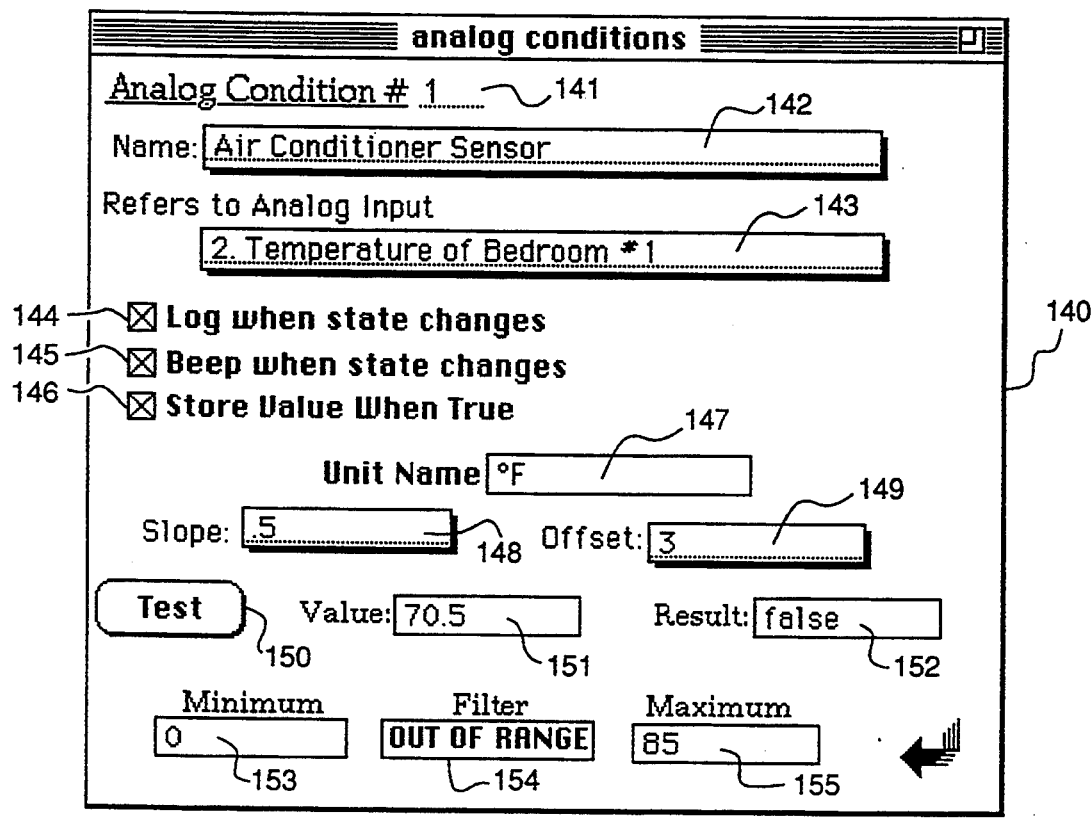

FIG. 3F illustrates the analog condition window 140. This window will allow the user to specify a name for the analog condition, and will allow the user to set up various parameters by which the program will test the analog input. A name field 142 identifies the condition, and an analog input field 143 specifies which analog input the analog condition will be referring to. Buttons 144 and 145 are used to log and indicate changes of the resultant state of the conditional. Button 146 is used to store the analog value on disk when the condition is true. The Unit Name field 147, the Slope field 148, and the Offset field 149 will automatically be copied from the appropriate Analog Input channel window 130. If these fields remain blank after the user selects the analog input from the pull-down menu, then the user should go back to the main menu and specify this information on the analog input channel window 130.

Next, the user will be able to specify minimum and maximum values which will be used to build the analog condition. Once the minimum value 153 and the maximum value 155 have been chosen, the user will need to choose a filter by clicking on the button 154 below the word Filter. This will give the user three choices: In Range, Out of Range, and No Filter (or None). Choosing the In Range filter means that if the scaled reading from the analog input channel falls between the specified minimum and maximum values, then the analog condition will be true. On the other hand, if the user has specified the Out of Range filter, then the analog condition will be true when the scaled reading from the specified analog input falls outside of the minimum and maximum values. Choosing No Filter signifies that the analog condition will never be met.

Once the user has finished building the analog condition, the Test button 150 can be used to take a raw reading from the selected analog input channel, scale the reading using the slope and offset values, put the scaled value in the Value field 151, compare it to the maximum and minimum values, test its value against the selected filter, and put a true or false into the Result field 152. In this way, the analog condition can readily be tested without physically changing the analog input sensor.

Figure 3G:
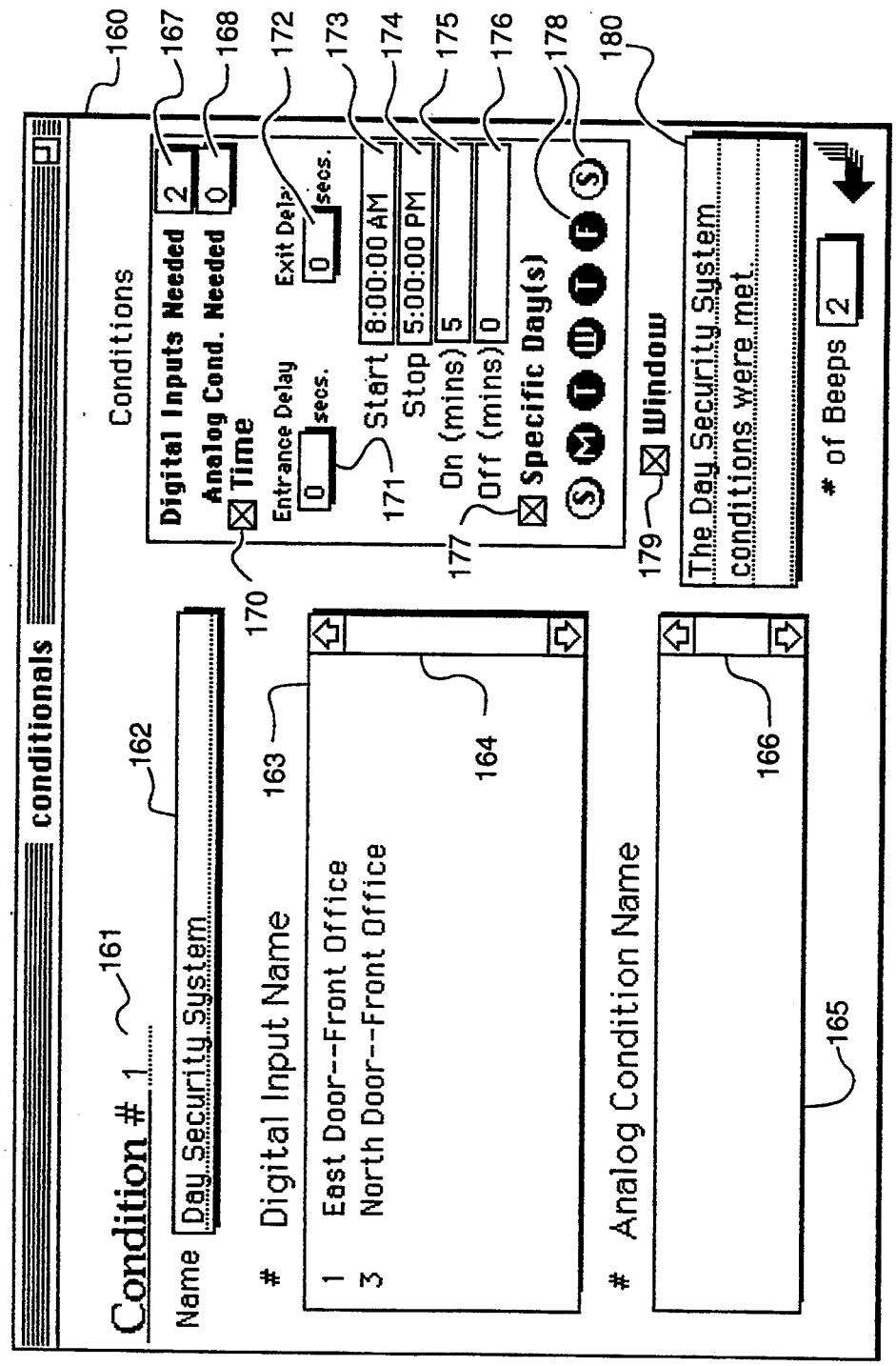

FIG. 3G is the display screen for the conditionals window 160. As mentioned above, conditionals are logic statements executed by the computer to determine whether or not an output should change. Pulling down the conditionals menu from the Main Menu bar will bring up the screen shown in FIG. 3G.

Once again, the user can enter a name in field 162 for the condition which the user will be using. Next, the user can choose the digital input channels from the pull-down menu which are to be monitored for this particular condition. This is accomplished by selecting a particular digital input from the pull-down menu. Digital inputs which have been selected in this manner will appear in display box 163. If more inputs are selected than can be shown in the display box 163, then the scroll bar 164 can be used to scroll through the list. The user can then decide how many of the digital inputs which have just been specified are required to make the condition true. This number is entered into field 167 labeled "Digital Inputs Needed". For example, the user may have 6 digital inputs in a security system, but the user may only want to have any one of the six be activated in order to meet the requirements for the condition. To give the system a higher level of redundancy, the user may wish to specify two of the six so that at least two sensors must be activated in order to ring a burglar alarm.

If analog channels are used, the user will have to specify the analog conditions in window 140 before linking them to a conditional in window 160. Once built, the analog conditions can be linked to the conditional by selecting the desired analog condition from the pull-down menu available for this screen. Just as with digital inputs, the user may specify the number of analog conditions required, and enter that number in field 168 labeled "Analog Cond. (Condition) Needed".

If the user would like the conditional to be active during a specific time period, the user can select the Time button 170. This will allow the user to enter the time of day, as well as specific days of the week during which the condition will be true, assuming all of the other parameters were met. More specifically, the Entrance Delay field 171, used in security systems, allows the security guard to deactivate the alarm within a specific time interval after entering a building. Similarly, the Exit Delay field 172 allows for a specified time to get out of the building before the alarm is activated.

The Start time field 173 specifies the time of day to start controlling the digital output channel and/or X-10 output. The Stop time field 174 specifies the time of day to stop controlling the digital output channel. If the user specifies an On time in field 175 and an Off time in field 176, the output will turn on for the on time duration, and off for the off time duration. It will continue to cycle in this manner from the Start time until the Stop time is reached. For example, if the user is controlling a lawn sprinkling system in order to avoid watering bans, the user can set a start time to 12:30 a.m. and set the Stop time to 7:30 a.m. to let the sprinkling system water only during the night. The user can also give the On time a value of 5 minutes and the Off time a value of 12 minutes, to enable the repetitive cycling feature. Thus, at 12:30 a.m. the sprinkling system will turn on for 5 minutes, then off for 12 minutes, then on for 5 minutes, then off for 12 minutes, etc., until 7:30 a.m., when it will turn the sprinkling system off. If the Specific Day button 177 was selected, the output will be activated only on the days specified using the day buttons 178. This is common in sprinkler system applications, when the user might want to water the lawn only on Monday, Wednesday, and Friday. If the alert window button 179 is selected, then the alert message can be entered in field 180.

Figure 3H:
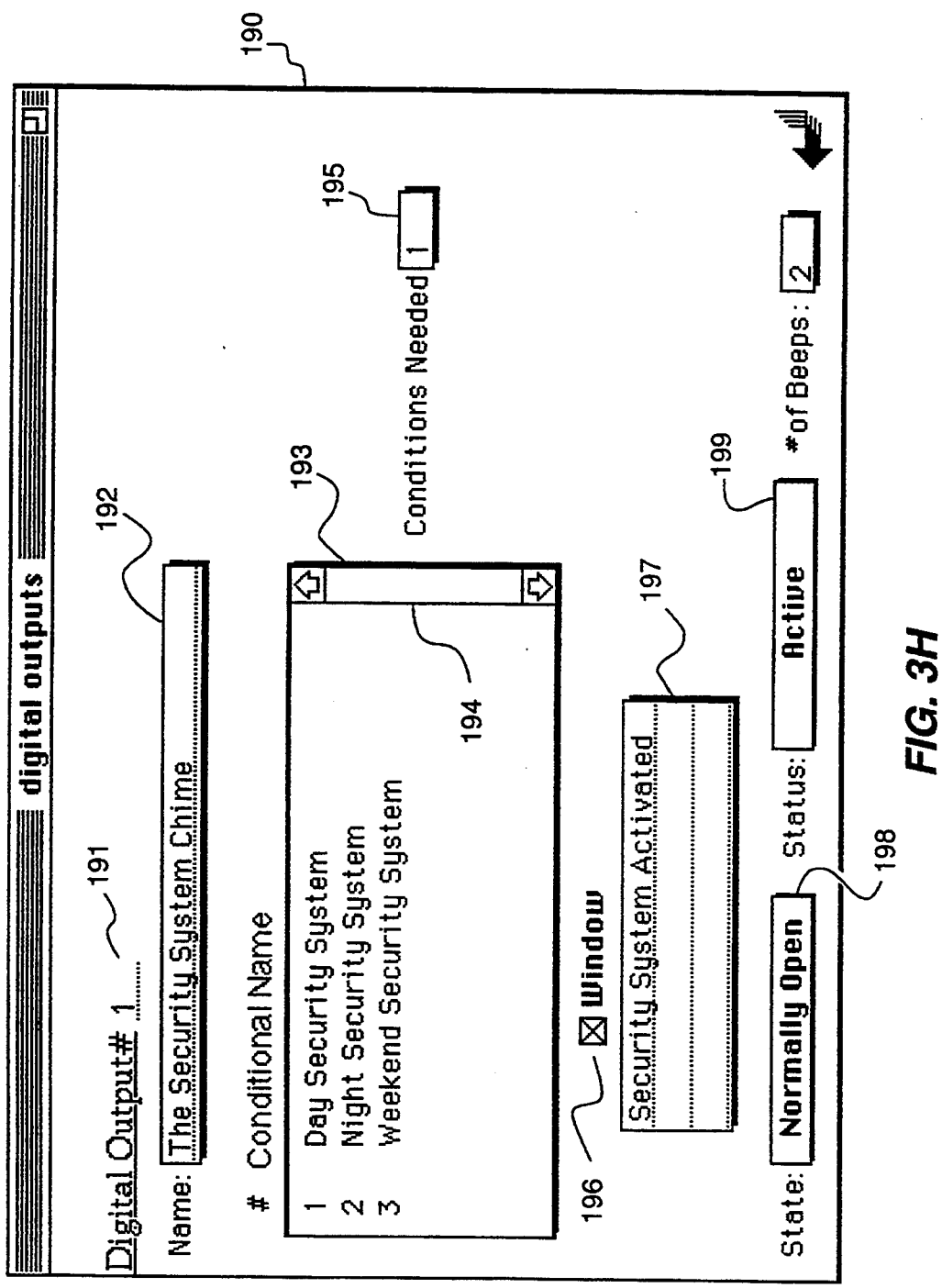

The display screen of FIG. 3H is used to set the digital output parameters. The digital output window 190 again allows the user to name the specified output channel field 192, and choose the conditionals which will be required to make the output channel true. The conditionals appearing in the display box 193 are entered and removed utilizing a corresponding pull-down menu by selecting or deselecting the conditional which will be required. The conditionals in the list 193 can be scrolled using control 194. Once the user has specified the conditionals, field 195, labeled "Conditions Needed", is used to further specify the logic decisions. The number which the user enters in field 195 is the number of conditionals (within the specified list) which must be true in order for the digital output to turn true. For example, if field 195 contained the number 2 and if three conditionals were listed in display box 193, then if any two conditionals from the list of three conditionals turn true, the digital output will be true. This method of determining conditionals permits the MASTER CONTROL program to accommodate very sophisticated boolean logic expressions in a manner that is very user-friendly and particularly easy to understand.

When the Window button 196 is selected, the MASTER CONTROL program instructs the background INIT program to interrupt the application program which is being run in the foreground whenever the state of the digital output changes. Upon this interrupt, an Alert window is displayed having the text message which is entered by the user in field 197. The Alert window also identifies the particular INIT that created the message, the I/O Bridge number, the channel number, etc. Hence, the Alert window operates to display the functional status of the I/O channels in real time, even during the Automatic Mode and Manual Mode of the MASTER CONTROL program. However, in the preferred embodiment, the INIT does not show this functional status during the Set Up mode.

The State button 198 is used to determine whether the normal state of the digital output is to be normally open (n.o.) or normally closed (n.c.). The Status button 199 determines whether the digital output is active or inactive.

Figure 3I:
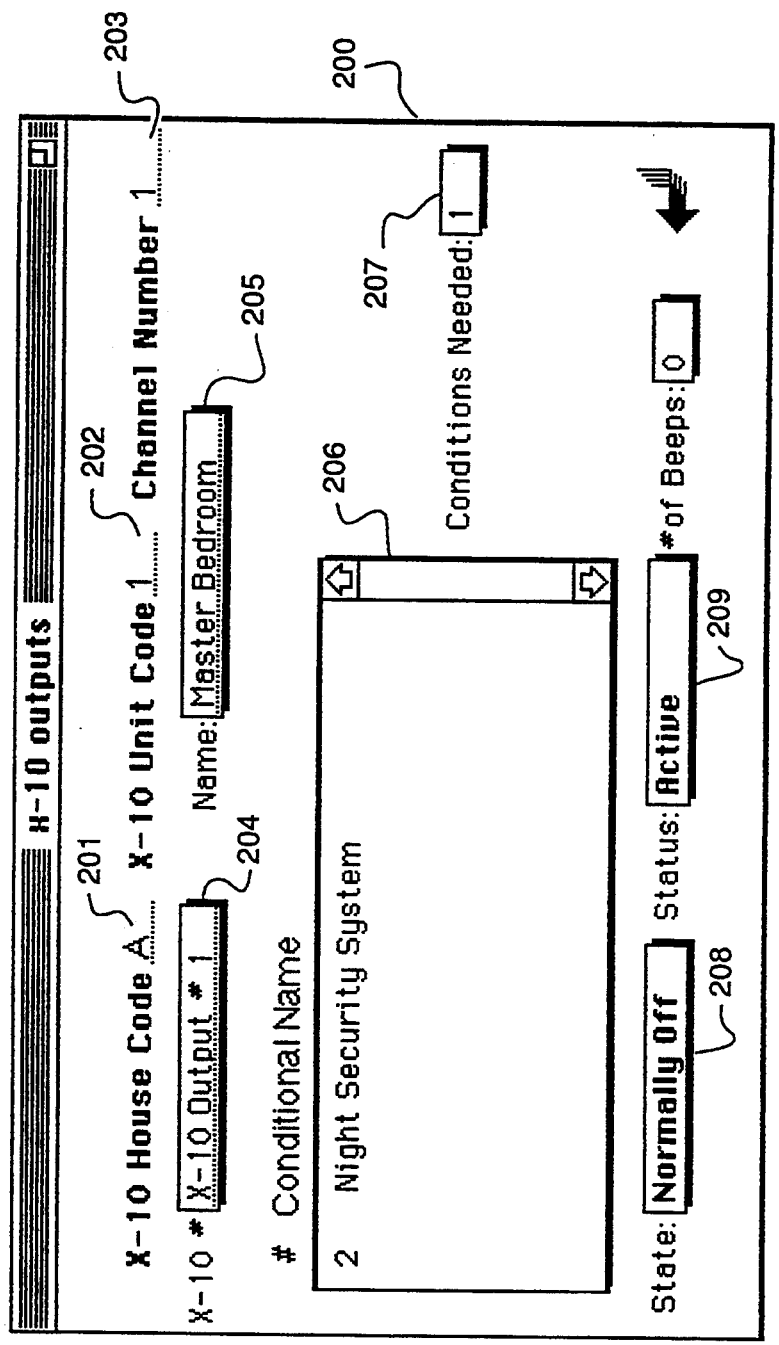

The X-10 output window 200 shown in FIG. 3I operates in much the same manner as the digital output display screen 190 of FIG. 3H, described above. The X-10 house code and unit code are entered into fields 201 and 202, respectively, and the X-10 channel number in field 203. The MASTER CONTROL program automatically enters the X-10 reference name in field 204, but the user can choose a functional name for the X-10 output channel in field 205.

The list of conditionals appears in display box 206, and can be edited by pulling down the corresponding menu and selecting one or more of the conditionals which will be required. Again, the Conditions Needed field 207 sets the number of listed conditionals which must be satisfied before the X-10 output will go true. The State button 208 and Status button 209 operate in the same manner as previously described.

Figure 3J:
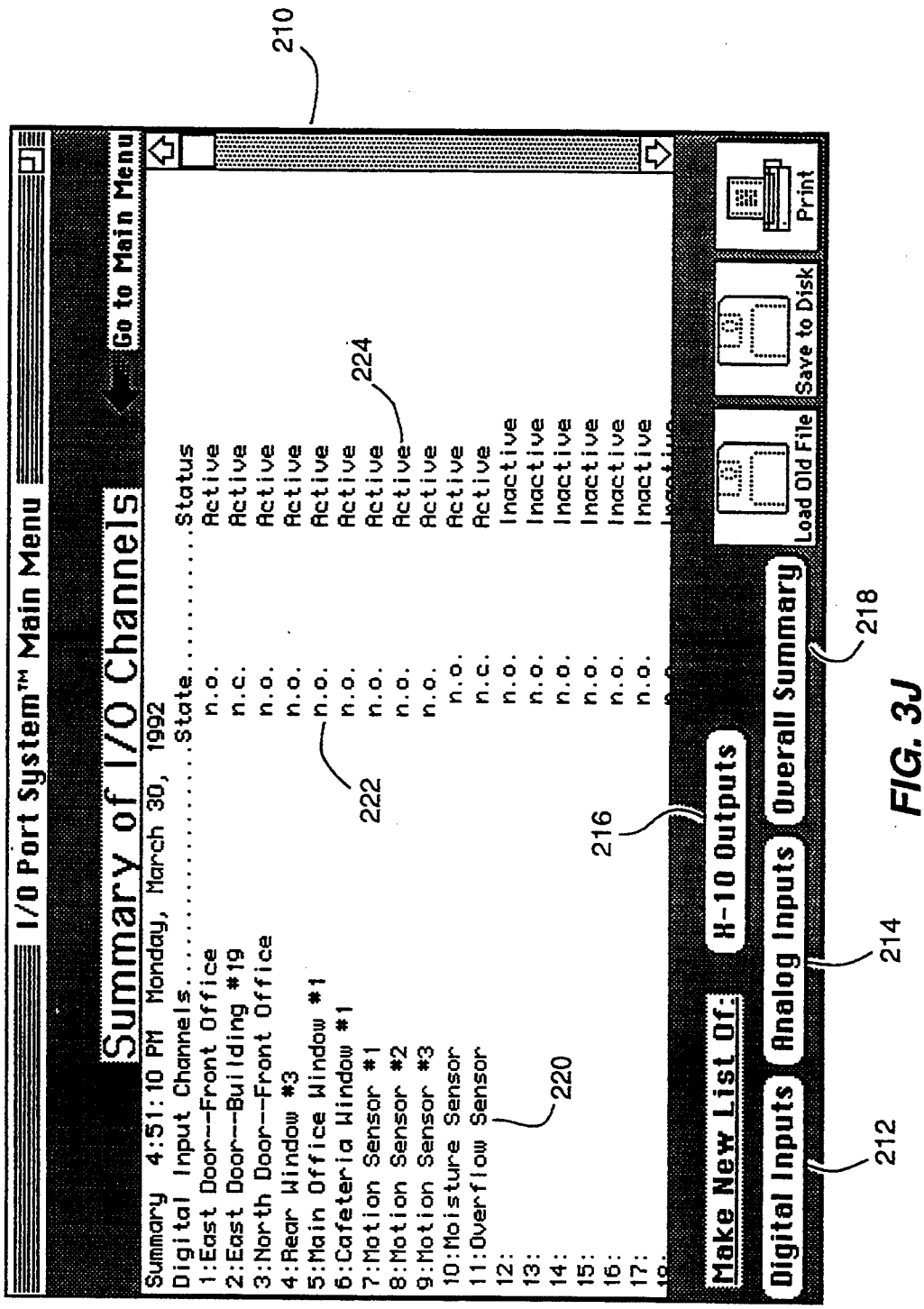

FIG. 3J illustrates the Summary of I/O Channels display screen 210 which is presented whenever the user clicks on the Summary button of the main menu. The Summary is basically a database-type report of either a particular kind of channel, or an overall summary of all the channels. For example, the display screen 210 shown in this figure would appear if the user selects the Digital Inputs button 212. A new summary list of only analog inputs would appear if button 214 was selected, or a list of X-10 outputs would appear if button 216 was selected. A list of only digital outputs could also be generated if desired. An overall summary of all inputs and outputs is displayed if button 218 was selected. The Summary of digital inputs shown on display screen 210 sets forth all the digital input channels as they were set up under the user-defined names listed in column 220, the corresponding state of the input (normally open or closed) listed in column 222, and the active/inactive status listed in column 224.

Figure 3K:
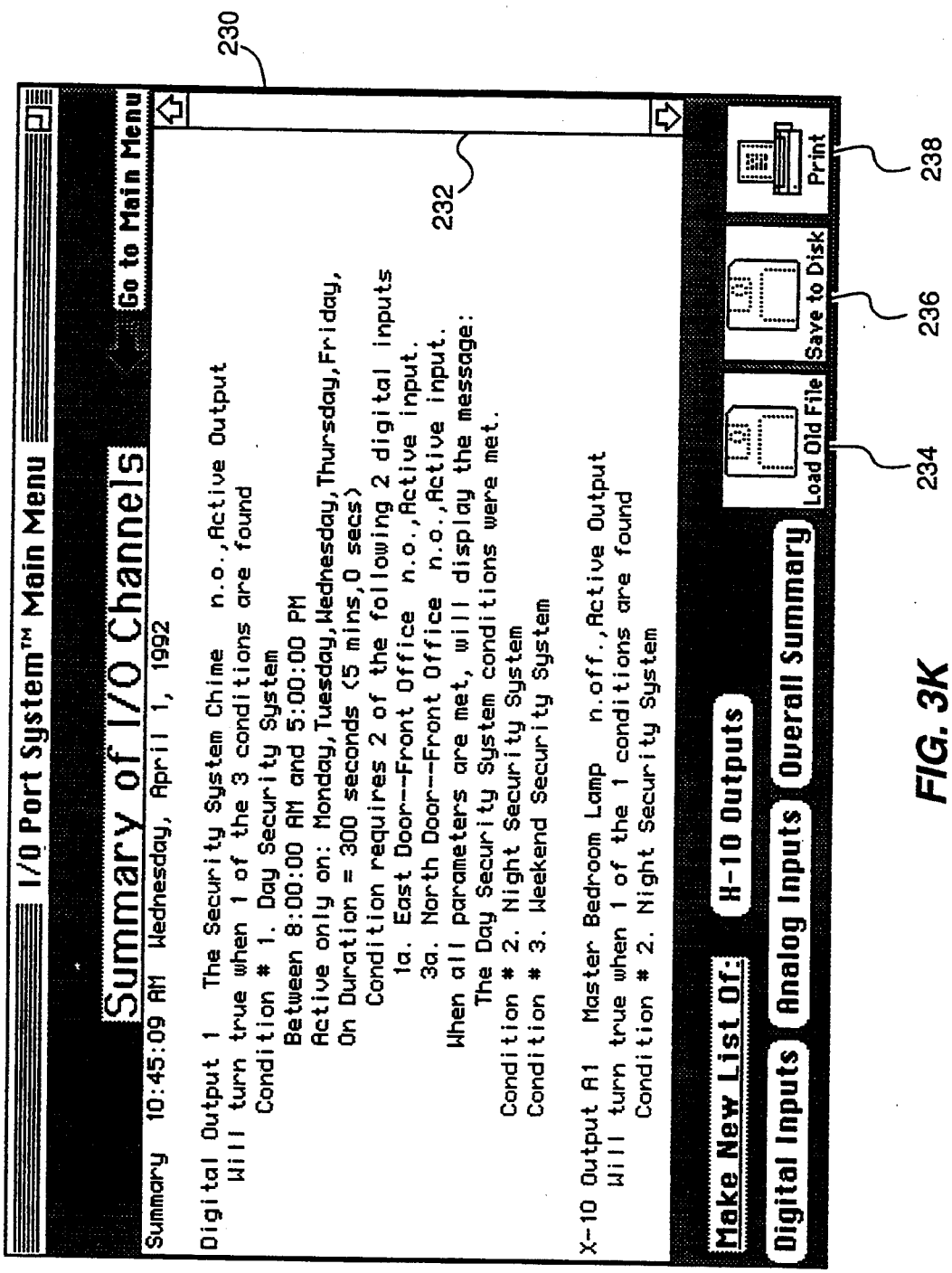

FIG. 3K presents the Overall Summary of all inputs and outputs in display screen 230 which appears when button 218 of display screen 210 is selected. The Overall Summary sets forth the output channels by listing all the parameters and various conditions needed to activate the output in a format which is readily understandable by the user. These parameters include the digital inputs required, the time of day, entrance delays, exit delays, days of the week, the analog channels required, the maximum and minimum readings from the analog channels, etc. This feature allows the user to obtain an overall perspective of how the computer will process the information obtained from the I/O Bridges. The Overall Summary is very useful for documenting and troubleshooting the user's particular application. The user can return to the list of only the digital or analog input channels by clicking on the appropriate buttons at the bottom of the screen. If the user would like to retrieve a previously-stored summary text file, the Load Old File icon 234 would be selected. If the current Summary is to be save to disk as a text file, then the Save to Disk icon 236 would be chosen. Finally, if a printed report of the Summary is desired, the user would click on the Print icon 238.

FIG. 3L illustrates the logged data Results display screen 240, which represents the record of events which can be displayed on the screen using the MASTER CONTROL program Desk Accessory and/or can be logged to disk as a plain-text ASCII file. The Desk Accessory will also allow the user to control any of the currently-installed MASTER CONTROL program INITs. The user can also create a password for the MASTER CONTROL INIT using a password feature found in the pull-down menu in the Desk Accessory.

The Results screen 240 lists the last 200 transactions which were logged by the INIT. The date that the item was logged is shown in column 242, and the exact time is shown in column 244 using a time-stamp including hours, minutes, and seconds. The I/O Bridge number appears in column 246, the channel's reference name in column 248, and the channel's user-defined name in column 250. The analog or digital result is shown in column 252, along with the units specified by the user.

For example, the first three entries of the Results screen 240 show that the level of Tank #4, as measured at analog input #1 of I/O Bridge #1, rose from 33.51 feet to 57.31 feet during the three-second time period indicated. Similarly, changes in the state of digital inputs #1 and #2 of I/O Bridge #2 were logged in at 5:19:56 and 5:19:57 on Mar. 30, 1992. Since the background INIT program generates the record of events monitored and controlled by the peripheral data acquisition, monitor, and adaptive control system, the logging of data will still take place when the user is working with an unrelated application program in the foreground.

Figure 4A:
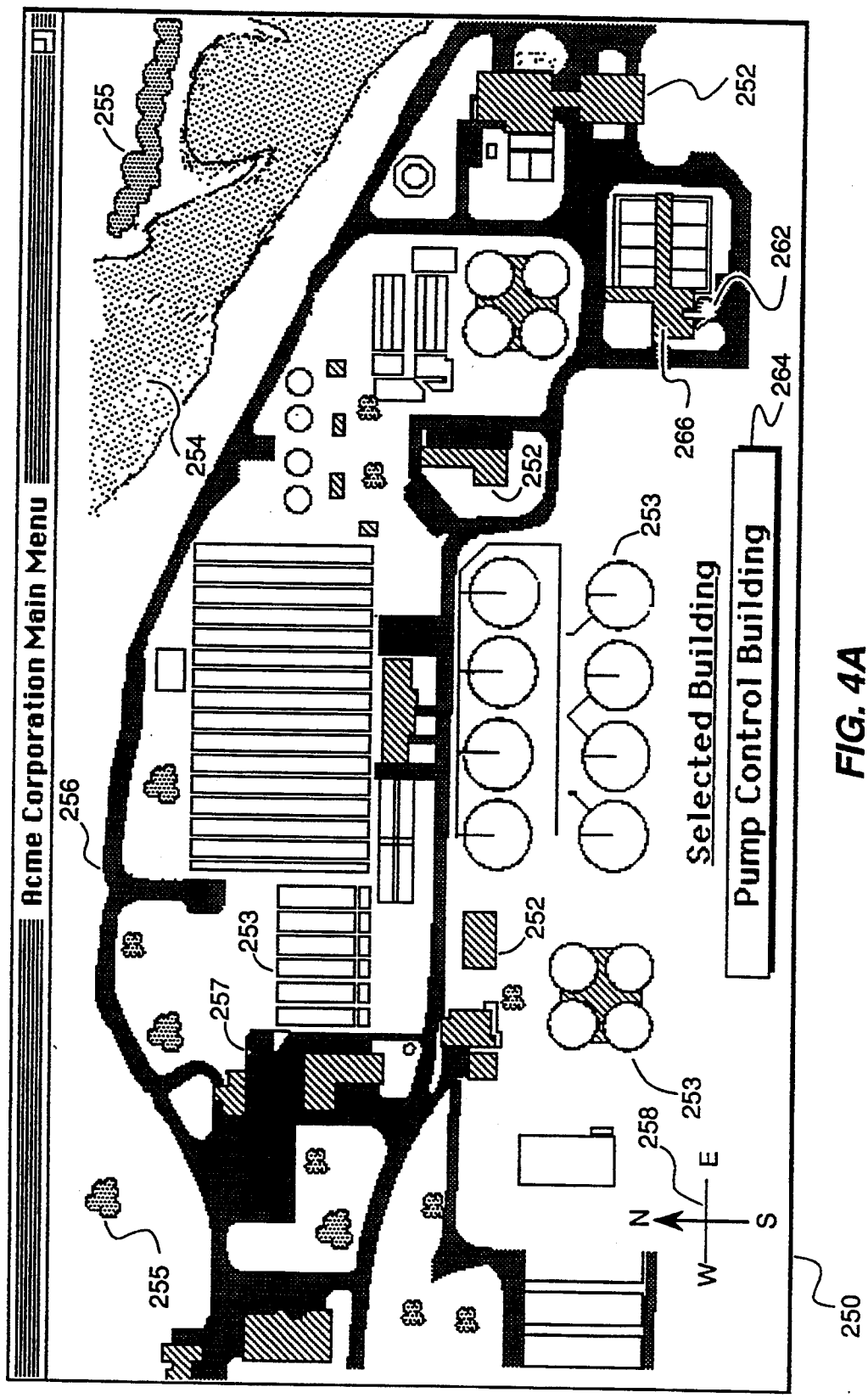
FIGS. 4A, 4B, 4C, and 4D are pictorial representations of screen displays of an alternate embodiment of the present invention, wherein a sequence of pictorial location displays, such as overhead views or floorplans, is presented to orient the user as to the specific location of the device being controlled and/or monitored.

FIG. 4A is a representative screen display of an alternate embodiment of the present invention, illustrating a pictorial representation of the overall physical layout, i.e., a "bird's eye view," of all buildings or other structures having equipment under the control of the peripheral data acquisition, monitor, and adaptive control system. In this particular embodiment, the screen display 250 illustrates a graphical overview of a particular facility, i.e., that of Acme Corporation. The graphical overview of this embodiment was made by obtaining a blueprint of the Acme Corporation's campus layout and scanning it into the personal computer 12 using the HYPERSCAN scanner utility program. The overhead view was then incorporated into the a HYPERCARD stack (document) such that it would provide an overall perspective to the user of the entire control system, showing exactly where the buildings 252 or other structures 253 having equipment controlled by the system are physically located on the campus. The overhead view of FIG. 4A also shows the major features of the landscape, such as a river 254, trees 255, roadways 256, a parking lot 257, etc., as well as a North/South direction indicator 258.

As the user moves the mouse pointer 262 over various buildings, a particular building is highlighted and a text description 264 of that particular building appears across bottom of the screen. As shown in the figure, the user has selected the Pump Control Building 266 in the lower right corner of the screen, which corresponds to the Southeast corner of the campus. Each building may have, for example, several electronically-controlled devices and/or electronic subsystem configurations, all being controlled by the MASTER CONTROL program running on a single personal computer. When the user clicks the mouse button when the pointer is over the selected building, that particular structure is selected and input as a command to the MASTER CONTROL program, and the overview of FIG. 4A is replaced by a floorplan or other diagram of the specific building chosen.

Figure 4B:
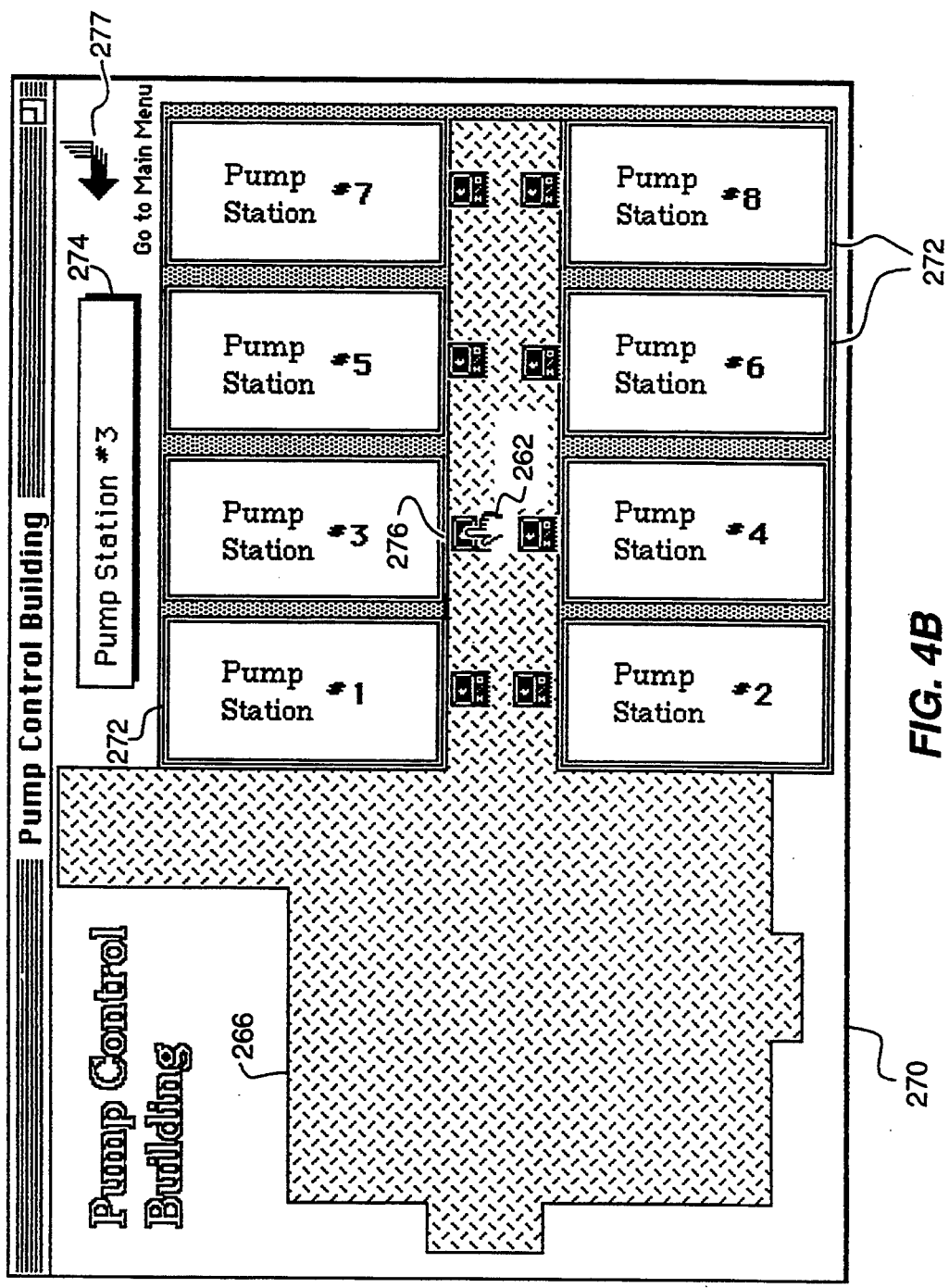

FIG. 4B represents graphical representation of a floorplan of the building or other structure selected by the user from FIG. 4A. In this example, floorplan 270 of the Pump Control Building 266 is shown. This floorplan presents an overhead view illustrating the name and location of each piece of equipment in the building using graphical icons 272. As the user moves the mouse pointer 262 over the various pieces of equipment, the individual pieces of equipment are highlighted and, if a text description of the selected piece of equipment is not already present, one will appear on the screen at 274. In this example, an icon 276 representing Pump Station #3 has been selected. Again, if the user clicks the mouse when the pointer 262 is on a specific piece of equipment, the floorplan of FIG. 4B is replaced by a control panel shown in FIG. 4C. A return button 277 is provided in the upper right hand corner of screen display 270 to allow the user to return to the previous screen.

Figure 4C:
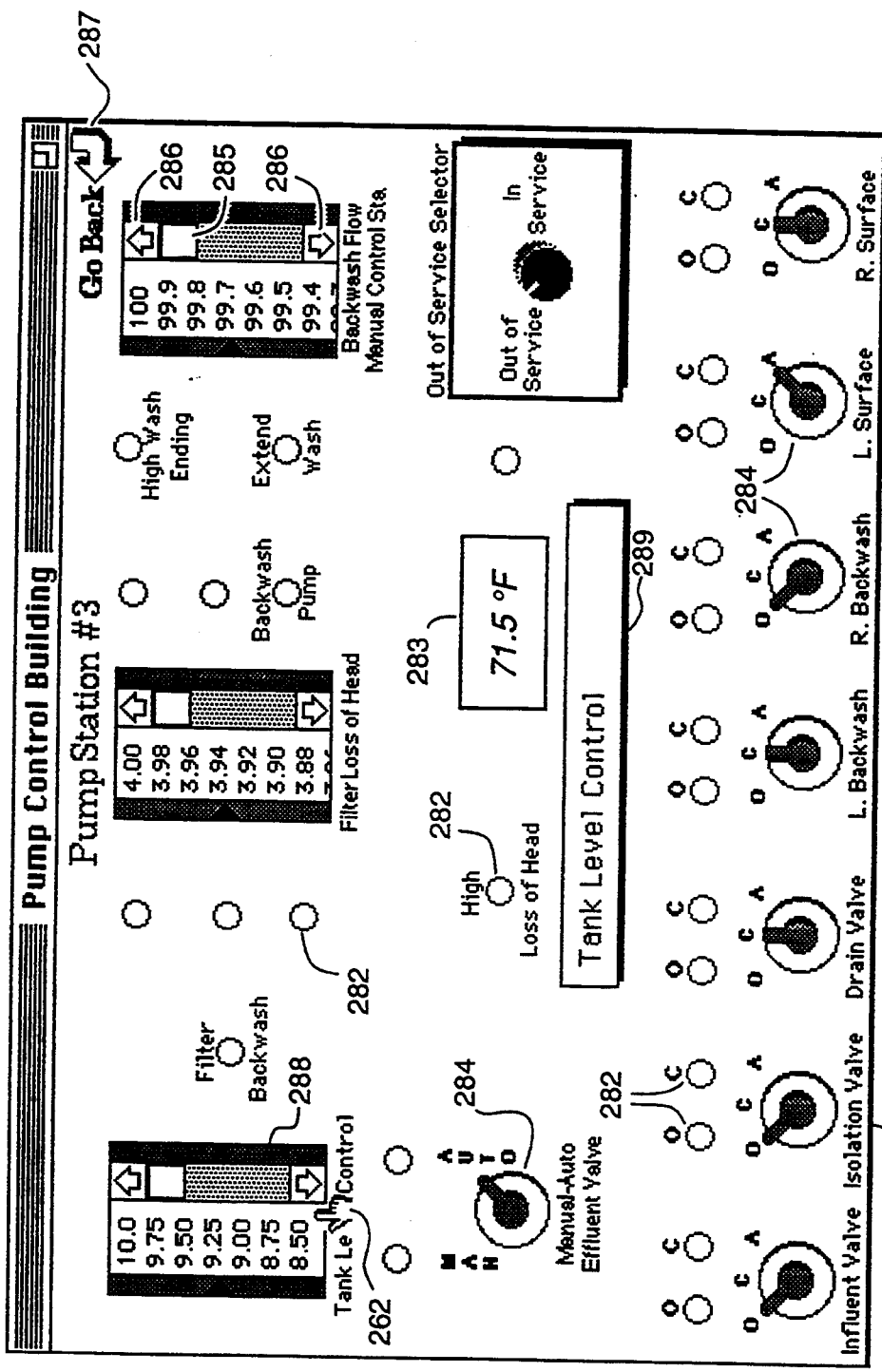

FIG. 4C represents a pictorial view of the control panel 280 for the specific piece of equipment chosen in FIG. 4B. In this example, the soft control panel for Pump Station #3 is presented, which allows the user of the personal computer to physically monitor and control the actual pump station from a remote location. The functional status of the piece of equipment is represented by having indicator lights 282 on the control panel being shown as colored or highlighted on the screen. Analog and digital readouts 283 from an actual control panel can also be duplicated on the screen and updated substantially in real time. The positions of control switches 284 are also shown on the screen, and can be changed by clicking on them with the mouse pointer. Analog settings on the screen can be changed by clicking and dragging the appropriate control button 285, or by clicking the up-down control arrows 286 on the screen. Again, a return button 287 is provided to return the user to the previous screen. The name of a particular control mechanism 288 on the control panel is also displayed in the name field 289 if desired. Hence, the soft control panel 270 presents the functional status of the particular piece of equipment selected by the user, and permits commands from the user to be input to the MASTER CONTROL program to perform the desired control action for the particular piece of equipment selected by the user.

Figure 4D:
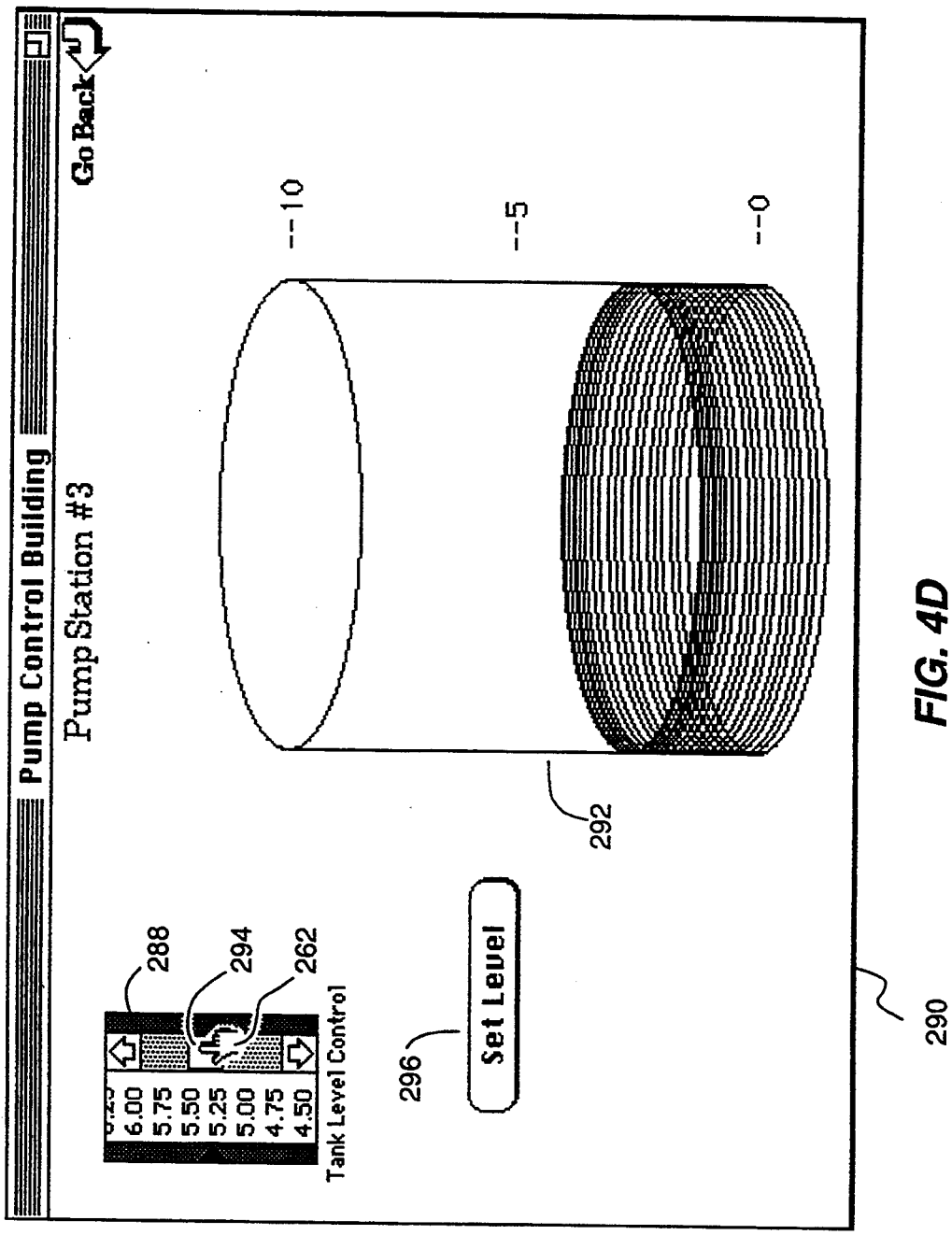

FIG. 4D illustrates a further enhancement to this embodiment of the invention, wherein the display screen 290 presents the functional status of the selected device on the same screen adjacent the particular control panel mechanism selected by the user. For example, once the user clicks anywhere on the tank level control mechanism 288 of FIG. 4C, the display screen 290 of FIG. 4D appears. This shows the tank level control mechanism 288 as well as a pictorial representation of the tank 292 itself using either screen animation or by showing live video from a closed-circuit television camera directly on the display screen. In other words, the animated or live view of the particular device being controlled presents the functional status of the controlled device in substantially real time. In the example shown in FIG. 4D, clicking and dragging on the tank level control button 294 with the mouse pointer 262, and then clicking on the Set Level button 296, would send a control signal to the actual control panel at Pump Station #3, such that the actual tank level would change correspondingly, and the change would appear via the pictorial representation of the tank 292 on the display screen 290.

Hence, the sequence of screen displays illustrated in FIGS. 4A–4D serve to orient the user of the system by showing a representation of the "big picture" of the system being controlled, then directing the user to the specific location of the individual I/O Bridge units and/or the functions that each I/O Bridge monitors and controls. In other words, the MASTER CONTROL program first illustrates zones or the physical location of groups of devices being monitored and controlled. Then the program shows the function of each device in the group. Next, commands are input by the user and output by the program to perform the desired control action. Finally, the status of each device is shown by having the various icons change appearance, or by having computer animation or live video represent the functional status of the particular device in virtually real time.

Figure 5A:
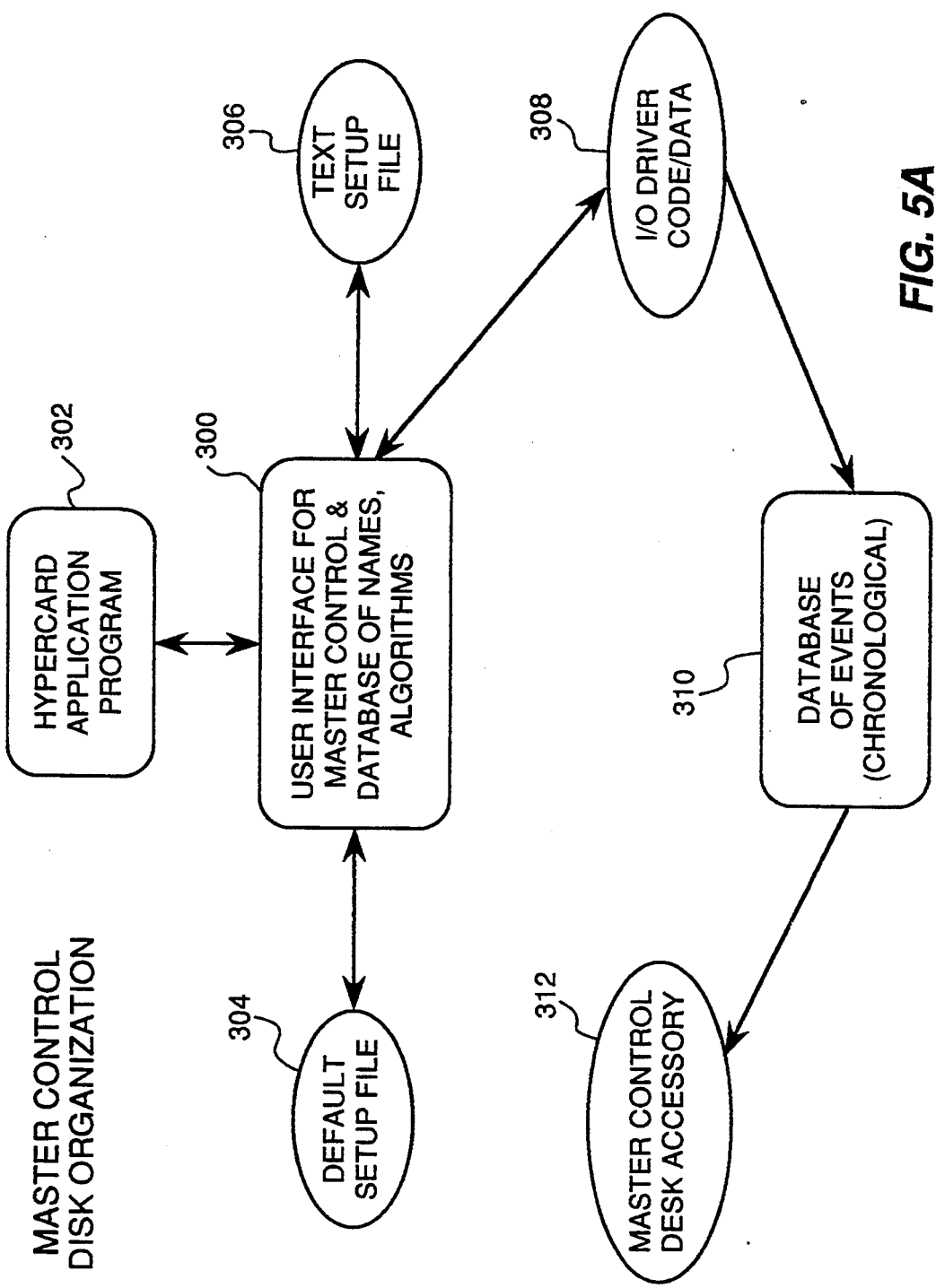
FIGS. 5A, 5B, and 5C are pictorial flow diagrams showing the disk organization, memory map, and logic flow of the MASTER CONTROL program of the preferred embodiment.

FIG. 5A is a pictorial flow diagram representing an overview of the disk organization of the MASTER CONTROL program of the preferred embodiment. The disk organization diagram of FIG. 5A basically corresponds to a display of the directory of the files used for the MASTER CONTROL program, and closely resembles the Table of Contents for the object code listing included in the Appendix.

The MASTER CONTROL program was written using HYPERCARD (a trademark of Apple Computer, Inc.), which allows one to create, edit, and delete records, and to make decisions based on the content of particular records. Hence, the MASTER CONTROL program is ideally suited for use with the HYPERCARD application program serving as the database for peripheral data acquisition and adaptive control. However, the MASTER CONTROL program of the preferred embodiment can also be modified to be used with any Pascal program, Microsoft Basic program, or other computer program in which the user desires to perform the data acquisition, analysis, and/or adaptive control.

In FIG. 5A, the main block 300 is the User Interface file for the MASTER CONTROL program. The User Interface 300 is actually a document file including entry screens and executable script which contain information such as the names of inputs and outputs, the assignments of inputs to conditionals, the assignments of specific conditionals to outputs, etc. Due to the nature of HYPERCARD, the User Interface includes the Database of Names and Algorithms used by the MASTER CONTROL program.

Block 302 is the HYPERCARD application program, which must be used to open the User Interface document 300. When accessed by the HYPERCARD program, the User Interface scripts are executed and the entry screens appear on the display screen under the direction of the MASTER CONTROL program. Furthermore, data files can be read from and written to under the control of the script files.

The Default Setup file 304 is used to initialize the User Interface program to a known state having zero inputs, zero outputs, and no conditional algorithms. The Text Setup file 306 contains a complete database of inputs, outputs, and conditionals with all their corresponding names and linkages, which serves the purpose of providing a template for the MASTER CONTROL program.

The I/O Driver 308 or INIT file is the background program which interacts with the I/O Bridge devices. The INIT can run with or without the MASTER CONTROL program once the setup has been generated. Moreover, multiple INITs can be loaded and executed to control a plurality of I/O Bridge devices independently from one another. Accordingly, the I/O Driver code and data are stored in a file which can be accessed by the MASTER CONTROL program and which can create the record of events in the background. The Database of Events 310 represents the data file generated by the INITs when the user desires that the I/O channel states be logged to disk. This record of events is kept in chronological order as previously shown in FIG. 3L. Finally, the MASTER CONTROL Desk Accessory 312 provides a mechanism for accessing the Database of Events 310. The Desk Accessory can be accessed from any program.

Figure 5B:
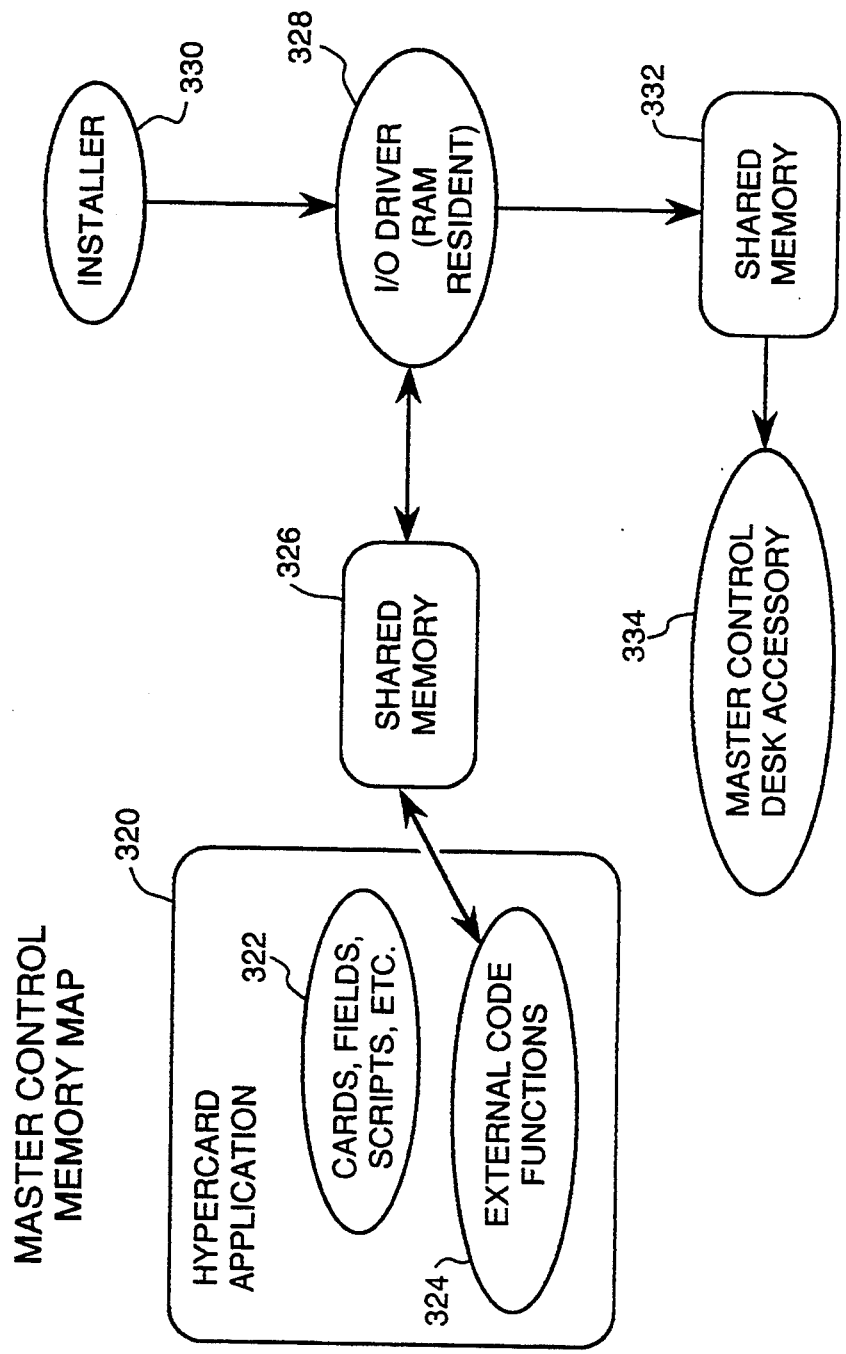

FIG. 5B represents a memory map for the MASTER CONTROL program. As will be appreciated by those persons familiar with the HYPERCARD application program 320, the program is organized in stacks which contain information such as the cards (records), fields, and scripts used by the MASTER CONTROL program. External code functions 324, or XFCNs, which are part of the HYPERCARD application 320, have access to a block of the personal computer's shared memory 326 as shown.

The I/O Driver program 328 or INIT, which is resident in the PC's RAM, interfaces with the HYPERCARD application 320 through the computer's shared memory 326. Another block of shared memory 332 is used by the INIT to interface with the MASTER CONTROL Desk Accessory 334. An Installer program 330 is initially run to load and configure the INIT.

Figure 5C:
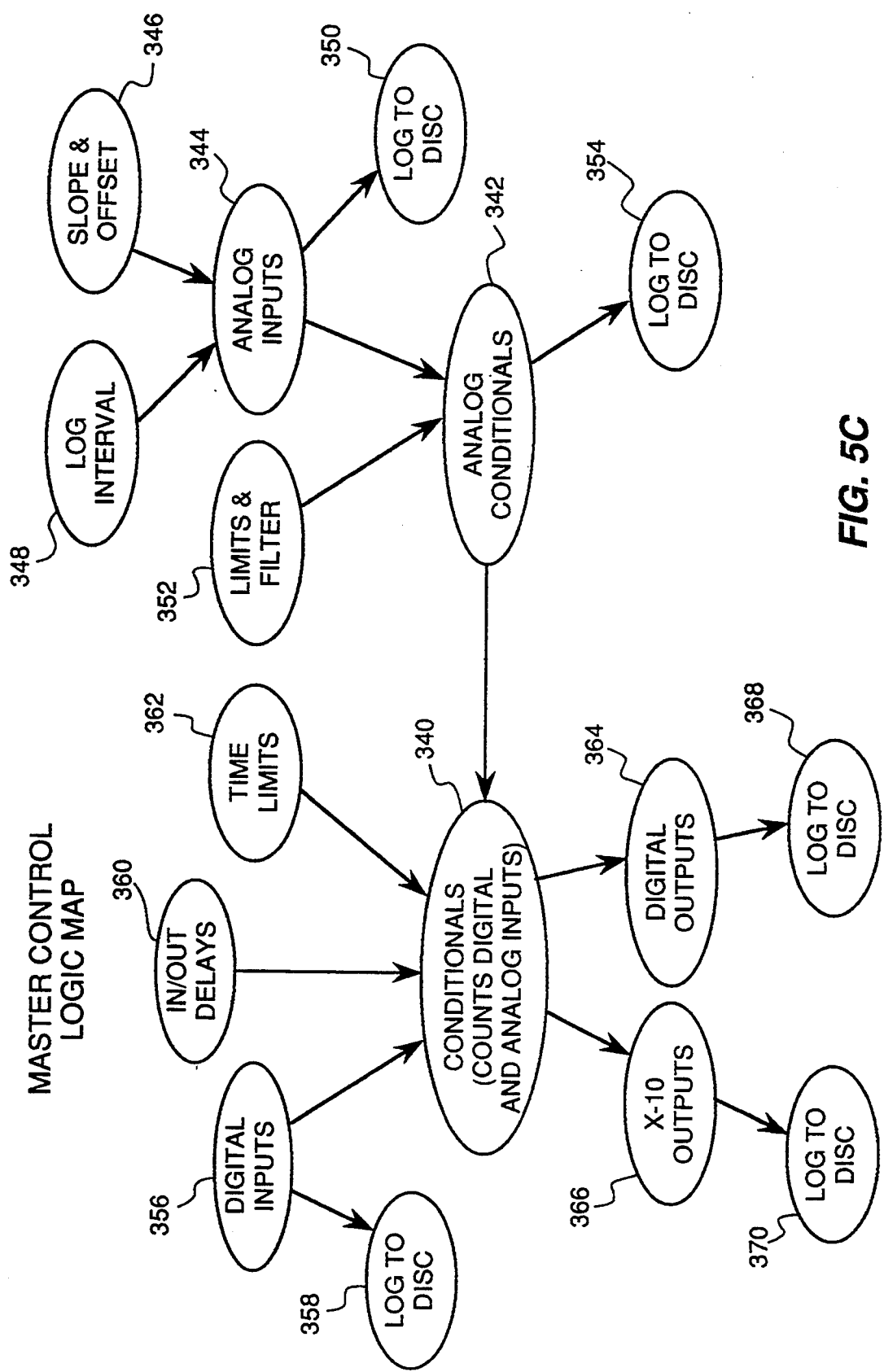

Turning now to FIG. 5C, a logic map flow diagram is shown for the MASTER CONTROL program. This diagram illustrates how the MASTER CONTROL program provides the ability to let the user set up the system configuration utilizing complex boolean logic statements (conditionals) with multiple inputs and multiple outputs, including both analog and digital inputs. The MASTER CONTROL program also allows the user to verify the operation of the conditional via emulation through manual control via the Manual Mode. For example, a conditional may be set up such that any two out of a certain three inputs trigger a particular output. These conditionals provide the ability to combine two or more independent and different levels of boolean logic condition statements at the same time, i.e., (A AND B) OR (B AND C) OR (A AND C)=Z.

Sophisticated time parameters can also be added as conditional statements, as discussed above in accordance with FIG. 3G.

The logic map of FIG. 5C illustrates that two types of conditionals are actually being constructed with the program: universal conditionals 340 and analog conditionals 342. The analog conditionals 342 are configured using the analog inputs 344. These analog inputs 344 must first be configured with their slope and offset parameters 346 and log interval parameters 348, and the decision whether or not the analog inputs are to be logged to disk at 350. The analog conditionals 342 are then constructed, utilizing the limits and filter parameters 352 discussed above. It is also determined at this time whether or not to log the resultant analog conditional to disk at 354 when it turns true.

Similarly, the universal conditional 340 is configured from both the digital inputs 356 and the analog conditionals 342. First, it is determined whether the digital inputs 356 should be logged to disk at 358. Then the digital inputs 356, the in/out delays 360, and the time limit parameters 362 are used along with the analog conditionals 342 to form the universal conditionals 340. Hence, the universal conditionals 340 include logic statements based on both digital and analog inputs. Once the universal conditionals 340 turn true, either the digital outputs 364 or the X-10 outputs 366 are activated and/or logged to disk at 368, 370.

As an example of the logic flow of the conditionals, say that the user desires that the system be set up such that any three out of a certain five inputs trigger a particular X-10 output, and one of the inputs is an analog input. Furthermore, the analog input would be activated only when it falls within a voltage range of 2.5 to 3.0 volts DC. Clearly, the boolean logic expression for this conditional statement would be very complex, requiring two or more levels of boolean operators. However, by following the logic map shown in FIG. 5C, the user would implement the screen displays of FIGS. 3A-3L to perform the following steps: select one analog input (FIG. 3E); scale the analog input signal to have a slope of 0.02 and an offset of 0 (FIG. 3E); set its limits to 2.5 and 3.0 volts DC (FIG. 3F); use an in-range filter (FIG. 3F); select four appropriate digital inputs (FIG. 3C); construct a conditional list including the four digital inputs and the one analog condition (FIG. 3G); configure the X-10 output (FIG. 3I); and set the output conditions needed to 3 (FIG. 3I). All of these steps can be performed in a matter of minutes with the MASTER CONTROL program.

Figure 6E:
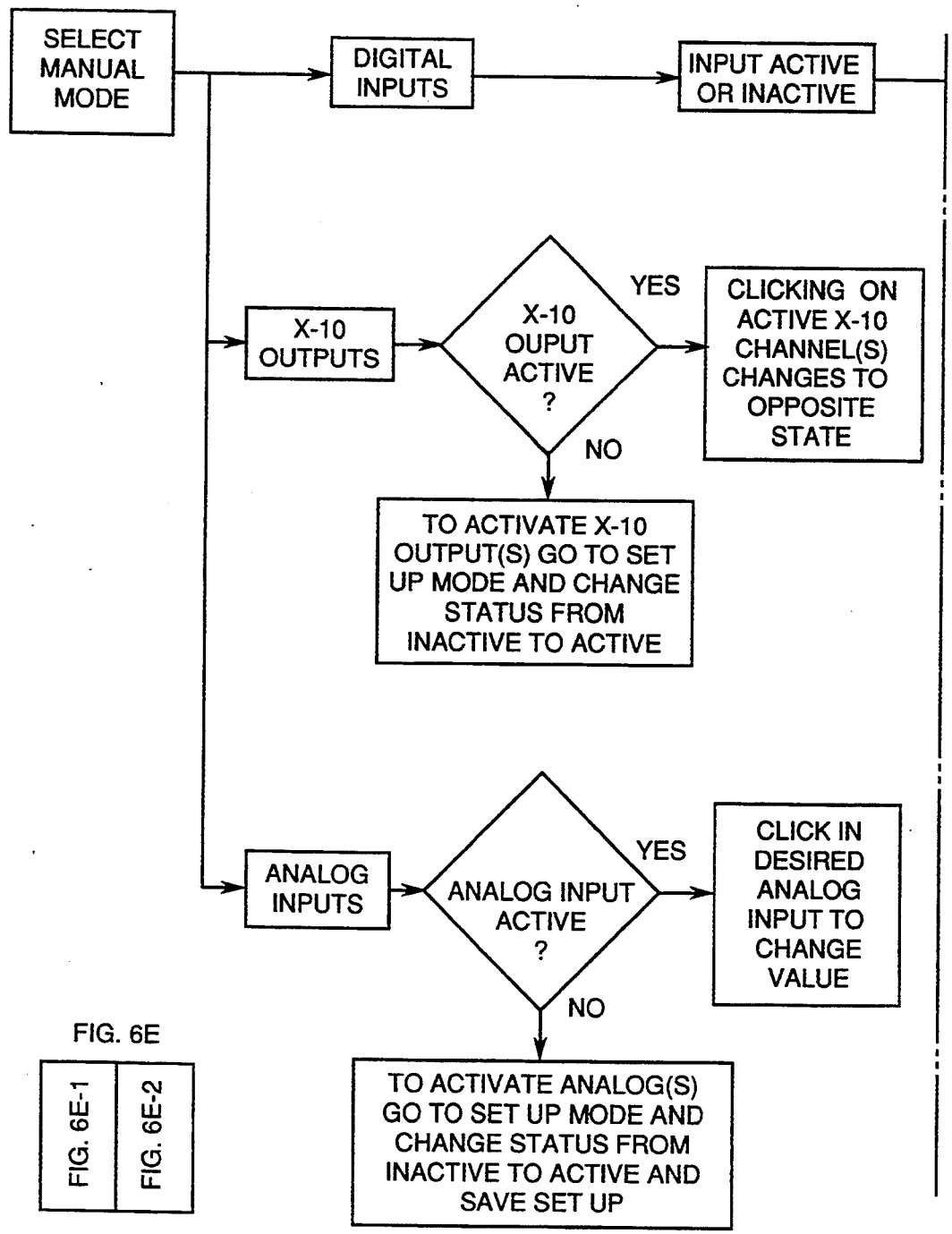
Figure 1:
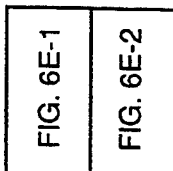
Figures 2, 6E:
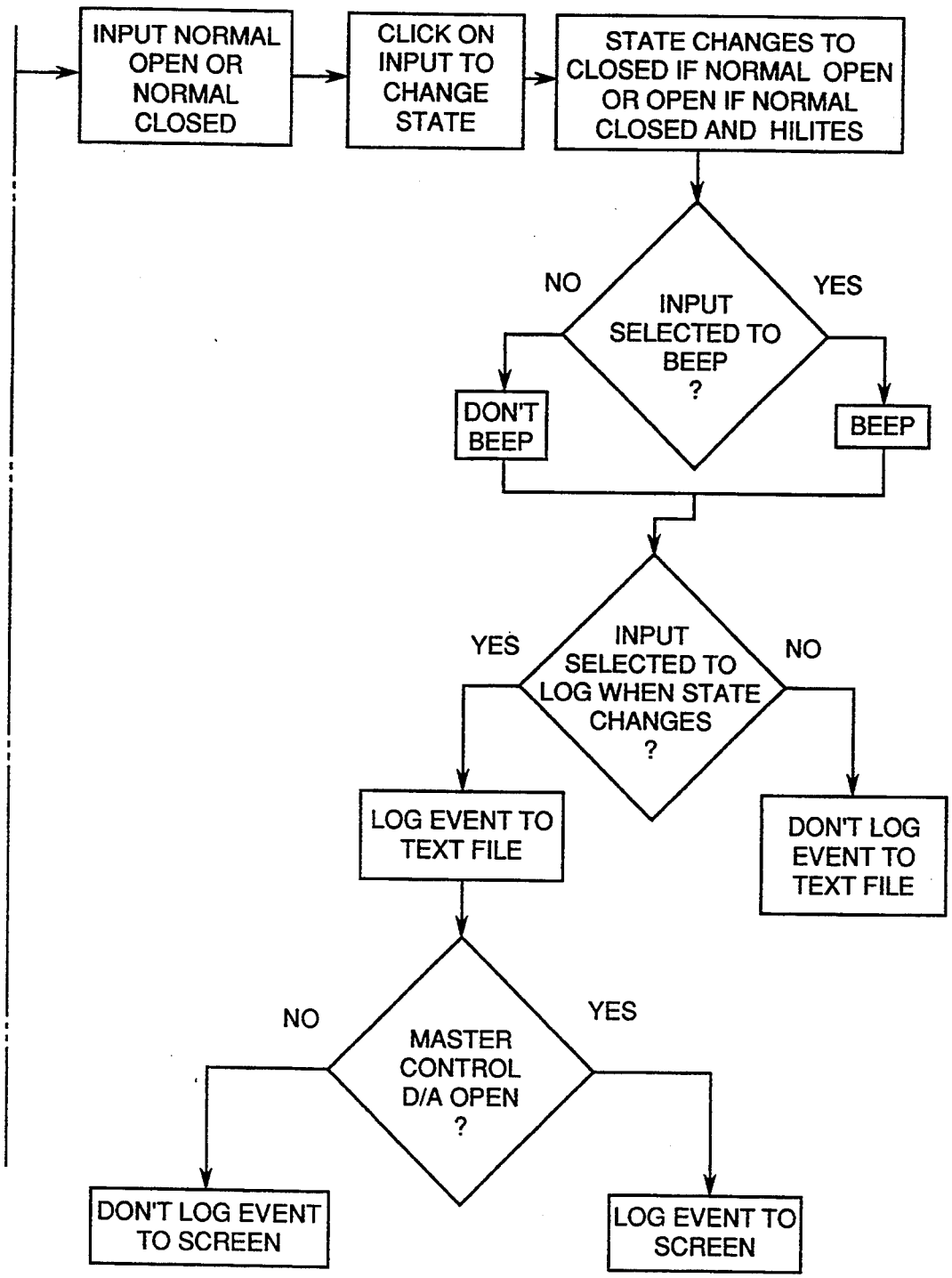
Figures 1, 6F:
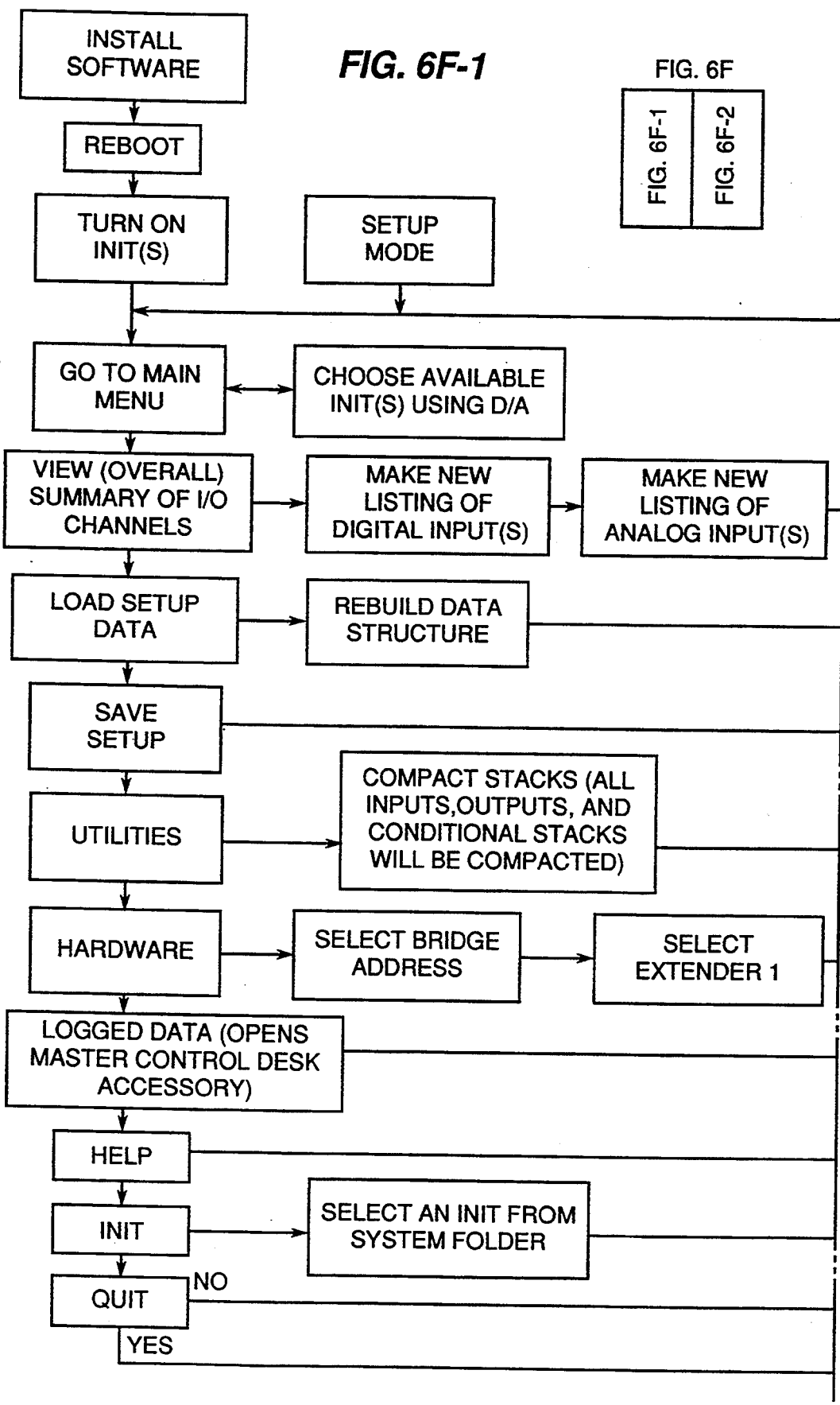
Figures 2, 6F:
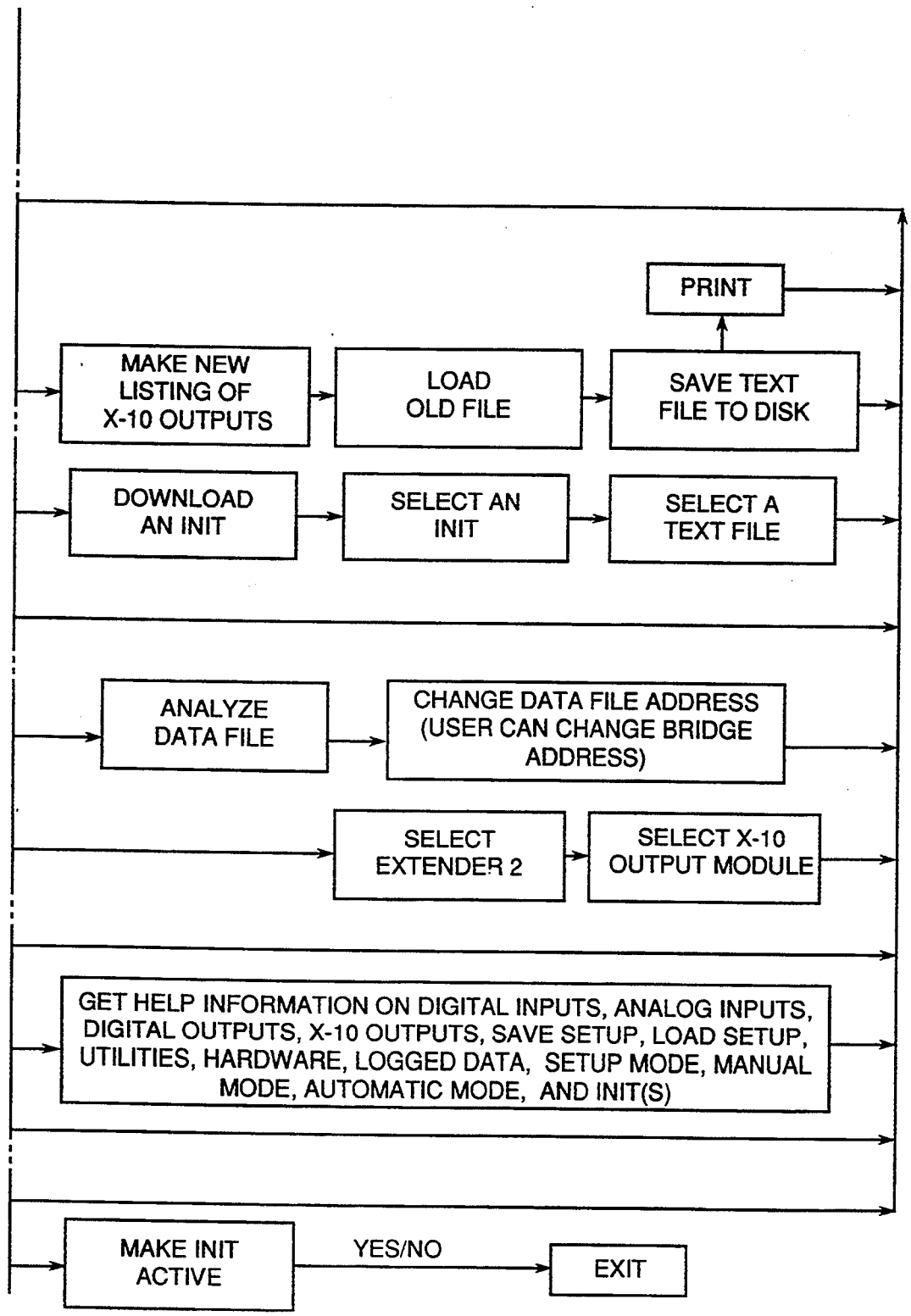

FIGS. 6A through 6F are software program flowcharts used for generating the screen displays of FIGS. 3A through 3L. More specifically, FIG. 6A is the system startup routine; FIG. 6B is the I/O Driver (INIT) routines; FIG. 6C is the HYPERCARD display screen routine for updating channel icons on screen in the automatic and manual mode; FIG. 6D is the MASTER CONTROL Desk Accessory routine; FIG. 6E is the system setup procedure from the user's perspective for the MASTER CONTROL program; and FIG. 6F is the overall system operational flow of the MASTER CONTROL program. The flowcharts of FIGS. 6A-6F follow the sequence of screen displays and flow diagrams described above, and are self-explanatory. Furthermore, the flowcharts correspond exactly to the computer object code listings set forth in the Appendix. Accordingly, a further description of these flowcharts is not deemed necessary.

Referring now to FIGS. 7A through 7E, software program flowcharts are shown for illustrating the operation of the MASTER CONTROL program when configured to present the screen displays of FIGS. 4A through 4D in accordance with the alternate embodiment of the present invention. Since the HYPERCARD program operates according to stacks, the operational flow would depend upon which stack is controlling the program.

Figure 7E:
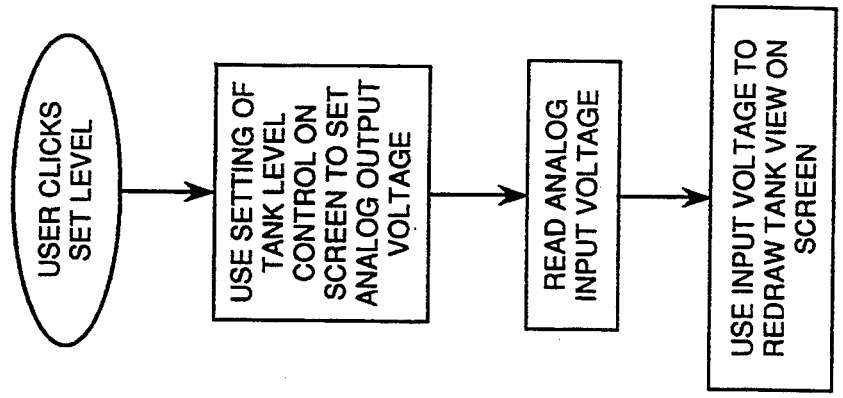
FIGS. 7A, 7B, 7C, 7D, and 7E are software program flowcharts for operating the screen displays of FIGS. 4A-4D in accordance with the alternative embodiment.
Figure 7C:
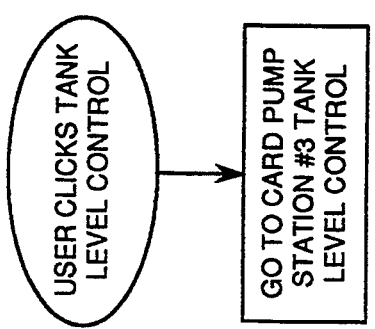
Figure 7D:
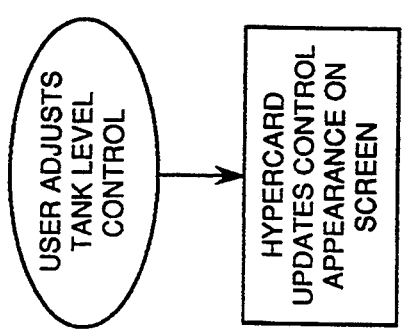
Figure 7A:
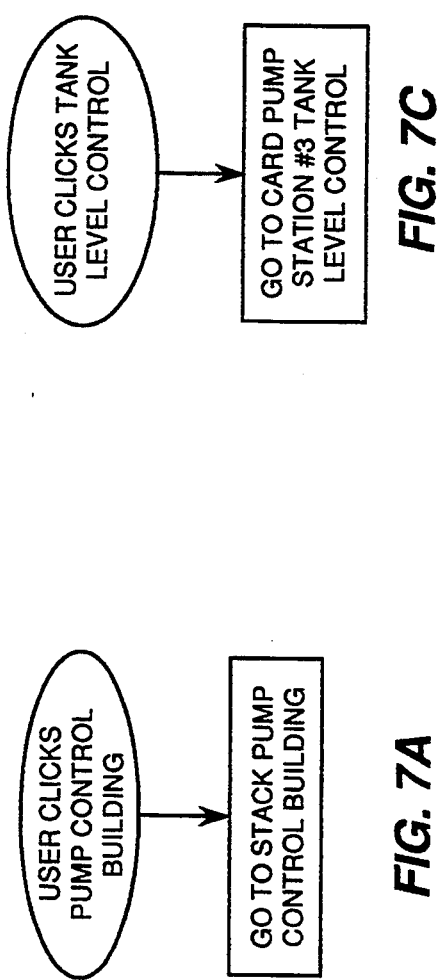
Figure 7B:
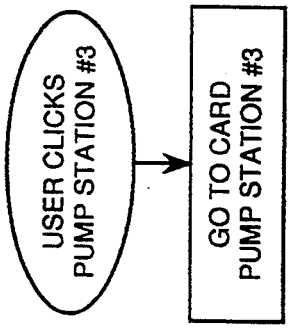

FIG. 7A shows the stack for the main menu of the alternate embodiment of the MASTER CONTROL program, wherein the display screen would appear as described in FIG. 4A. As can be seen from FIG. 7A, the user would select the Pump Control Building from the main menu by clicking the mouse, and the program would input the command and transfer control to the display screen of the Pump Control Building illustrated in FIG. 4B. In FIG. 7B, the user would click on Pump Station #3, and control would proceed to the control panel card for Pump Station #3 as illustrated in FIG. 4C. In FIG. 7C, the user would choose the tank level control, and control would then proceed to the Pump Station #3 tank level control card shown in FIG. 4D. In FIG. 7D, the user would adjust the tank level control by clicking and dragging the control with the mouse pointer. Then the program would update the appearance of the level control icon on the screen.

In FIG. 7E, the user can set the level of the tank by clicking on the Set Level button. Using this set level command, control proceeds to generate an analog output voltage via an I/O Bridge analog output channel connected to the real-world control panel. Similarly, the program reads an analog input voltage from an I/O Bridge analog input channel connected to a level sensor on the tank of Pump Station #3. This analog input voltage is then used to redraw the view of the tank on the display screen, in order to update its status. The program flowchart of FIG. 7E would be modified slightly in order to display a live video picture on the screen instead of a graphical representation of the tank. In either case, the system provides both monitoring and control of remotely-located equipment via the PC, while at the same time providing the user with an overall perspective of exactly where the pieces of equipment are physically located in the real world, exactly what types of equipment can be controlled, and exactly which piece of equipment is being controlled. Furthermore, the system provides visual feedback to the user in virtually real time, showing exactly how the particular piece of equipment is responding.

Figure 8A:
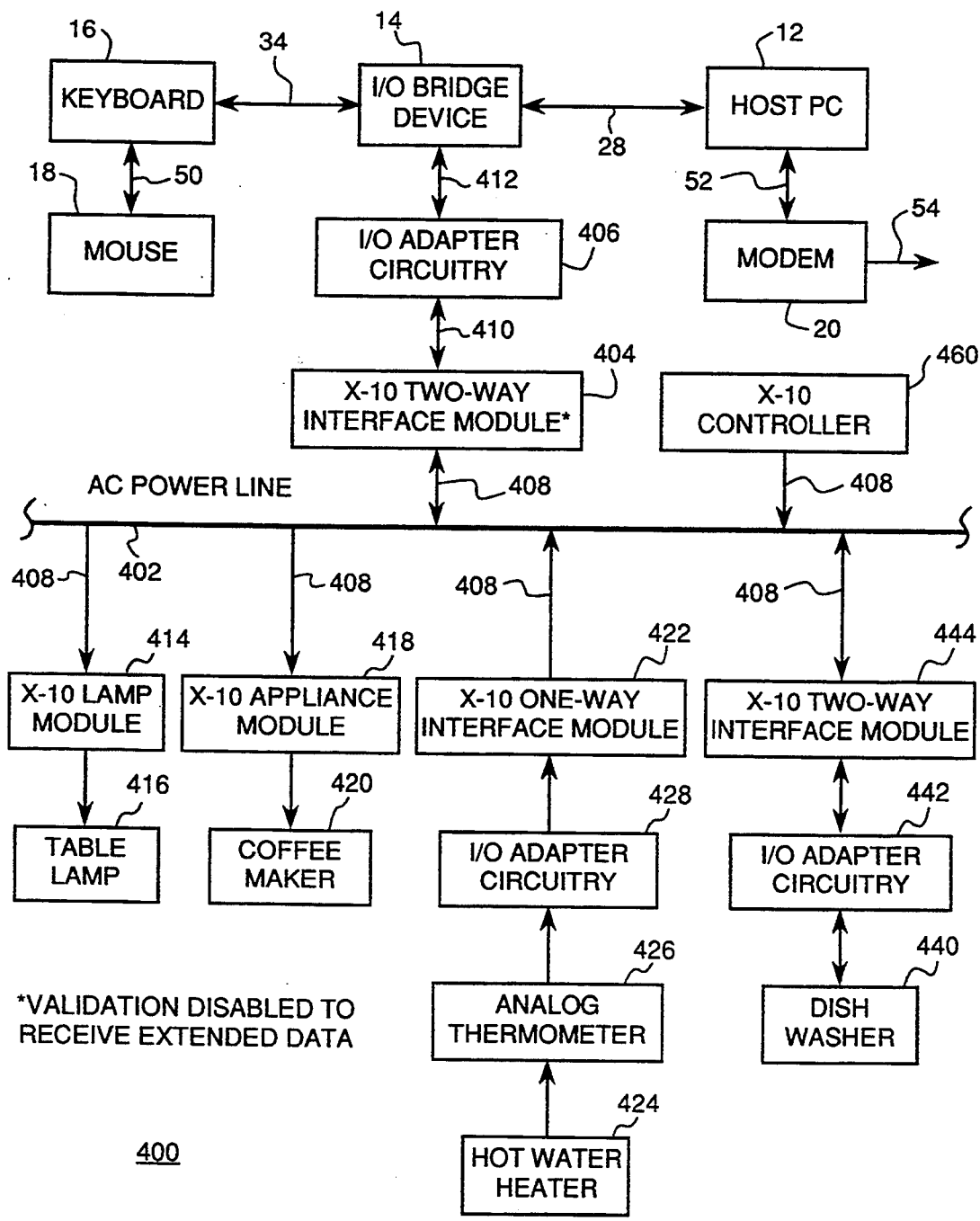
FIG. 8A is a general block diagram of an alternate embodiment of a peripheral data acquisition, monitor, and adaptive control system utilizing an AC power-line carrier transmission scheme in a home automation system.

Now referring to FIG. 8A, a general block diagram of an alternative embodiment of a peripheral data acquisition, monitor, and adaptive control system 400 is shown. The system 400, in this embodiment, utilizes the X-10 power-line carrier code format transmitted over an AC power line of a home to monitor and control various household appliances, such as a table lamp, coffee maker, dishwasher, etc. In this embodiment, a separate X-10 controller can be coupled to the AC power line to control the appliances in addition to providing centralized control via the host PC. This feature of providing distributed intelligence is very important in many modern homes.

The host PC 12 is coupled to the I/O Bridge device 14, the keyboard 16, the mouse 18, and the modem 20, via the various interconnect cables described above. Since a MACINTOSH II computer is used in this embodiment, the mouse 18 is shown connected to the keyboard 16 instead of the PC 12.

The I/O Bridge device 14 is coupled to the AC power line 402 via an X-10 two-way interface module 404 and I/O adapter circuitry 406. The two-way interface module 404 is available from X-10 (USA) Inc. as Model No. TW523. Since it is a two-way interface module, it can transmit and receive X-10 codes via the AC power line 402. When receiving the X-10 codes from the power line, the interface module 404 includes circuitry which continuously checks all the incoming codes for validity. However, since the module cannot receive extended codes or extended data (which can be used in the preferred embodiment for analog data transmission), the validation circuitry can be disabled (by bypassing the code detect IC) if analog data is used. The two-way interface module 404, as well as all of the X-10 modules and controllers, plug into standard AC outlets 408 to connect to the AC power line 402. The X-10 code signals are coupled to and from the interface module 404 via a modular RJ11 telephone jack 410. All of the code signal inputs and outputs to the interface module 404 are optoisolated and synchronized to the zero crossing point of the AC line. For further details of interface module 404, refer to the X-10 POWER-HOUSE Technical Note for the PL513 and TW523 power-line interfaces, published by X-10 (USA) Inc., Northvale, N.J.

Figure 8B:
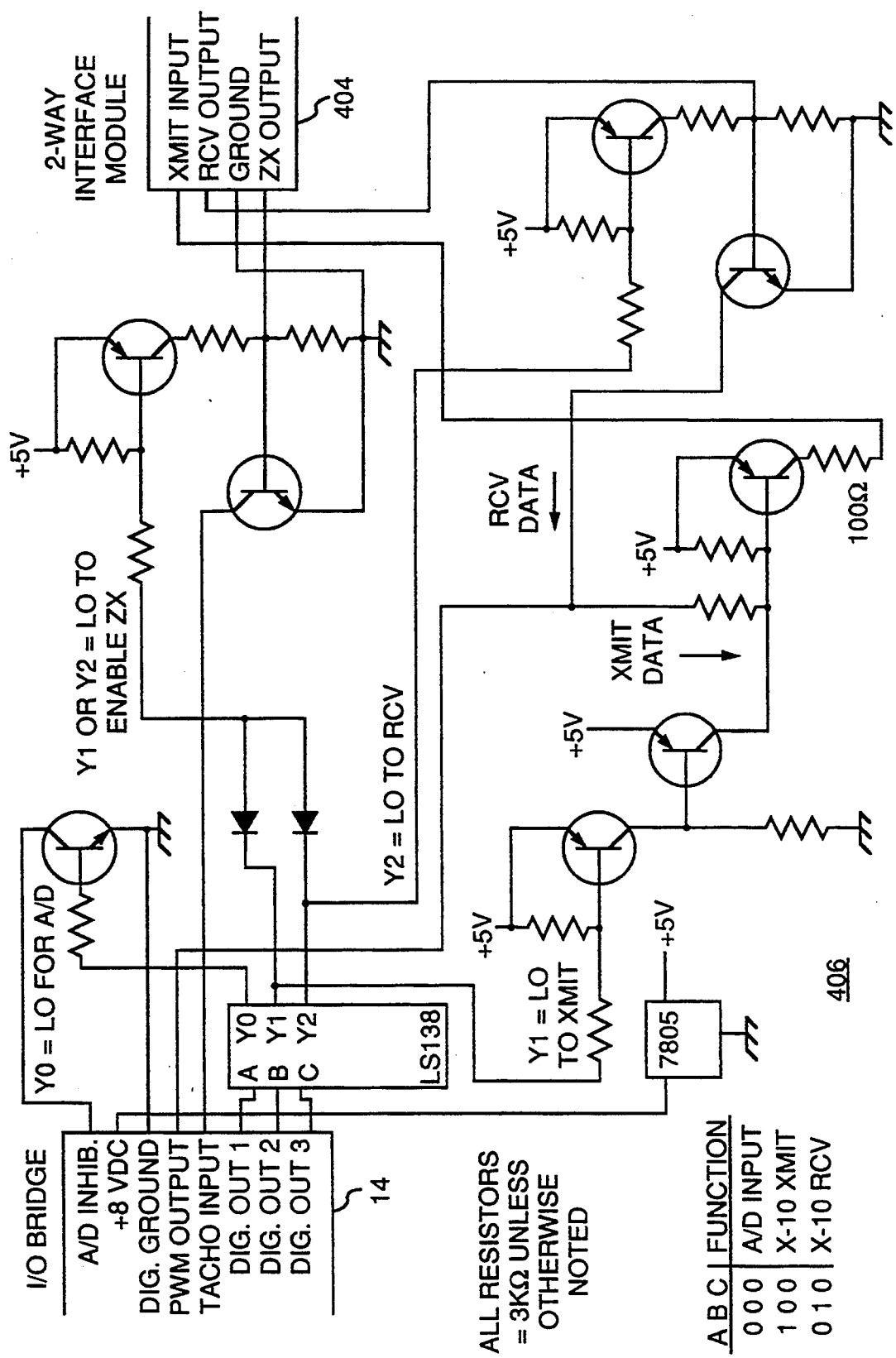
FIG. 8B is an electrical schematic diagram of the interface circuitry used to connect the I/O Bridge device to a two-way power-line interface module.

FIG. 8B is an electrical schematic diagram of the I/O adapter circuitry 406 which is used to connect the I/O Bridge device 14 to the X-10 two-way interface module 404. As seen in this figure, the pulse-width modulated (PWM) output PA5 of the I/O Bridge device 14 is used to output the binary X-10 codes in serial fashion from the I/O Bridge device the input of the X-10 interface module for modulation and transmission to the AC power line 402. The tachometer input PA4 to the I/O Bridge device is used to synchronize the PWM output to the AC line frequency using the zero-crossing output of the X-10 interface module. Since the PWM output line PA5 is bidirectional and serves as an event counter input, the demodulated X-10 codes from the receive output of the interface module 404 are also connected to the PWM output line. Three digital outputs from the I/O Bridge device are connected to a one-of-eight decoder and used to select one of three functions: A/D input (via the I/O Bridge front panel); X-10 transmit (using PA5 as an output and inhibiting the A/D); and X-10 receive (using PA5 as an input and inhibiting the A/D input). The remaining five functions are reserved for I/O Bridge communications via other transmission media, e.g., infrared, radio frequency, etc. Note that the zero-crossing output of the interface module 404 is disabled during the A/D input function, and that the receive output of the interface module 404 is disabled during the X-10 transmit function. For further details of the I/O Bridge device lines, refer to U.S. Pat. No. 5,099,444, entitled Peripheral Data Acquisition, Transmission and Control Device. For further details of the interface module lines, refer to the aforementioned X-10 POWERHOUSE Technical Note.

Again, referring to FIG. 8A, it can be seen that a number of X-10 modules are connected to the AC power line 402 via AC outlets 408. An X-10 lamp module 414 (such as X-10 model no. LM511), an X-10 wall switch module (such as X-10 model no. WS711), or an X-10 wall receptacle module (such as model no. SR227) can be used to control a table lamp 416. An X-10 appliance module (such as X-10 model no. AM286 or AM611) can be used to control an appliance such as a coffee maker 420. In the alternative, a two-way transceiver appliance module (such as X-10 model no. RR501) can be used in place of appliance module 418. The two-way transceiver appliance module responds by transmitting a specific X-10 code to indicate its on/off status. This status code can then be received by the two-way interface module 404 and forwarded to the host PC for indicating the on or off status of the appliance.

An X-10 one-way interface module 422 (such as X-10 model no. PL513) is used to transmit X-10 codes over the AC power line. In the embodiment shown in FIG. 8A, the temperature of the hot water heater 424 is monitored using an analog thermometer 426, such as a thermistor. The analog temperature information is presented to I/O adapter circuitry 428 for analog-to-digital (A/D) conversion and translation into the proper X-10 code format for interface module 422. This I/O adapter circuitry is shown in the next figure. Hence, the actual temperature of the water in the hot water heater 424, as measured by the analog thermometer 426, is converted to digital information, translated into the X-10 code format, modulated onto a power-line carrier signal, transmitted over the AC power line 402, and received by the two-way interface module 404. There, the modulated carrier signal is demodulated and applied to the I/O adapter circuitry 406 for coupling to the I/O Bridge device 14. The I/O Bridge device 14 can, if desired, translate the digital information into a keyboard code signal which emulates sequential keyboard character keystroke information for inputting the temperature information directly into an application program running on the host PC 12. Otherwise, the I/O Bridge device can forward the binary information directly to the host PC for use by the INITs for updating the status of the system.

Figure 8C:
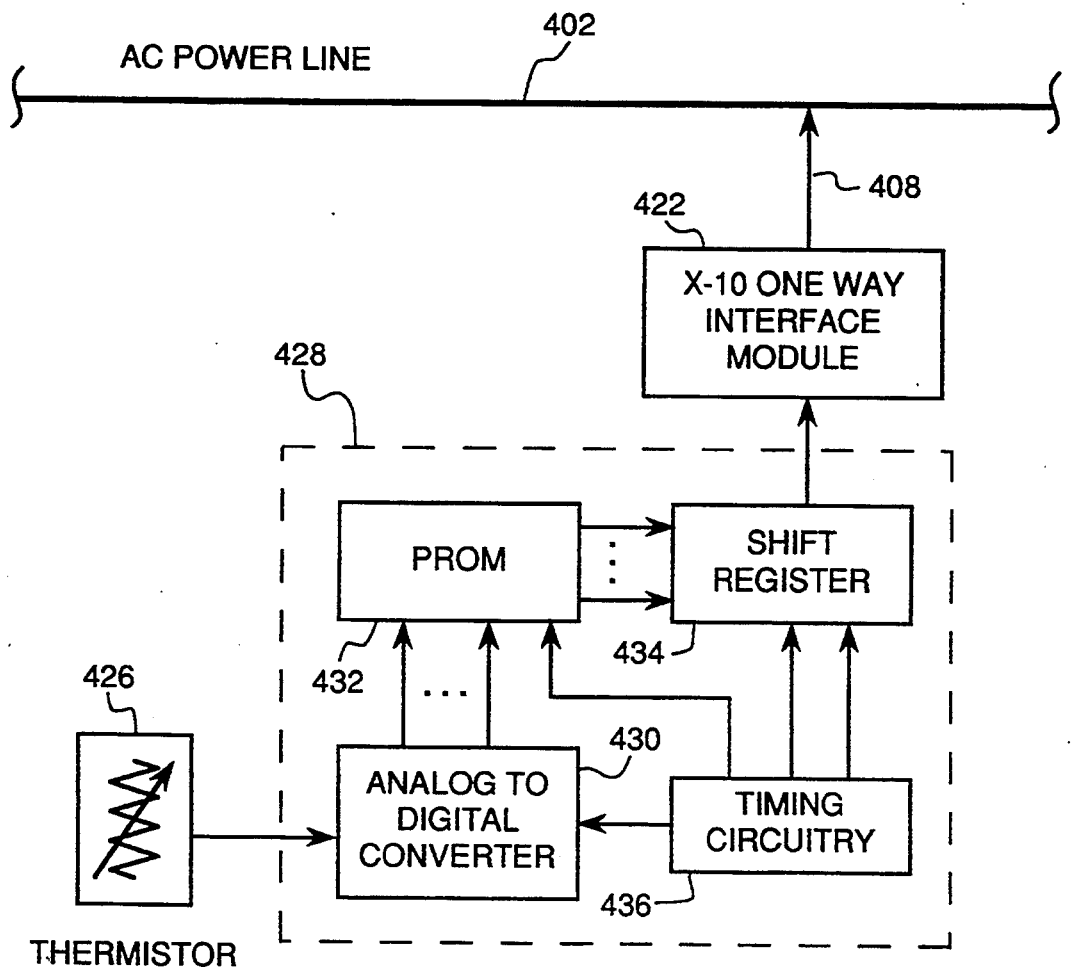
FIG. 8C is a schematic block diagram of the interface circuitry used to connect a one-way power-line interface module to a temperature sensor.

FIG. 8C is a schematic block diagram of the I/O adapter circuitry 428 used to connect the one-way interface module 422 to a temperature sensor performing the function of the analog thermometer 426. In this embodiment, the status of the hot water heater 424 is monitored over an X-10 input channel using an A/D data transmission scheme such that the actual temperature of the water can be determined and displayed at the PC. In this manner, the control program running on the host PC 12 can monitor the temperature of the hot water heater and delay the operation of other appliances using the hot water, such as a dishwasher or washing machine, until a certain temperature is reached. This would provide a basic energy management system. Clearly, more sophisticated energy management techniques would be apparent to those skilled in the art.

In FIG. 8C, an analog input voltage from the thermistor is applied to the input of an A/D converter 430 (such as a type ICL7109 12-bit A/D manufactured by Intersil). The digital output is coupled to the address lines of a Programmable Read-Only Memory (PROM) 432 (such as a type NMC27C64 manufactured by National Semiconductor). The PROM is programmed to convert the analog data values output from the A/D into the proper X-10 code format. In the preferred embodiment, the Extended Code and Extended Data formats are used to send the analog temperature data. (For further details of these X-10 code formats, refer to the aforementioned X-10 POWERHOUSE Technical Note.) The parallel data output from the PROM is then routed to a shift register 434 for serial transmission to the one-way interface module 422. As before, the interface module 422 modulates a 120 kHz carrier on the 60 Hz AC line for transmission. The timing circuitry 436 provides the necessary timing signals to each of the other circuits. More specifically, the A/D converter receives a sampling clock signal (e.g., 61.45 kHz), the PROM receives a bit clock signal (e.g., 1 msec.), and the shift register receives both a burst clock signal (e.g., 2.77 msec.) and an output clock signal (e.g., 900 seconds).

Note, however, that a more simplified hot/cold monitoring scheme could be used as I/O adapter circuitry 428 if only a hot/cold or on/off status signal needs to be sent to the host PC. In that case, the thermistor would be connected to one input of a comparator, a hot/cold threshold voltage connected to the other input of the comparator, such that the one-bit binary output would address the PROM to select one of only two stored codes, which are output to the shift register.

The dishwasher appliance 440 in FIG. 8A is similarly coupled to the AC power line 402 via I/O adapter circuitry 442 and another X-10 two-way interface module 444. As stated before, the X-10 two-way interface module can receive and transmit X-10 codes in order to both monitor and control the operation of the dishwasher 440. In this embodiment, the I/O adapter circuitry 442 would simply couple a device monitor signal from the on/off power indicator light of the dishwasher 440 to the transmit input of the two-way interface module 444, and would couple a device control signal from the interface module 444 to the cycle reset circuitry of the dishwasher. (For further details of the interface module lines, refer to the aforementioned X-10 POW- ERHOUSE Technical Note and/or FIG. 8B.) In an alternative embodiment, a two-way transceiver appliance module (such as the X-10 model no. RR501) could be used in place of both the interface module 444 and the I/O adapter circuitry 442 to monitor the on/off status of the dishwasher. Still another alternative embodiment for the I/O adapter circuitry is discussed in the next figure.

Figure 8D:
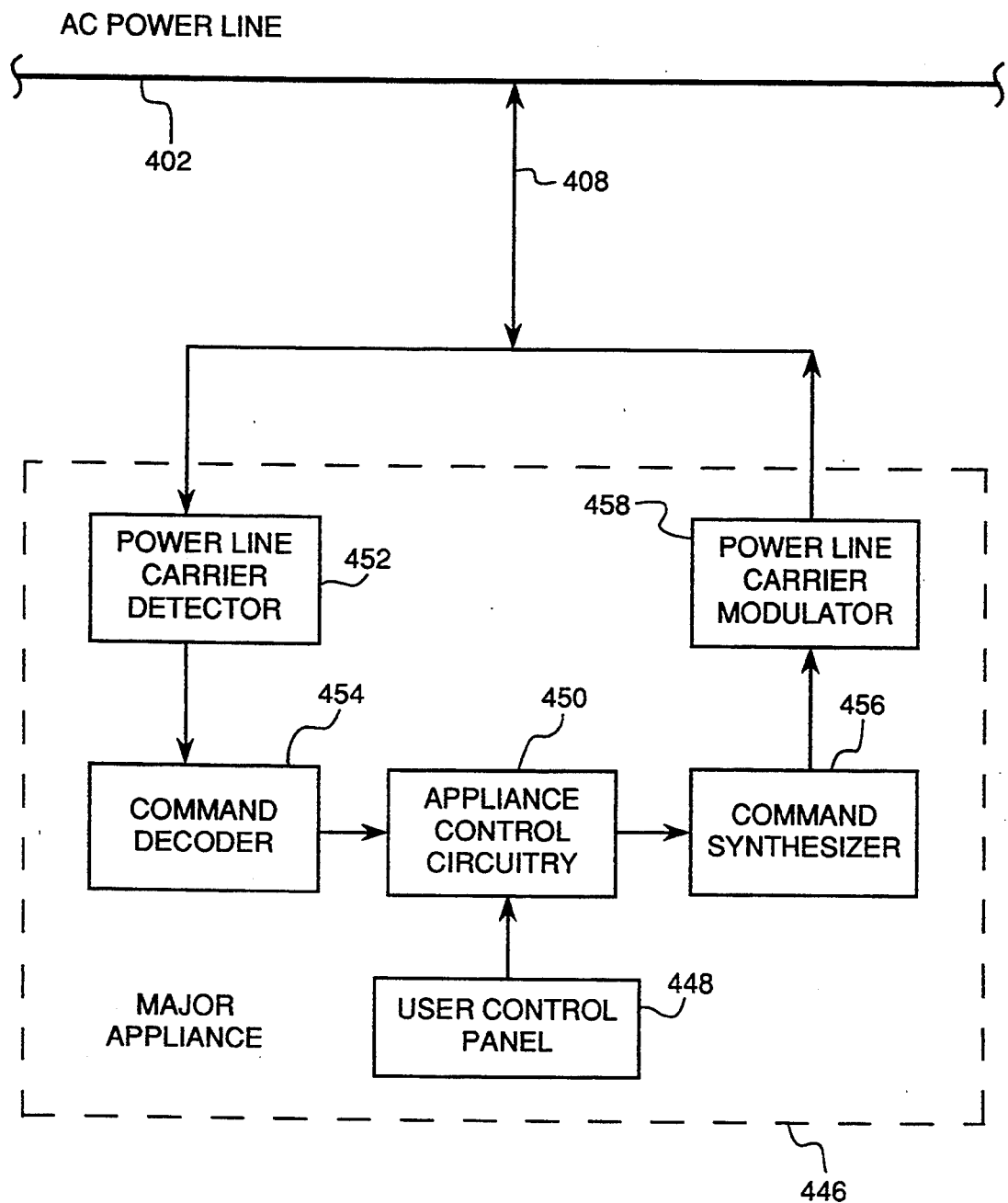
FIG. 8D is a block diagram of an alternate embodiment of a major household appliance having a built-in AC power-line interface.

FIG. 8D is a general block diagram of a major appliance 446 which is designed to be monitored and controlled directly over the AC power line using the X-10 code format. An example of such an appliance would be a microcomputer-controlled dishwasher. The user control panel 448 would interface to the appliance control circuitry 450, which would control and monitor all of the relevant functions of the appliance. In this embodiment, the X-10 interface module 444 and the I/O adapter circuitry 442 (of FIG. 8A) would not be required. The major appliance 446 would include its own power-line carrier detector 452 for demodulating the control signal directly from the AC power line 402, and a command decoder 454 for decoding the X-10 codes. Similarly, the appliance control circuitry 450 would generate a monitoring signal to a command synthesizer 456, which would generate X-10 status commands. A power line carrier modulator 458 would modulate the X-10 status commands onto the power line for transmission back to the host PC. Since the power-line carrier detector, command decoder, command synthesizer, and power-line carrier modulator would be constructed to be compatible with the X-10 code format, a further description of these blocks is not necessary. (Refer to the aforementioned X-10 POWERHOUSE Technical Note for further details of the X-10 code formats, the transmit and receiving timing diagrams, and the schematic diagrams.)

Note that in FIG. 8A, a separate X-10 controller 460 (such as the X-10 Mini Controller model no. MC260 or the Computer Interface Controller model no. CP290) is shown connected to the AC power line 402, typically at a location remote from the host PC 12. Therefore, the user can maintain control of the lamps and appliances via the X-10 modules without using the host PC, which may be in another room of the house. Since the X-10 controller 460 only outputs X-10 codes to the AC power line 402, it cannot monitor the status of any of the appliances. However, the host PC 12 can monitor the status of the appliances, since the X-10 output codes provided by the X-10 controller 460 are always input to the keyboard port of the PC 12 via the I/O Bridge device 14. Therefore, the present invention provides a monitor and control system having distributed intelligence.

Figure 9A:
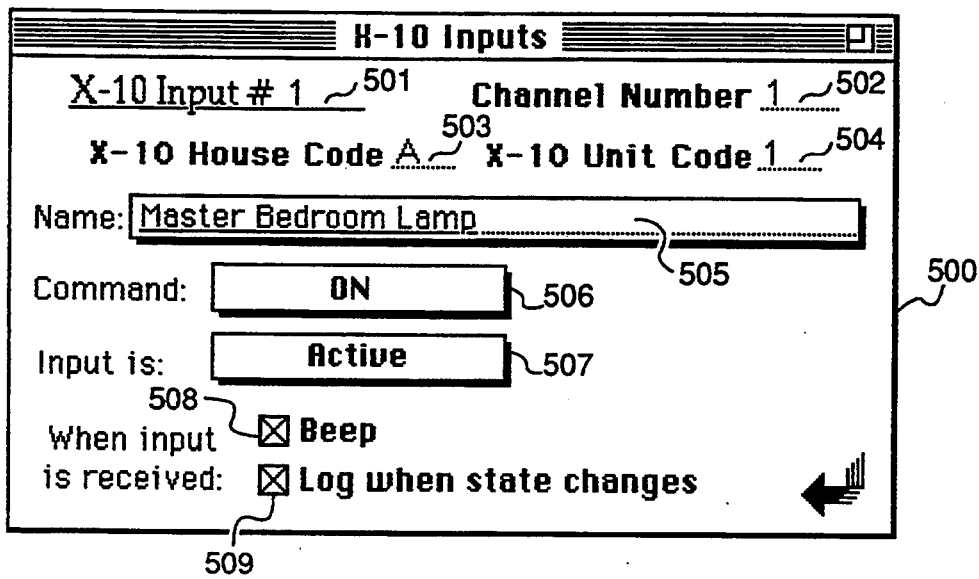
FIGS. 9A, 9B, 9C, and 9D are pictorial representations of screen displays presented on the personal computer display monitor for use with the home automation system shown in FIG. 8A.

FIG. 9A is a pictorial representation of the screen display presented on the host PC display monitor when an X-10 input is selected by the user to obtain the specific information about that X-10 channel. The X-10 input window 500 operates in much the same manner as the digital input window 120 shown in FIG. 3C, described above. The MASTER CONTROL program automatically enters the X-10 reference name in field 501 and the X-10 channel number in field 502. The user enters the X-10 house code (A–P) and unit code (1–16) in fields 503 and 504, respectively, and chooses a functional name for the X-10 input channel in field 505. In this example, the X-10 input window is used to monitor the status of the master bedroom lamp. The command button 506 is used to indicate whether an "on", "off", "dim", or "bright" command has been selected by the user. If the particular X-10 input channel is not going to be used, the user may click on button 507 and disable the input, wherein the word "inactive" will appear in the button. This would tell the INIT driver program to ignore the X-10 input. As before, if the user would like the computer to beep when the input changes, button 508 is selected, and if the user would like to keep a running log of events each time the state changes, then button 509 is selected.

Note that the master bedroom lamp would normally be connected to an X-10 lamp module such as module 414 of FIG. 8A. The lamp would then be assigned an X-10 output channel (see FIG. 3I) in order to be controlled by the PC. Since the X-10 lamp module is an output control module only, it cannot report its on/off status to the PC as an X-10 input channel. However, its status can still be determined as an X-10 input since the PC constantly monitors the AC power line 402 for X-10 codes. For example, in FIG. 8A, if only the host PC generates the X-10 commands for the table lamp 416, the MASTER CONTROL program would know the on/off status of the lamp. However, if a separate X-10 controller 460 were to generate an X-10 command, the MASTER CONTROL program would be aware of this change in status since it constantly monitors the AC power line through the X-10 two-way interface module 404. If the table lamp were turned on via the table lamp switch itself, the MASTER CONTROL program in the host PC would not be aware of the status change, since no X-10 codes can be sent via the X-10 lamp module 414. However, if the X-10 lamp module 414 were replaced with a two-way transceiver appliance module (X-10 model no. RR501), the on/off status of the table lamp would be reported back to the host PC over the AC power line. Therefore, depending upon the particular application, the system can be configured to constantly monitor and display the status of all the peripheral devices connected to the AC power line.

Figure 9B:
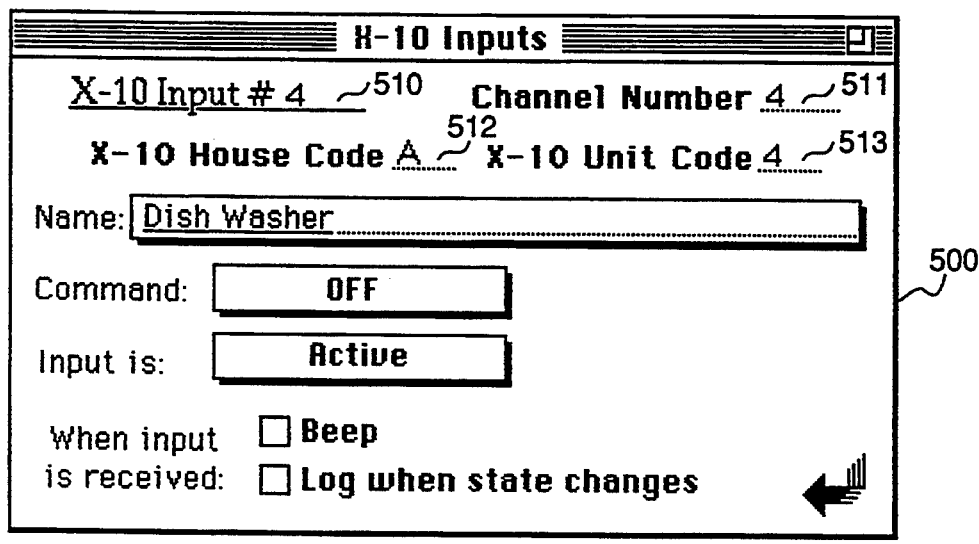

FIG. 9B illustrates another X-10 input window 500 for the dishwasher 440 of FIG. 8A. In this case, however, the the X-10 input channel #4 (fields 510 and 511) and X-10 house code A4 (fields 512 and 513) are used. A corresponding X-10 output channel would also be assigned to the dishwasher. As discussed above in conjunction with FIGS. 8A and 8D, the status of the dishwasher can be monitored directly by the host PC 12 via the I/O Bridge device 14 and the two-way interface modules 444 and 404. Note that the same X-10 input and output channel designations would be used, i.e., the I/O Bridge device is monitoring and controlling the dishwasher over only one X-10 channel A4, since a single two-way interface module 444 is used with the dishwasher.

Figure 9C:
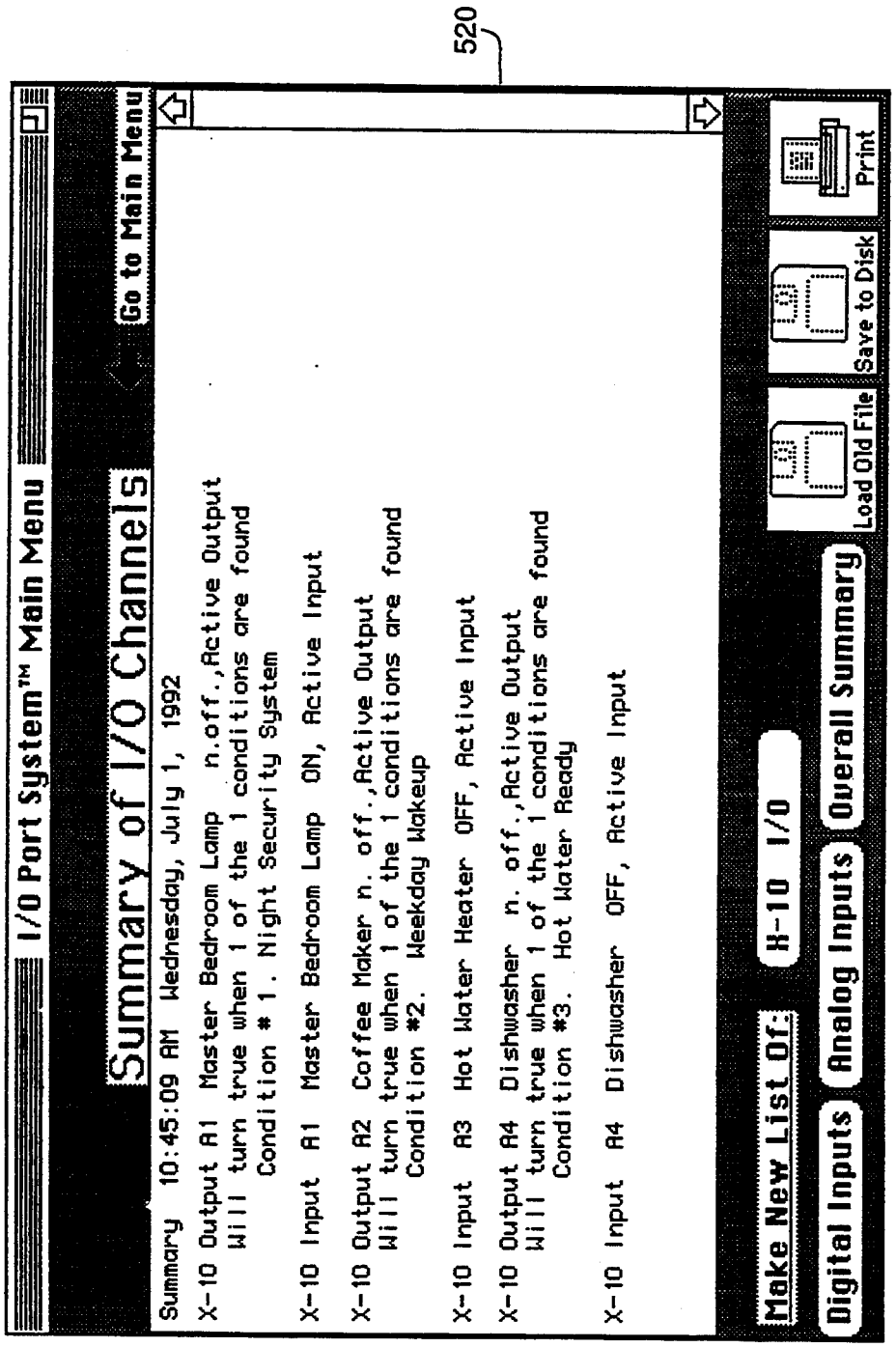

FIG. 9C presents the overall summary of the X-10 inputs and outputs in display screen 520, which operates in the same manner as screen 230 of FIG. 3K, but displays only the X-10 inputs and outputs. As illustrated in FIG. 9C, the master bedroom lamp is set up as X-10 input and output channel 1 (house/unit code A1), which will automatically be activated by the night security system satisfying Condition No. 1. The coffee maker, on the other hand, is set up only as an X-10 output to turn on via Condition No. 2. The hot water heater is monitored via X-10 its input status will be determined by the type of I/O adapter circuitry 428 which is used to monitor the temperature of the water. For example, if the more sophisticated analog data transmission scheme described in FIG. 8C is used, then the actual temperature of the water can be displayed at the PC. However, if the simplified hot/cold monitoring scheme is used, only a hot/cold or on/off status can be reported to the user. Finally, the dishwasher is set up to be monitored and controlled over X-10 input A4. Note that Condition No. 3, "Hot Water Ready must be satisfied before the dishwasher will turn on.

Figure 9D:
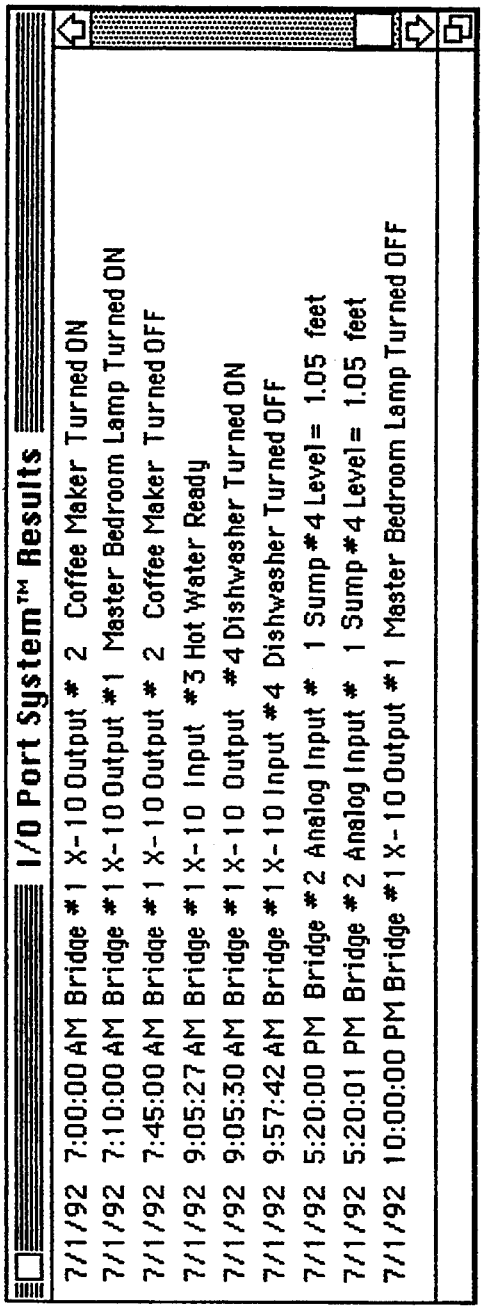

FIG. 9D illustrates the logged data results display screen 530, similar to that shown in FIG. 3L. The results screen 530 lists the last 200 transactions which were logged by the multiple INITs controlling the various I/O Bridge devices. As illustrated in the figure, the appliances shown in FIG. 8A are automatically being monitored and controlled, and the logged results are available as shown. Note that both X-10 inputs and outputs are shown. Also note that the logged data results appear for multiple I/O Bridge devices controlled via multiple INITs running in the background.

Figure 10A:
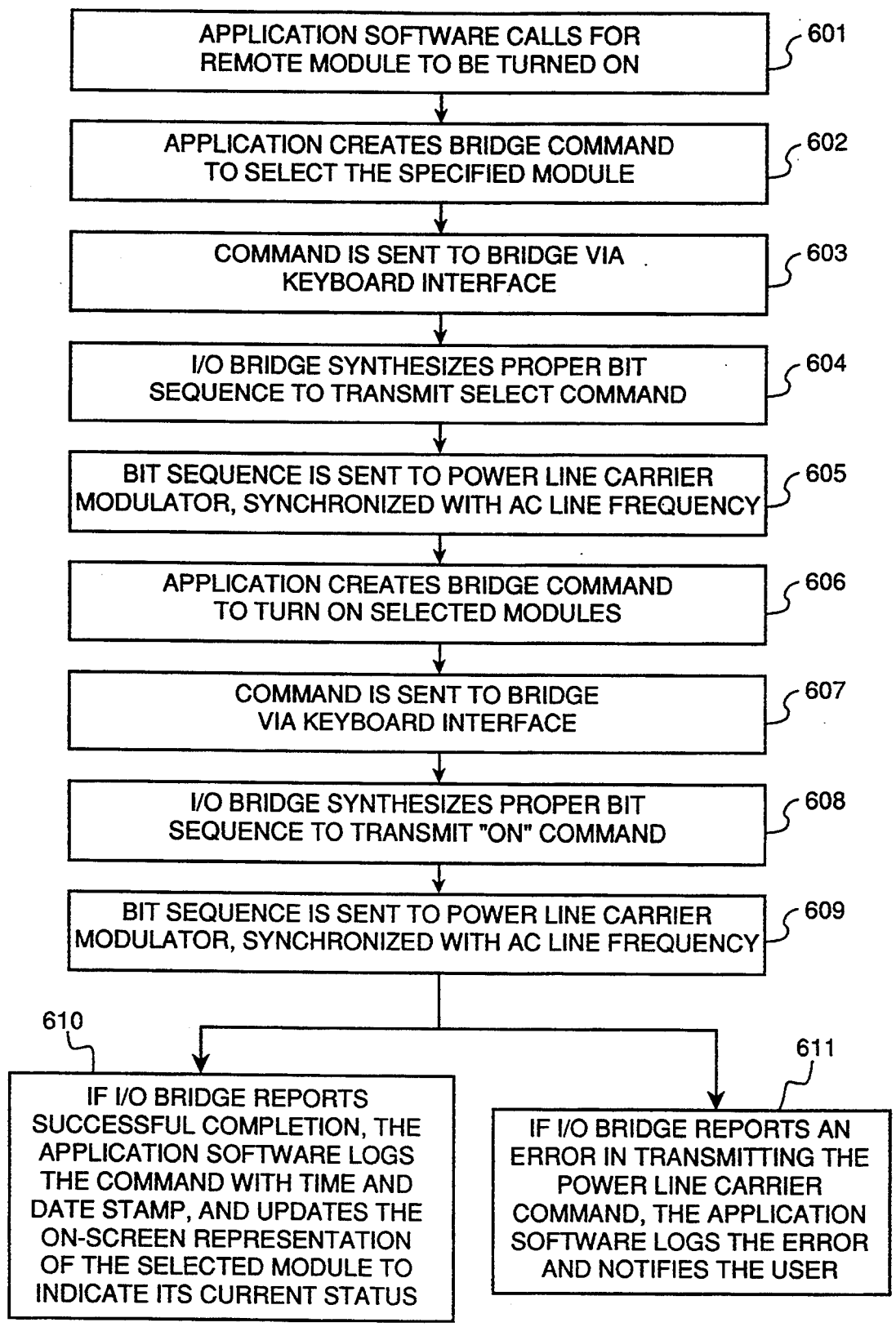
FIGS. 10A and 10B are flowcharts illustrating the operation of the peripheral data acquisition, monitor, and adaptive control system using X-10 modules.
Figure 10B:
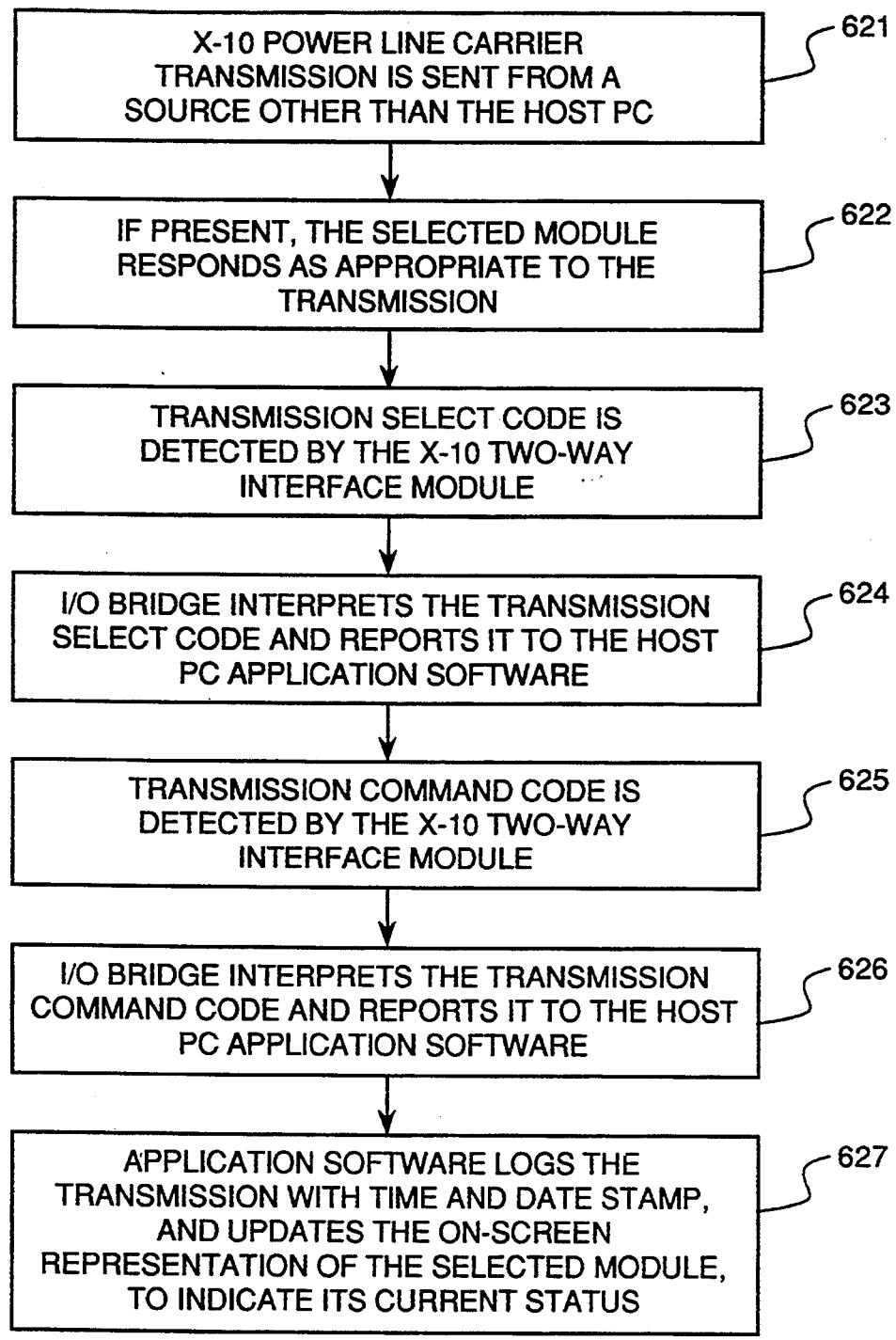

FIGS. 10A and 10B are flowcharts illustrating the operation of the peripheral data acquisition, monitor, and adaptive control system using X-10 modules. FIG. 10A illustrates the system operation for an X-10 code output generated by the MASTER CONTROL program in the PC, while FIG. 10B illustrates the system operation for an X-10 code output generated from a source other than the PC and treated as an X-10 input by the MASTER CONTROL program. Both of these Figures generally correspond to the system shown in FIG. 8A.

In Step 601 of FIG. 10A, the application software program, such as a dedicated INIT, calls for a particular remote X-10 module to be turned on. As discussed above, the INITs are the driver programs in the preferred embodiment. However, this may not be the case for other types of PC's. In Step 602, the application software program creates the associated I/O Bridge command to select the specified X-10 module. During this step, information is sent to the I/O Bridge device 14 to generate the X-10 transmission select code. In the preferred embodiment, four data bytes are used: an X-10 identifier byte, the X-10 house code, the X-10 number code, and an I/O Bridge control byte.

In Step 603, the I/O Bridge command is sent from the host PC 12 to the I/O Bridge device 14 via the keyboard port. Next, in Step 604, the I/O Bridge itself synthesizes the proper bit sequence to transmit the X-10 transmission select code for the X-10 module. In other words, the I/O Bridge generates the proper X-10 code based upon the I/O Bridge command information. In Step 605, the X-10 code bit sequence is sent through the I/O adapter circuitry 406 to the power-line carrier modulator of the interface module 404 via the PA5 output. As discussed above, the bit sequence must be synchronized with the AC line frequency. This is accomplished using the PA4 tachometer input line.

In Step 606, the application software program creates the I/O Bridge command needed to activate the selected module(s). Hence, another four bytes of data are sent to the I/O Bridge to provide the X-10 function code to be transmitted to the X-10 module, e.g., an "on" command. Again, the I/O Bridge command is sent to the I/O Bridge via the keyboard interface in Step 607. In Step 608, the I/O Bridge device synthesizes the proper bit sequence to transmit the function code to the previously-selected X-10 module. Next, in Step 609, the bit sequence is set to the power-line carrier modulator of the interface module 404, again synchronized with the AC line frequency.

The I/O Bridge device 14 then determines whether or not an error has occurred in transmitting the power-line carrier command to the two-way interface module 404. This is accomplished by monitoring the tachometer input line PA4 for the proper 60 Hz pulse train from the interface module 404. For example, if the I/O adapter circuitry 406 was defective, or if the X-10 two-way interface module 404 was missing or disconnected, the I/O Bridge would be aware of a transmission error. If, in Step 610, the I/O Bridge reports a successful X-10 code transmission to the AC power line 402, the application software then logs the command with a time and date stamp, and updates the on-screen representation of the selected module to indicate its current status. If, on the other hand, the I/O Bridge device notes an error in transmitting to the AC power line, the I/O Bridge will report the error to the applications software program in Step 611. The application software then logs the error with a time and date stamp and notifies the user of the error.

FIG. 10B illustrates the system operation for an X-10 code output generated from a source other than the PC 12. In Step 621, an X-10 carrier transmission is sent from a source other than the host PC. This source could be either the separate X-10 controller 460, a two-way interface module 444, or a two-way transceiver appliance module. Next, in Step 622, the selected module will respond as appropriate to the X-10 code transmission, so long as a module exists with the correct address. In Step 623, the transmission select code is detected by the two-way interface module 404, and the I/O Bridge device 14 is notified via the I/O adapter circuitry 406. In Step 624, the I/O Bridge device decodes the transmitted select code and notifies the application software via the keyboard interface.

Similarly, in Step 625, the transmitted command code is detected by the two-way interface module 404. In Step 626, the I/O Bridge device decodes the command code and forwards it to the PC. Finally, in Step 627, the application software logs the transmission with a time and date stamp, and updates the on-screen representation of the selected module to indicate its current status. Hence, using both X-10 inputs and outputs, the system has the ability to respond to changing conditions in the real world and control peripheral devices in accordance with those changes. This monitor and control operation occurs virtually in real time, and operates over an existing transmission media interfaced through the keyboard port of a PC.

The automated home system of FIG. 8A is particularly well adapted to operate in accordance with the software control program screen display sequence described previously in FIGS. 4A–4D, wherein a sequence of pictorial location displays, such as floorplans, are presented to orient the user as to the specific location of the device being controlled and/or monitored.

More specifically, FIG. 4A, which illustrates a pictorial representation of the overall physical layout of a particular facility, could readily be modified to present a bird's eye view of the user's home, including any outdoor devices that are electrically monitored and controlled by the system. Such a graphical overview could be made by scanning a copy of the survey of the property, or simply by drawing a representative floorplan of the user's home using a painting or drawing application program. This screen display of the "big picture" would illustrate the approximate physical location of groups of devices being monitored and controlled. The display at this level would probably not include a representative icon for every device in each room. Instead, the user would be directed to move the mouse pointer over the various rooms or locations, select a particular location, and proceed with the next level of screen displays.

Once the user chooses a particular location or room of the house, the next screen display would illustrate the chosen location or room, and present a representative icon showing the exact location and function of each electronic device, similar to FIG. 4B. For example, if the living room was selected, the screen display would show an icon for a remotely-controlled television, a VCR, a lamp, an overhead fan, etc., all in the same room. Once the user moves the mouse pointer over the various electronically-controlled devices, the devices are highlighted and a text description (if not already present) would appear on the screen.

Once a particular piece of electronically-controlled equipment is selected by the user, the program would move to the third level of screen displays to illustrate a pictorial view of the control panel of the specific device chosen in the previous screen. Continuing with the example of the VCR, a soft control panel illustrating the appropriate controls and displays would be shown, similar to that shown in FIG. 4C. The user would then be able to operate the controls using the mouse pointer on the simulated VCR controls, and would be able to monitor the device using the simulated VCR readouts duplicated on the screen. This feature is particularly useful if the soft control panel shown in the third level of the screen displays simulates an actual control panel of the device being controlled.

Hence, the peripheral data acquisition, monitor, and adaptive control system of the present invention is very user-friendly when the sequence of screen displays first illustrates zones or physical locations of a number of devices, then illustrates the particular location and function of each device in the group, and then illustrates the soft control panel of the chosen device, wherein commands are input by the user to perform the desired control function.

The following modifications to the MASTER CONTROL program are required to implement X-10 inputs. Referring to FIG. 5C, wherein the MASTER CONTROL logic map is illustrated, X-10 inputs would be treated the same as digital inputs 356. In other words, X-10 inputs would be logged to disk at 358 and used to generate the conditionals at 340. Similarly, the system setup procedure illustrated in FIG. 6E is modified to treat X-10 input screens the same way that digital input screens are set up. Finally, in FIG. 6F, the overall system operational flow of the MASTER CONTROL program would include the step of making a new listing of X-10 inputs after the list of the analog inputs is made but before the list of the X-10 outputs is made.

Figure 11:
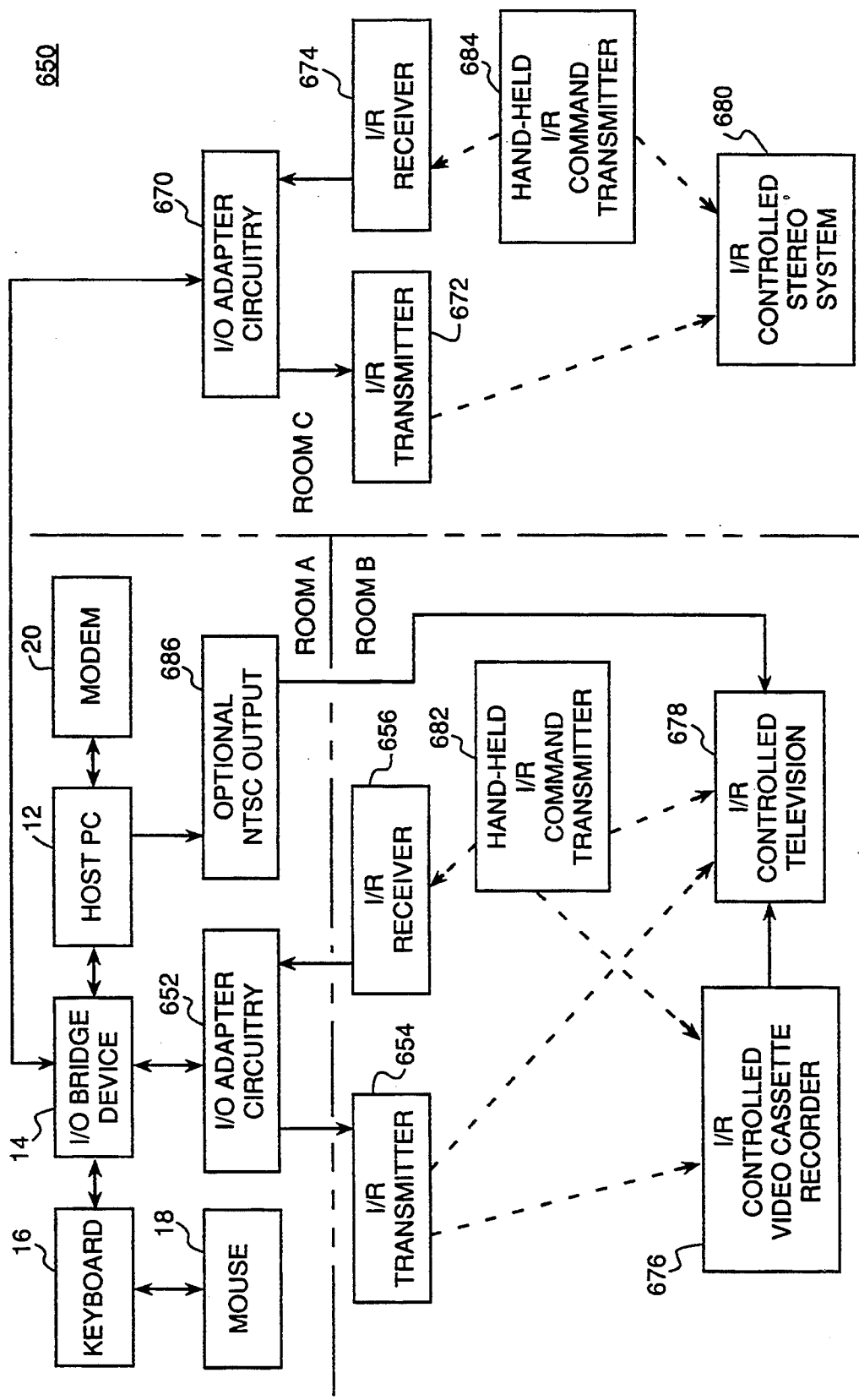
FIG. 11 is a general block diagram of another alternate embodiment of the present invention, wherein the monitor and control of a home automation system is performed via infrared transmission.

FIG. 11 is a general block diagram of another alternative embodiment of the present invention, wherein the monitor and control of a home entertainment system 650 is performed using infrared (I/R) transmission. The figure illustrates three rooms of a typical automated home. Room A is the computer room, e.g., office or study. Room B is a first entertainment room having video equipment, e.g., a living room. Room C is a second entertainment room with audio equipment, e.g., a den or family room. The audio and video equipment have remote control capability with internal I/R receivers designed to be used with hand-held I/R transmitters. Modern "universal" remote transmitters can synthesize commands for a wide variety of entertainment equipment provided by different manufacturers.

Room A contains the host PC 12 coupled to the I/O Bridge device 14 via the keyboard port. Additional I/O adapter circuitry 652 is used to couple the I/O Bridge device 14 to an infrared transmitter 654 and an infrared receiver 656 located in Room B. Similar I/O adapter circuitry 670 is located in Room C along with another infrared transmitter 672 and infrared receiver 674. By positioning an I/R transmitter in each room with the entertainment equipment, each being controlled by the I/O Bridge device 14, the host PC 12 has the ability to send any command to that equipment. For example, the user could communicate with his PC from a remote location via the modem 20, and instruct the computer to program the video cassette recorder (VCR) 676 to record a particular program. Similarly, the computer could turn on the TV 678 at a specific time and select a particular channel via the infrared transmission path. In Room C, the host PC could turn on the stereo system 680 at particular times of the day, or whenever a person enters the room. In fact, the MASTER CONTROL program could select a particular FM station at a predetermined volume level at different times of the day when different users are most likely to occupy the room.

A hand-held I/R remote transmitter 682, 684 would normally be present in each room, or carried from room-to-room by the user. If the infrared receiver 656 in Room B were properly positioned in the vicinity of the entertainment equipment, then all of the I/R transmissions from the hand-held transmitter 682 would be received and forwarded via the I/O adapter circuitry 652 and the I/O Bridge device 14 to the host PC in Room A. Similarly, in Room C, the I/R receiver 674 would monitor all I/R transmissions from hand-held transmitter 684 and forward the information to the host PC in Room A. This would provide for the complete monitor and control of the home entertainment system via the host PC from any location in the home that is equipped with an I/R transmitter and receiver. If the entertainment equipment were designed with an internal infrared transmitter programmed to report the status of the equipment, a two-way I/R link would be established directly between the I/R controlled equipment 676, 678, 680 and the infrared receivers 656, 674.

If an optional NTSC video output 686 were provided as shown in the figure, the status of the home entertainment system could be displayed throughout the house. Any television or video monitor connected to the NTSC output would be able to display, at the user's request, the MASTER CONTROL panel and other information about appliances, energy usage, security, etc. (This information would otherwise be available only in Room A on the host PC.) The keys on the hand-held I/R transmitters would be used to allow the user to operate the menus and windows of the MASTER CONTROL program from a remote location just as the mouse is used with the host PC. For example, commands transmitted via the user's hand-held transmitter 682 to the infrared receiver 656 in Room A could be used to program the VCR 676 in accordance with a particular schedule or condition resident only in the host PC. As another example, the FM station being received by the stereo system 680 in Room C could be changed with the hand-held transmitter 682 from Room B by selecting the desired MASTER CONTROL program menu on the screen of the television 678. The host PC would then transmit the appropriate I/R command to the stereo system 680 via the I/O Bridge device 14, the I/R adapter circuitry 670, and the infrared transmitter 672 in Room C.

The construction and location of the I/O adapter circuitry 652, 670 would depend upon the sophistication of the infrared transmitters 654, 672 and the infrared receivers 656, 674. In one embodiment, for example, the tachometer input line PA4 of the I/O Bridge device 14 would be connected to the output of a standard I/R receiver module (such as type GP1U52X available from Radio Shack). The receiver module detects the infrared radiation of the desired wavelength, amplifies it, and demodulates the 40 kHz carrier to reproduce the pulse-code modulation (PCM) bitstream. The I/O Bridge device 14 then decodes the bitstream to derive the original I/R command. In this embodiment, the receiver portion of the I/O adapter circuitry 652 would consist of nothing more than a wire. Similarly, the I/O Bridge device 14 can directly synthesize PCM and output it via the PWM output line PA5 to the infrared transmitter 654. Hence, the particular details of the I/O adapter circuitry blocks would be apparent to one familiar with I/R circuitry.

Figure 12:
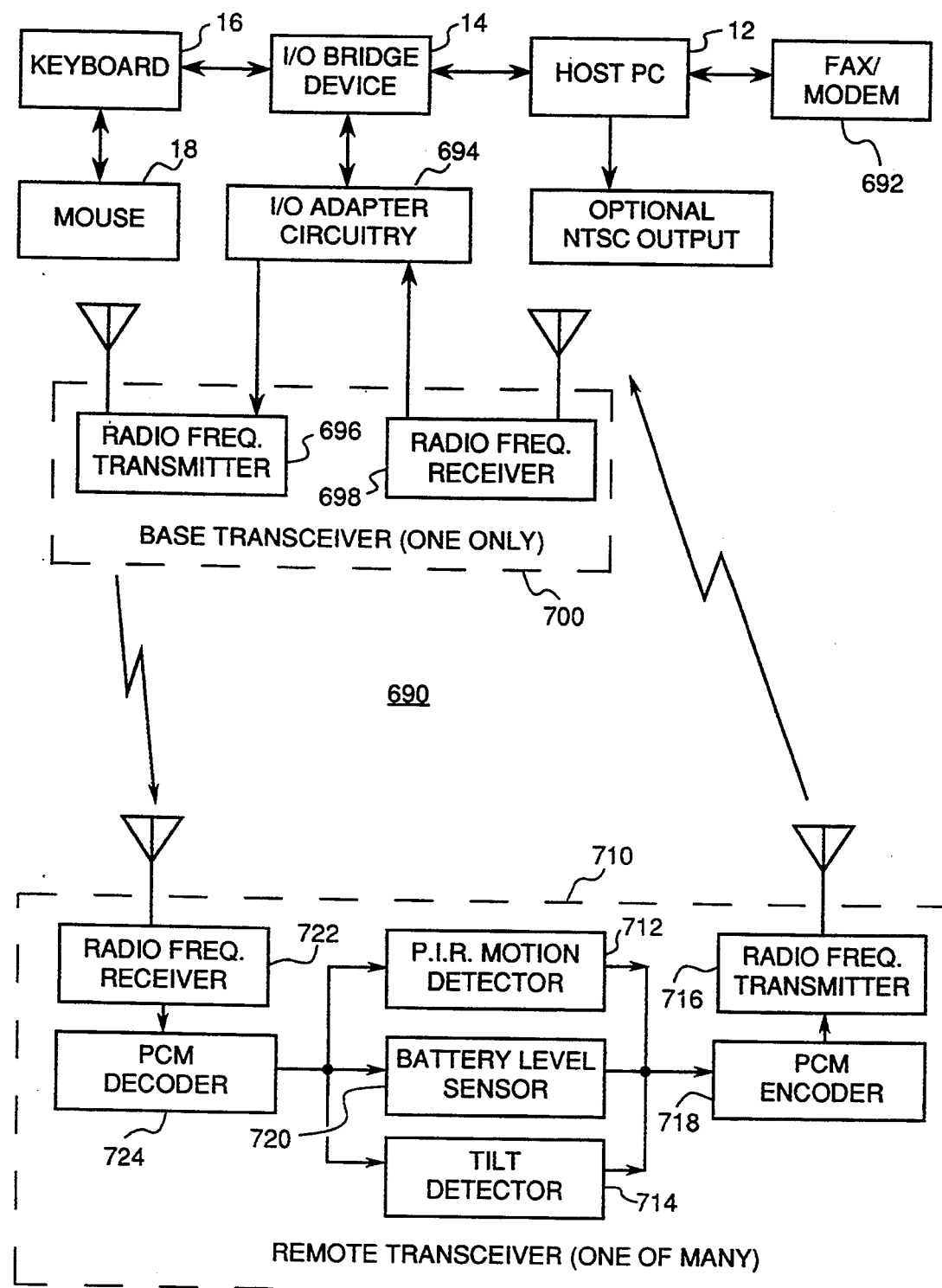
FIG. 12 is a general block diagram of a further embodiment of a peripheral data acquisition, monitor, and adaptive control system used in a radio frequency security system for an automobile dealer.

FIG. 12 is a general block diagram of a further embodiment of the present invention used with a radio frequency security system 690 for an automobile dealer. Generally, the system 690 is comprised of a central station having the host PC 12, the I/O Bridge device 14, keyboard 16, and mouse 18 as before, along with a fax/modem 692, and specific I/O adapter circuitry 694 designed to interface with a radio frequency (RF) transmitter 696 and RF receiver 698 of a base transceiver 700. The system further comprises one or more remote transceivers 710 with a number of security sensors. Each remote transceiver 710 is a self-contained battery-powered unit designed to be placed inside each vehicle on the automobile dealer's lot. Note that the remote units need not be transceivers, as the security system may be implemented with only remote transmitters in the vehicles. However, in the preferred embodiment, the remote units have receive capabilities for the reasons discussed below.

Once vehicle intrusions are detected at the remote transceiver 710, an alarm signal is transmitted to the base transceiver 700 and forwarded to the I/O Bridge device 14. In the preferred embodiment, the I/O Bridge communicates via the ADB with a MACINTOSH II computer located in the main office building of the lot. All transmissions would be logged at the PC, with a time and date stamp, to provide for the tracking of vehicle intrusions, false alarms, and other events. The application software can be programmed to segregate transmissions into alarm events and maintenance events. Alarm events would be saved in a special file which cannot be altered without a proper password, while maintenance events may not need the same protection. In a typical application, the host PC 12 would be a portable MACINTOSH computer with a hard disk, and could also include an optional ink jet printer to print the status and maintenance reports.

Vehicle intrusion is detected by an ultrasonic or microwave field disturbance sensor, or passive infrared (PI/R) motion detection circuitry 712. A vehicle tilt sensor 714 is also included to respond to the vehicle being jacked or towed. The tilt sensor may also be designed to respond to vibration or bouncing of the vehicle due to tampering.

The central station continuously monitors vehicle status, then takes appropriate action when the status changes. For example, the central station has the capability to dial the telephone and play voice messages to the Police or to other security personnel. If the telephone line fails, the host PC may be configured to utilize a cellular telephone. Alternatively, the central station could signal a pocket pager, preferably with specific text messages describing the alarm situation. The central station can also be programmed to send a fax to the Police indicating the precise location of the source of the alarm, i.e., which vehicle in which lot.

The RF transmitter 716 of the remote transceiver 710 modulates an RF carrier with a PCM signal provided by a PCM encoder 718. The remote transceiver has the capability to send the following information via 12-bit PCM encoding: Vehicle secure, battery OK (sent once per hour); Vehicle secure, battery low (sent once per hour); Vehicle intrusion detected (sent as soon as detected); Vehicle tilt detected (sent as soon as detected); and Unit ID code (sent with each transmission). Each digital code transmission is repeated, such that multiple receptions of the same information are required to minimize susceptibility to interference and noise. Although unit ID codes may be assigned to individual vehicles, this may not be necessary in many applications, since an intrusion in any vehicle on a particular lot may require that the entire lot be searched and secured. Instead of sending the battery status information to the base transceiver hourly, it could be sent on a preplanned schedule, or transmitted at random intervals, or only in response to a polling sequence (see below).

Each remote transceiver 710 has its own power supply, separate from the vehicle's battery. Although power usage for most RF transmissions would be minimal, since they would occur infrequently, a battery level sensor 720 is still included in order to detect and transmit a "Battery Low" indication at least 72 hours before the transmitter ceases operation. The remote transceiver power supply is typically comprised of rechargeable NiCad batteries, and may include solar cells for recharging.

In the preferred embodiment, the remote transceiver transmitter 716 has a range of approximately of 1,000 feet at 900 MHz. A number of remote receivers or repeater stations, therefore, may be required for each 1,000 foot radius, depending upon the size of the automobile lot. Each receiver or repeater station would be linked with the base transceiver at the central station via a telephone link or RF channel. The repeaters are typically mounted on steel towers or buildings to prevent tampering. Alternatively, the repeaters could be placed in special vehicles on the car lot, strategically located for that purpose. Such a special vehicle would be equipped with the necessary antennas, power supplies, and other equipment to support the repeater function. Additional security devices may also be necessary to protect the repeater station.

If desired, the remote transceiver may also include an RF receiver 722 and a PCM decoder 724 for receiving transmissions from the base transmitter 696. This system configuration is necessary to implement a polling scheme, wherein the status of each remote transceiver can be monitored by the central station at shorter time periods. Furthermore, the central station may need to disarm a particular remote transceiver, e.g., if the unit was malfunctioning. Finally, the entire security system may need to be disarmed during specific hours of the day. If two-way communication between the base transceiver and the remote transceiver is maintained, then the central station can control the operation of all the remote transceivers in accordance with any schedule changes programmed into the PC 12.

In review, it can now be seen that the present invention provides a peripheral data acquisition, monitor, and adaptive control system which allows the user to easily create, modify, and test complex control system configurations on a personal computer. The program can be configured to orient the user with respect to the physical location and function of the equipment being controlled by the system. The system's computer software program runs in the background even while an unrelated application program runs in the foreground, and the background program can execute sophisticated conditional statements to control an output, record events in real time, and display a recorded table of events on command. All of this can be accomplished using an I/O Bridge device which interfaces to the personal computer via the keyboard port and which performs data acquisition by emulation of keyboard keystrokes.

While only particular embodiments of the invention have been shown and described herein, it will be obvious that further modifications and improvements may be made by those skilled in the art. For example, the image displayed to the user does not need to be an exact representation of the overall geographic layout or real-world equipment as would be obtained from a photograph, blueprint, or live video picture as in some of the above embodiments. Instead, the displayed image need only substantially represent the geographic layout, physical location, or piece of equipment to the degree necessary to provide sufficient details and convey enough information to the user to accomplish the functions stated above. Accordingly, the appended claims are intended to cover all such modifications and alternative constructions that fall within the true scope and spirit of the invention.

What is claimed is:

1. A system for monitoring and controlling a remotely-located, electrically-controlled device, said device having at least two operational states, and having means for changing said operational states in response to a device control signal, and having means for providing a device monitor signal at least indicative of changes in each of said two operational states of said device, said system comprising:
   computer means for executing at least one software program under user control, said computer means including a central processor, a display monitor, and a keyboard bus adapted to be coupled to a keyboard via a keyboard port, said keyboard bus including a bidirectional data line for normally providing two-way data communication between said keyboard and said computer means;
   interface means for interfacing said computer means to said electrically-controlled device, said interface means including:
      means for inputting said device monitor signal from said electrically-controlled device;
      means for modulating a carrier signal with said device monitor signal for transmission;
      means for transmitting said modulated device monitor carrier signal via a wireless or power-line transmission media;
      means for receiving said modulated device monitor carrier signal via said transmission media;
      means for demodulating said modulated device monitor carrier signal to provide said device monitor signal;
      means for translating said device monitor signal into a code signal which is adapted to be interpreted by said computer means; and
      means for coupling said code signal to said computer means using only said keyboard port; and
   wherein said software program of said computer means interprets said code signal and instructs said computer means to provide an indication to the user as to changes in said operational states of said device.

2. The system according to claim 1, wherein said computer means provides command data to said keyboard port, and wherein said interface means further includes:
   means for coupling said command data from said computer means using only said keyboard port;
   means for executing said command data and for providing said device control signal in response thereto;
   means for modulating a carrier signal with said device control signal for transmission;
   means for transmitting said modulated device control carrier signal via a wireless or power-line transmission media;
   means for receiving said modulated device control carrier signal via said transmission media;
   means for demodulating said modulated device control carrier signal to provide said device control signal; and
   means for outputting said device control signal to said electrically-controlled device.

3. The system according to claim 1, wherein said computer means further includes means for generating and displaying a list of changed operational states of said plurality of electrically-controlled devices.

4. The system according to claim 1, wherein said transmission media includes a wireless radio frequency carrier transmission media.

5. The system according to claim 1, wherein said transmission media includes a wireless infrared carrier transmission media.

6. The system according to claim 1, wherein said transmission media includes an AC power-line transmission media.

7. The system according to claim 1, wherein said transmission media includes both a wireless infrared carrier transmission media and an AC power-line transmission media.

8. The system according to claim 1, wherein said translating means includes means for translating said device monitor signal into a keyboard code signal which emulates individual sequential keyboard character keystroke information and which is adapted to be interpreted by said computer means as keyboard keystroke information, and wherein said software program of said computer means interprets said keyboard code signal as keyboard keystroke information.

9. The system according to claim 8, wherein said transmission media includes an AC power-line transmission media.

10. A security system for monitoring a plurality of remotely-located stations by a central station over a radio frequency link, said system comprising: a plurality of remote stations each comprising:

sensor means for sensing a security violation in said remote station and thereby producing an alert signal;

a radio frequency (RF) transmitter including an RF modulator;

circuit means for coupling said sensor means to said RF transmitter such that said alert signal is modulated and transmitted to the central station; and the central station comprising:

a personal computer (PC) having a keyboard bus adapted to be coupled to a keyboard via a keyboard port, said keyboard bus including a bidirectional data line for normally providing two-way data communication between said keyboard and said PC, said PC adapted to communicate with said keyboard via said keyboard bus using a particular keycode format based upon a coding of keyboard keystroke information as individual sequential keyboard characters, said PC further having means for providing an alarm output;

a radio frequency (RF) receiver including an RF demodulator which provides an alarm signal when said alert signal is received, said alarm signal having a signal format not directly compatible with said particular keycode format; and interface means for coupling said RF receiver to said PC via said keyboard port, said interface means including means for translating said alarm signal into keyboard code signals having said particular keycode format.

11. The security system according to claim 10, wherein said plurality of remote stations include a plurality of vehicles.

12. The security system according to claim 10, wherein said means for providing an alarm output includes means for coupling an output signal from said PC to a telephone line.

13. The security system according to claim 10, wherein said central station further includes an RF transmitter for sending inquiry signals to said remote stations, and wherein each remote station includes an RF receiver for receiving said inquiry signals, said system thereby providing two-way communications between said remote stations and said central station.

14. The security system according to claim 13, wherein said PC includes means for executing at least one software program under user control, said software program adapted to provide the user with the ability to configure a station control program for automatically monitoring and controlling said plurality of remote stations, and the ability to store said station control program.

15. A system for controlling a plurality of remotely-located, electrically-controlled devices via a personal computer, each of said devices having at least two operational states, and having means for changing said operational states in response to a device control signal, each of said plurality of devices being physically located at a particular location within at least two geographically-separate sections of a predefined area, said system comprising:

personal computer means for executing a plurality of different software programs under user control, said personal computer means including a central processor, a user display, means for inputting commands from the user, and means for providing a device command signal;

interface means for interfacing said personal computer means to said plurality of electrically-controlled devices, said interface means including:

means for coupling said device command signal from said computer means to said interface means;

means for executing said device command signal and for providing said device control signal in response thereto;

means for modulating a carrier signal with said device control signal for transmission;

means for transmitting said modulated device control carrier signal via a wireless or AC power-line transmission media;

and said system further comprising:

control program means for instructing said personal computer means to control said plurality of devices in accordance with the following steps:

(a) displaying an image to the user which substantially represents an overall geographic layout of the predefined area showing the separate sections of the predefined area within which said plurality of devices are located;

(b) inputting a command from the user which identifies a particular section of the predefined area selected by the user;

(c) displaying an image to the user which substantially represents the approximate physical location and function of each of said plurality of devices located within the particular section selected by the user;

(d) inputting a command from the user which identifies at least one of the plurality of devices selected by the user;

(e) displaying an image to the user which substantially represents a control mechanism for at least the one particular device selected by the user;

(f) inputting a command from the user which corresponds to a desired control action for at least the one particular device selected by the user; and (g) providing said device command signal to said interface means to control at least the one particular device selected by the user in accordance with the desired control action.

16. The system according to claim 15, wherein said plurality of remotely-located, electrically-controlled devices include household or office equipment, such as appliances, lights or entertainment equipment, wherein said predefined area includes a house or office, and wherein said two geographically-separate sections include two rooms of the house or office.

17. The system according to claim 16, wherein said transmission media includes a wireless infrared carrier transmission media.

18. The system according to claim 16, wherein said transmission media includes an AC power-line transmission media.

19. The system according to claim 16, wherein said transmission media includes both a wireless infrared carrier and an AC power-line transmission media.

20. The system according to claim 16, wherein said system further comprises means for monitoring at least changes in the operational states of said devices, and for displaying an image representing these changes in the operational states.

21. The system according to claim 15, wherein said means for inputting commands from the user includes a keyboard bus adapted to be coupled to a keyboard via a keyboard port, and wherein said personal computer means and said interface means communicate only via said keyboard bus.

22. The system according to claim 21, wherein said personal computer means includes a keyboard coupled to said keyboard port, and further includes a pointing device for moving a cursor on the displayed image and selecting a particular portion of the displayed image.

23. The system according to claim 21, wherein said keyboard bus includes a bidirectional data line for normally providing two-way data communication between a keyboard and said personal computer means, said personal computer means adapted to communicate with said keyboard via said keyboard bus using a particular keycode format based upon a coding of keyboard keystroke information as individual sequential keyboard characters.

24. A method of monitoring and controlling at least one peripheral electronic device by a computer having a keyboard port, the monitoring and controlling being performed through an interface unit coupled to the keyboard port, said method comprising the steps of:
 (a) displaying an image to the user which substantially represents a control mechanism for the electronic device;
 (b) inputting a control command from the user which corresponds to a desired control action for the electronic device;
 (c) providing keyboard control data to control the electronic device in accordance with the desired control action;
 (d) coupling said keyboard control data from said computer to said interface unit using only said keyboard port;
 (e) translating said keyboard control data into a device control signal;
 (f) modulating a carrier signal with said device control signal for transmission;
 (g) transmitting said modulated device control carrier signal to the electronic device via a transmission media;
 (h) receiving a modulated device monitor carrier signal from the electronic device via said transmission media;
 (i) demodulating said modulated device monitor carrier signal to provide a device monitor signal;
 (j) translating the device monitor signal into keyboard monitor data;
 (k) coupling said keyboard monitor data from said interface unit to said computer using only said keyboard port; and
 (l) displaying an image to the user, based upon said keyboard monitor data, which substantially represents response from the electronic device to the desired control action.

25. The method according to claim 24, wherein the step of translating said device monitor signal into keyboard monitor data includes the step of:
 translating the device monitor signal into a keyboard code signal which emulates individual sequential keyboard character keystroke information and which is adapted to be interpreted by said computer as keyboard keystroke information.

26. The method according to claim 25, wherein said device monitor signal provided by said electronic device includes binary-based digital signals, and wherein said step of translating said device monitor signal into keyboard monitor data includes the steps of:
 (i) translating said binary-based digital signals into text-character-based digital signals; and
 (ii) translating said text-character-based digital signals into keyboard code signals which can be directly interpreted by said computer.

27. The method according to claim 24, further comprising the steps of:
 (a) executing at least one software application program under user control; and
 (b) simultaneously executing at least one device control program independent of user control, said device control program performing at least the step of translating said device monitor signal into keyboard monitor data.

28. The method according to claim 24, further comprising the steps of:
 (a) interacting with a user to configure a device control program for monitoring and controlling a plurality of peripheral electronic devices in response to information derived from a plurality of said device monitor signals;
 (b) storing said device control program in memory.

29. The method according to claim 28, wherein said device control program includes at least three operational modes including a set-up mode, a manual mode, and an automatic mode, and wherein said interacting step further comprises the steps of:
 (i) in the set-up mode, presenting a series of display images to assist the user in determining which device control signals are associated with which device monitor signals and with which of said plurality of electronic devices;
 (ii) in the manual mode, providing the user with the ability to manually change the operational state of at least one electronic device by overriding said device control signal or said device monitor signal for a particular device selected by the user with a manually-changed keyboard code signal, and presenting at least one display image having a representation of the current operational state of the selected device based upon the manually-changed signal; and
 (iii) in the automatic mode, displaying an image corresponding to the current operational state of at least one electronic device.

30. The method according to claim 29, wherein said interacting step, in the manual mode of operation, provides the user with the ability to emulate system operation by manual control of said device control signals in substantially real time.

31. The method according to claim 24, wherein said transmission media includes an AC power-line transmission media.

32. The method according to claim 24, wherein said peripheral electronic device is one of a plurality of household or office equipment such as appliances, lights, or entertainment equipment.

* * * * *

UNITED STATES PATENT AND TRADEMARK OFFICE
CERTIFICATE OF CORRECTION

PATENT NO. : 5,400,246
DATED : March 21, 1995
INVENTOR(S) : Wilson et al.

It is certified that error appears in the above-indentified patent and that said Letters Patent is hereby corrected as shown below:

```
Column 25, line 1, insert --to-- after "device".
Column 25, line 1, insert --transmit-- before "input".
Column 28, line 65, insert --input A3, and-- after "X-10".
Column 29, line 7, insert --",-- after  Ready .
```

Signed and Sealed this

Thirty-first Day of October 1995

Attest:

BRUCE LEHMAN

Attesting Officer

Commissioner of Patents and Trademarks